United States Patent [19]

McDonough

[11] Patent Number: 4,651,275
[45] Date of Patent: Mar. 17, 1987

[54] MICROCOMPUTER HAVING READ/WRITE MEMORY FOR COMBINED MACROCODE AND MICROCODE STORAGE

[75] Inventor: Kevin C. McDonough, Houston, Tex.

[73] Assignee: Texas Instruments Incorporated, Dallas, Tex.

[21] Appl. No.: 654,535

[22] Filed: Sep. 26, 1984

Related U.S. Application Data

[63] Continuation of Ser. No. 280,588, Jul. 2, 1981, abandoned.

[51] Int. Cl.⁴ ............................................. G06F 9/22
[52] U.S. Cl. ................................................... 364/200
[58] Field of Search ............................... 364/200, 900

[56] References Cited

U.S. PATENT DOCUMENTS 3,599,176  8/1971  Cordero, Jr. et al. ............... 364/200

Primary Examiner—Gareth D. Shaw
Assistant Examiner—Daniel K. Dorsey
Attorney, Agent, or Firm—John G. Graham

[57] ABSTRACT

A microcomputer device contains a CPU with an arithmetic/logic unit and data/address registers on a single semiconductor integrated circuit having a combined on-chip read/write memory for macrocode and microcode storage. A macrocode word is fetched from the memory and stored in an instruction register in the CPU, then a sequence of microcode words is fetched from the same memory based on this macrocode word. Both macrocode and microcode may be loaded into the combined memory from external to the chip, so the functions of the microcomputer may be changed for different tasks. The content of both microcode and macrocode, as well as the ratio of macrocode to microcode, can be varied by programming without any change in the circuitry of the chip.

20 Claims, 34 Drawing Figures

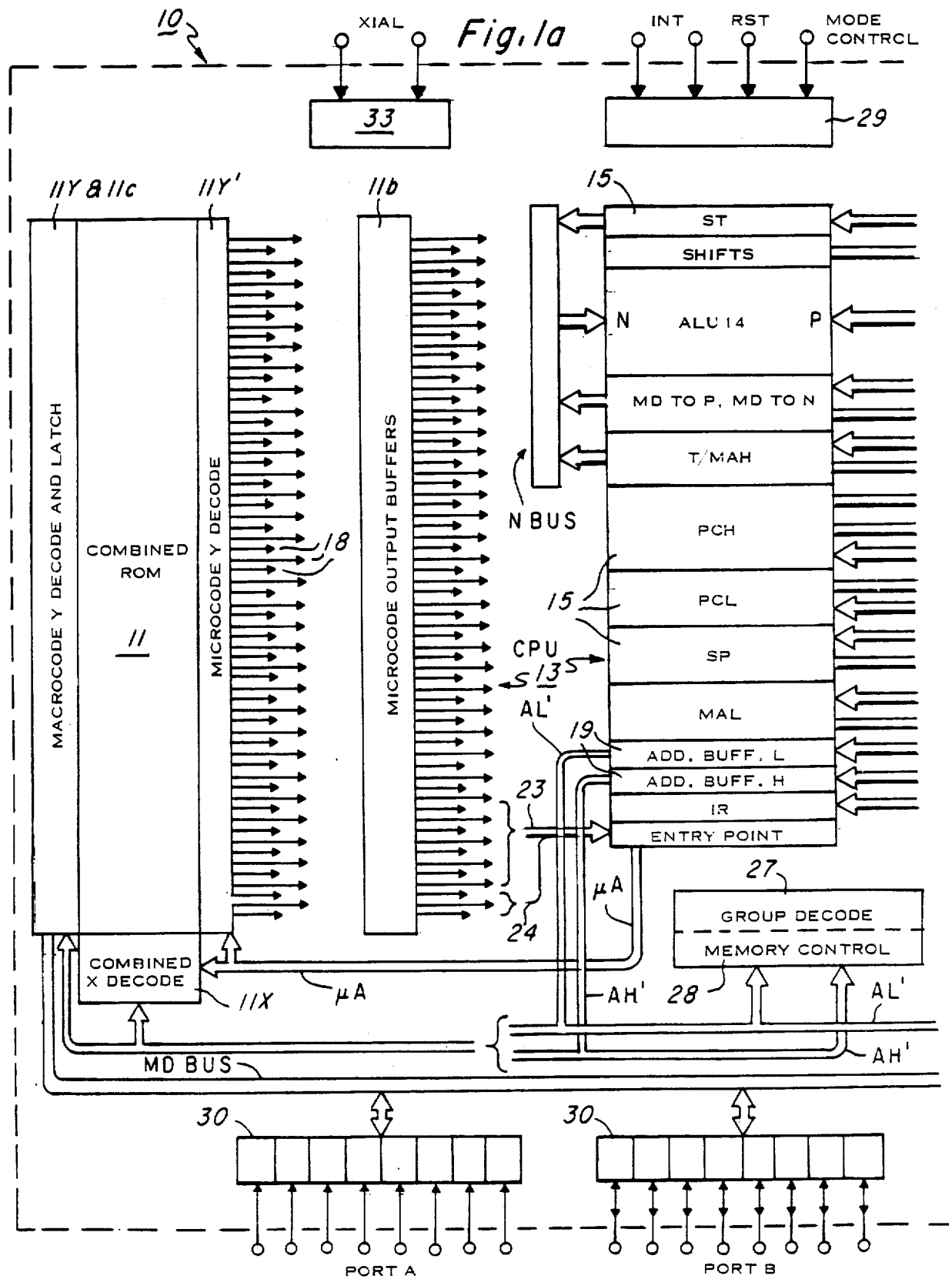

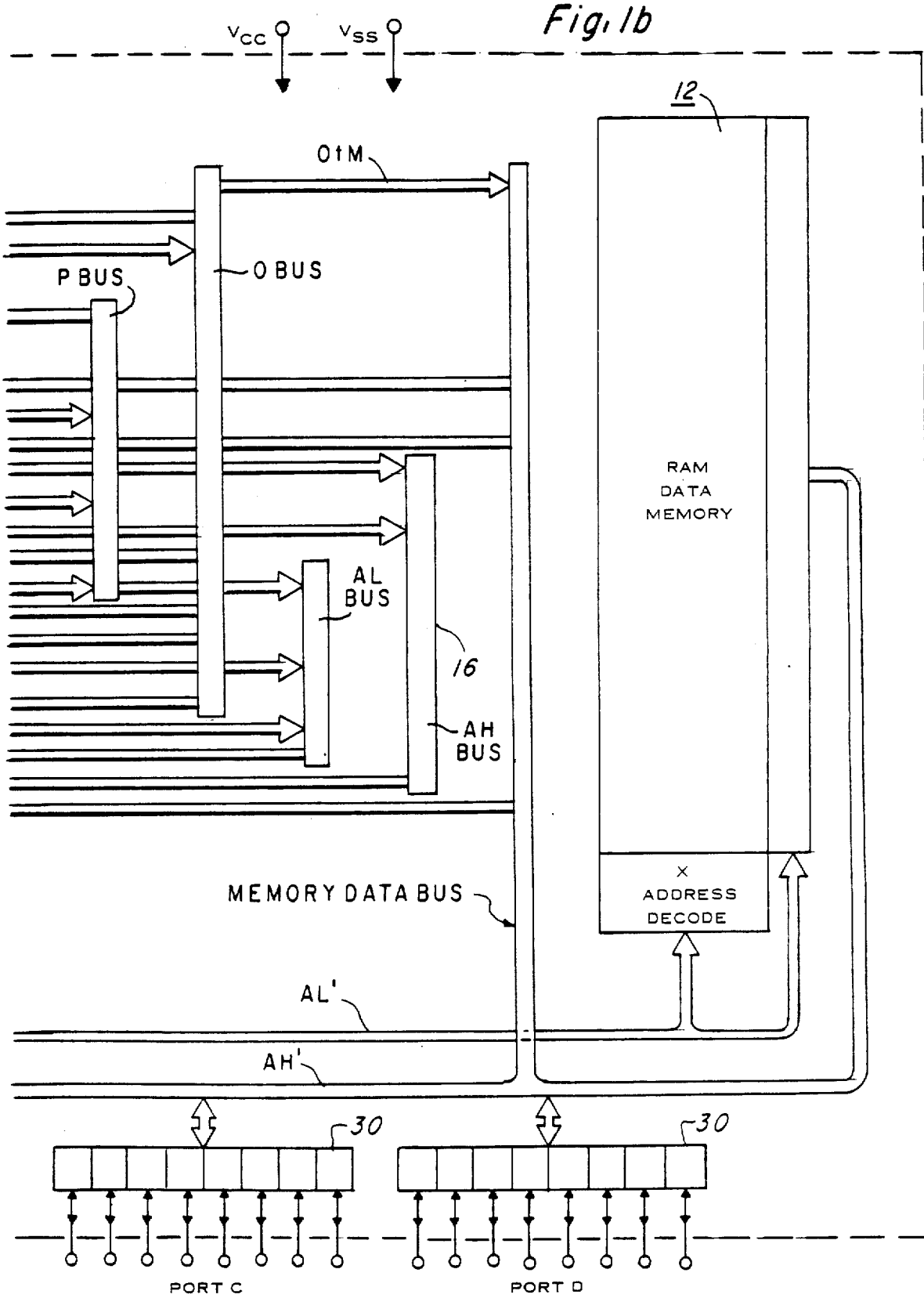

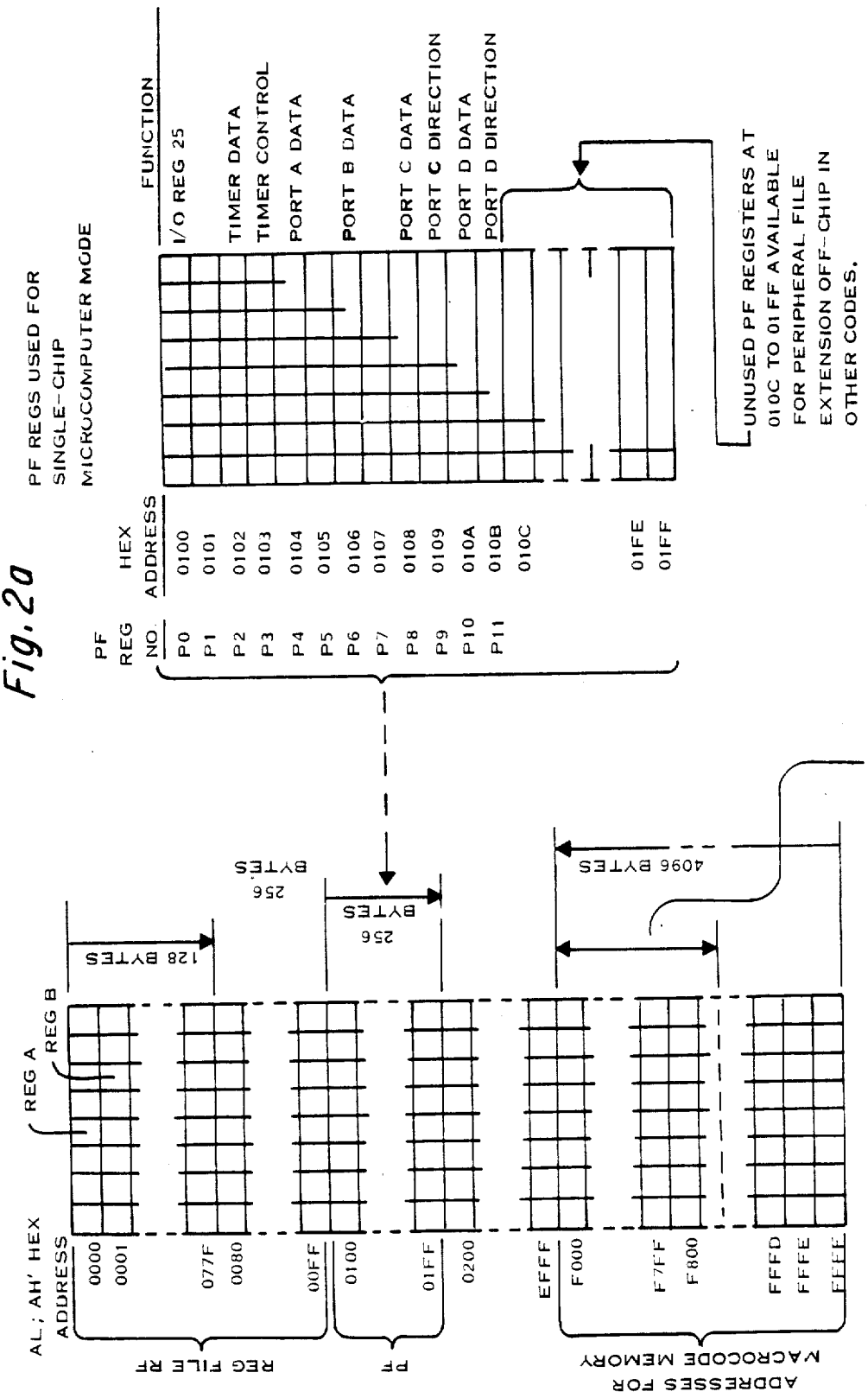

| PF REG NO. | HEX ADDRESS | | FUNCTION |
|---|---|---|---|
| P0 | 0100 | | I/O REG 25 |
| P1 | 0101 | | |
| P2 | 0102 | | TIMER DATA |
| P3 | 0103 | | TIMER CONTROL |
| P4 | 0104 | | PORT A DATA |
| P5 | 0105 | | |
| P6 | 0106 | DATA    EXP | PORT B |
| P7 | 0107 | | |
| P8 | 0108 | | ⎫ PF EXPANSION |
| P9 | 0109 | | ⎭ |
| P10 | 010A | | PORT D DATA |
| P11 | 010B | | PORT D DIRECTION |
| P12 | 010C | | ⎫ PF REGISTERS AT 010C TO 01FF AVAILABLE FOR PERIPHERAL FILE EXPANSION |
| | 01FE | | |
| P255 | 01FF | | ⎭ |

Fig. 2b
PF REGS FOR PERIPHERAL EXPANSION MODE

| PF REG NO. | HEX ADDRESS | | FUNCTION |
|---|---|---|---|
| P0 | 0100 | | I/O REG 25 |
| P1 | 0101 | | |
| P2 | 0102 | | TIMER DATA |
| P3 | 0103 | | TIMER CONTROL |
| P4 | 0104 | | PORT A DATA |
| P5 | 0105 | | |
| P6 | 0106 | DATA    EXP | PORT B |
| P7 | 0107 | | |
| P8 | 0108 | | |
| P9 | 0109 | | |
| P10 | 010A | | ⎫ PF REGISTERS AT 0108 TO 01FF AVAILABLE FOR EXPANSION OFF-CHIP |
| P11 | 010B | | |
| P12 | 010C | | |
| | 01FE | | |
| P255 | 01FF | | ⎭ |
| | 0200 | | ⎫ 60,928 BYTES AVAILABLE FOR MEMORY EXPANSION OFF-CHIP |
| | EFFF | | ⎭ |
| | F000 | | ⎫ PROGRAM MEMORY IN ROM ON-CHIP |
| | FFFF | | ⎭ |

Fig. 2c
MEMORY MAP FOR FULL EXPANSION MODE

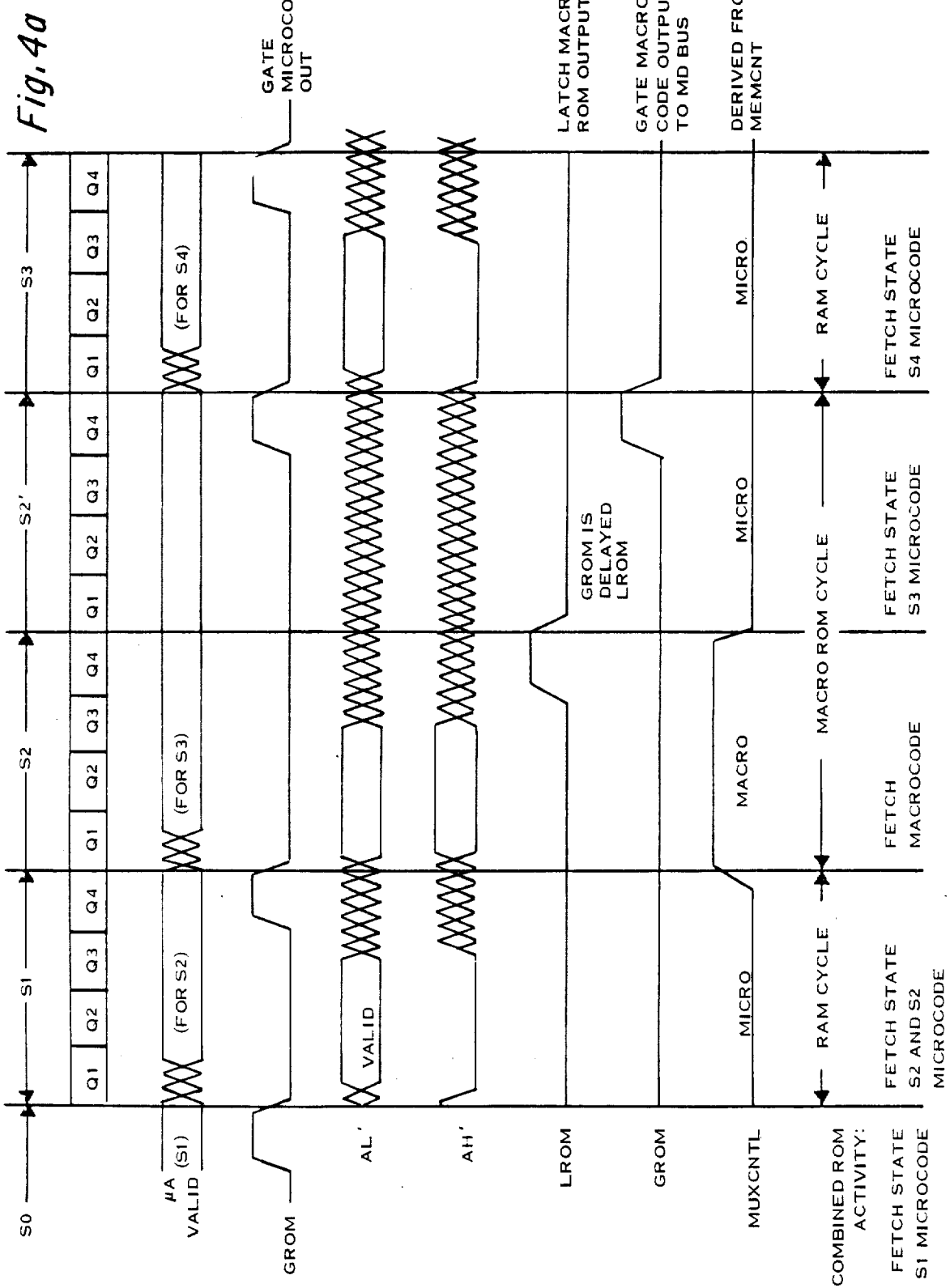

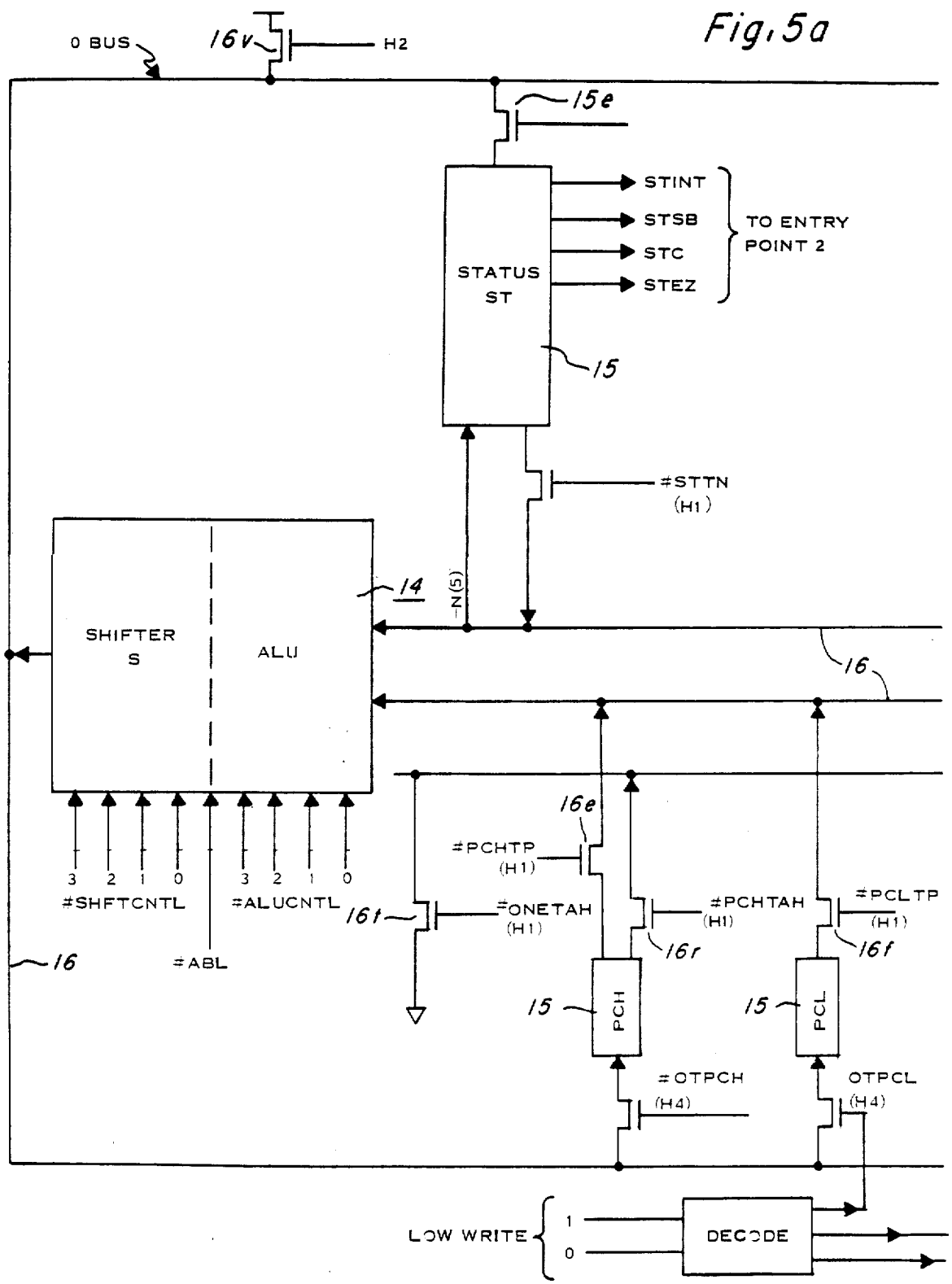

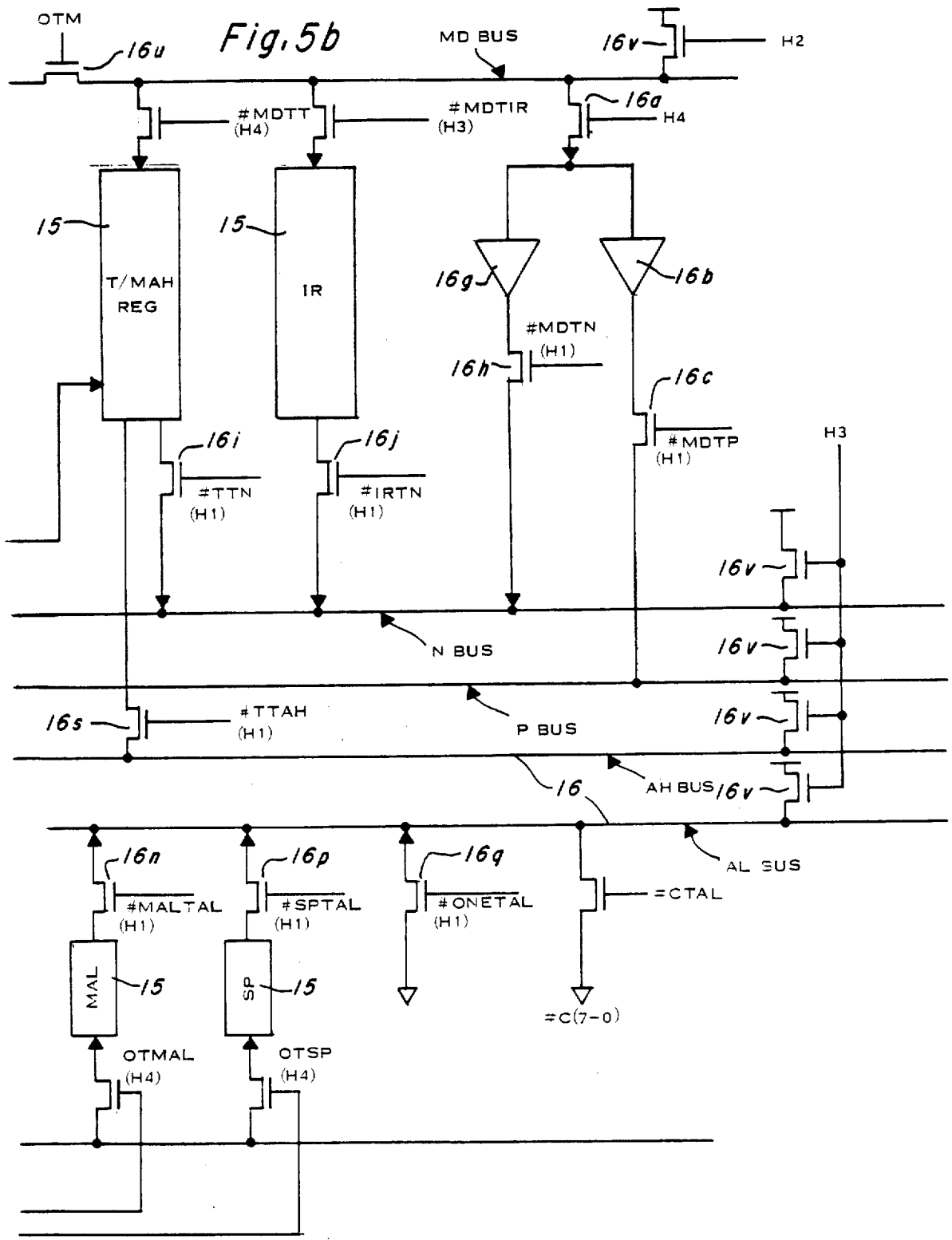

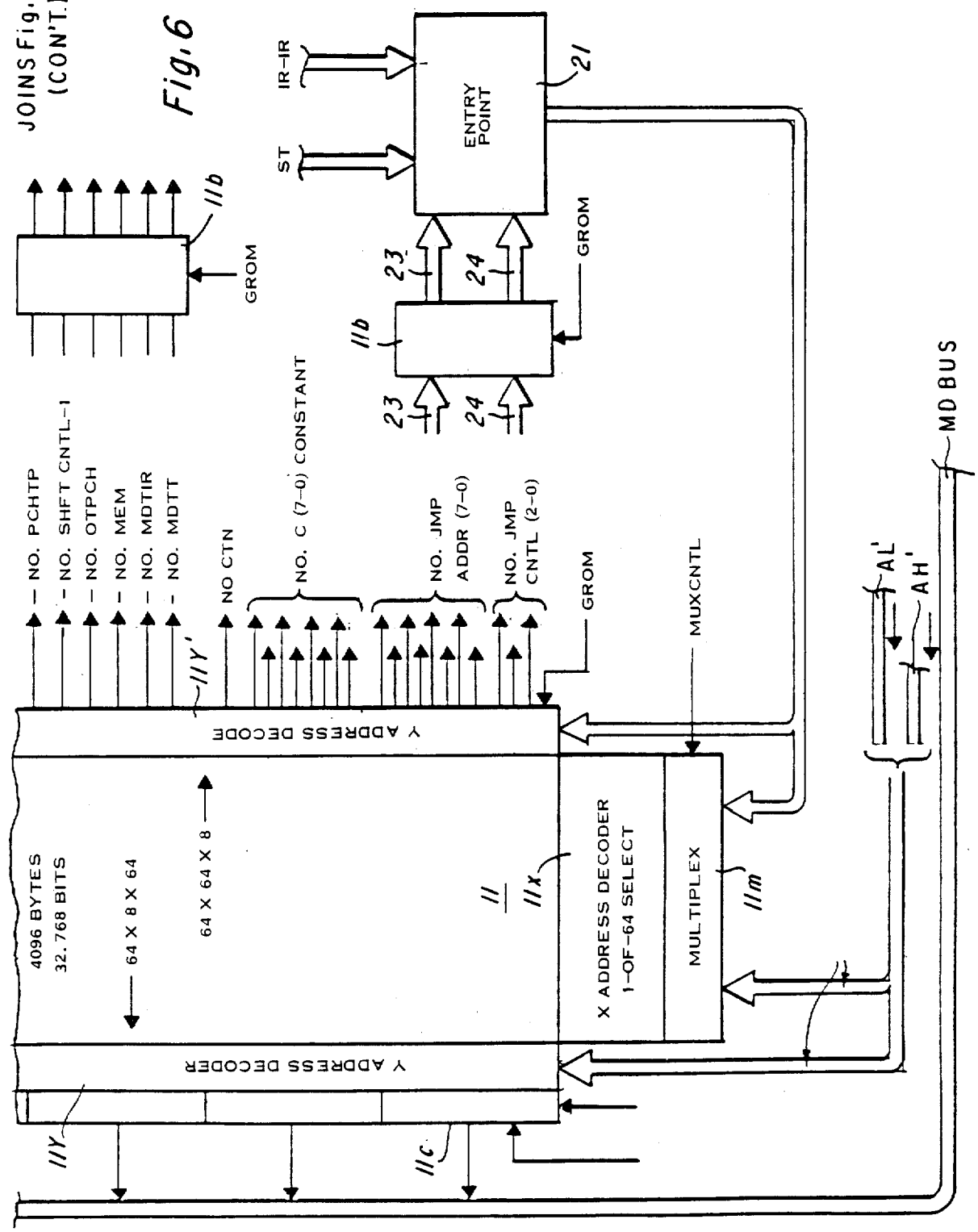

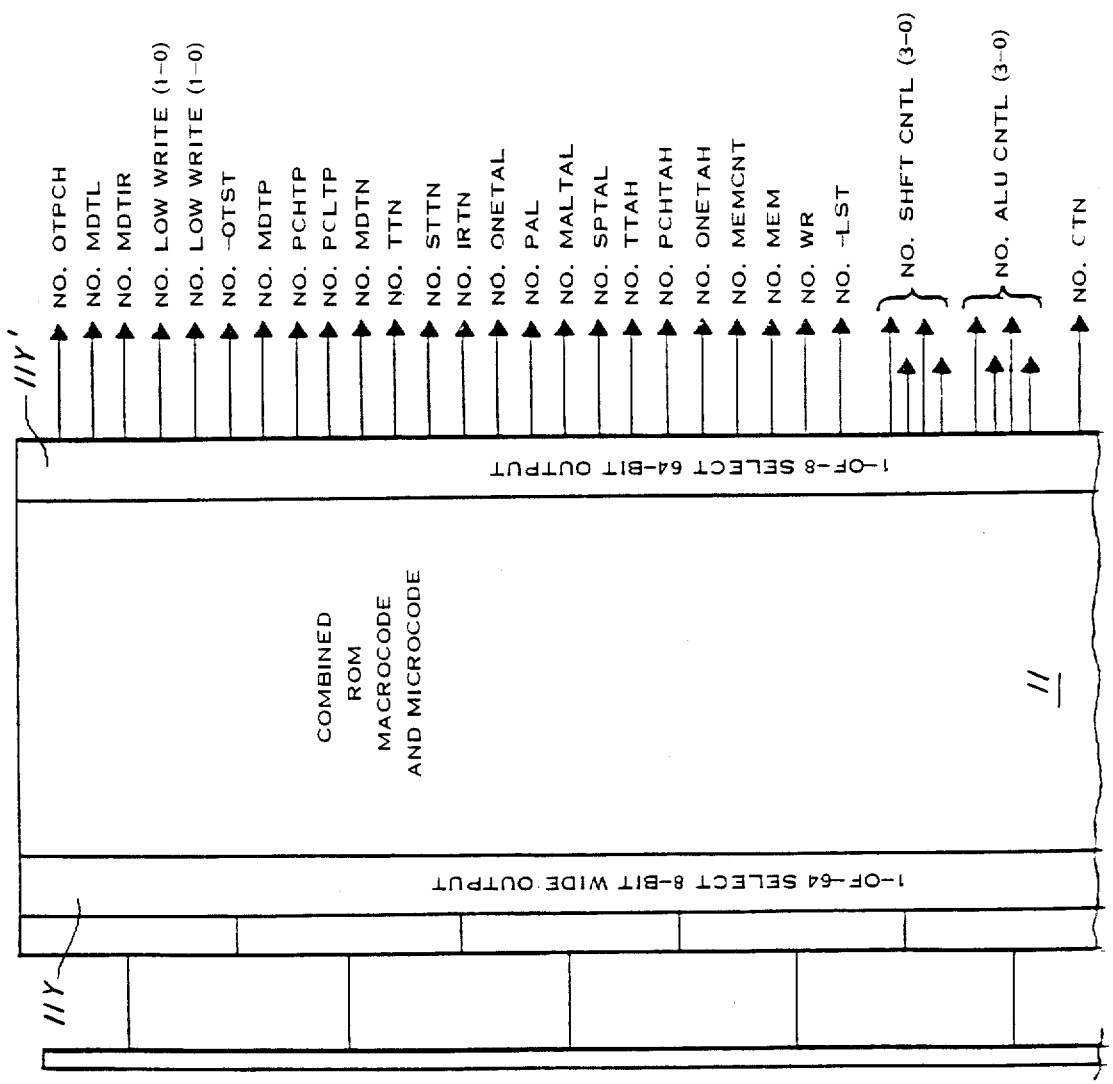

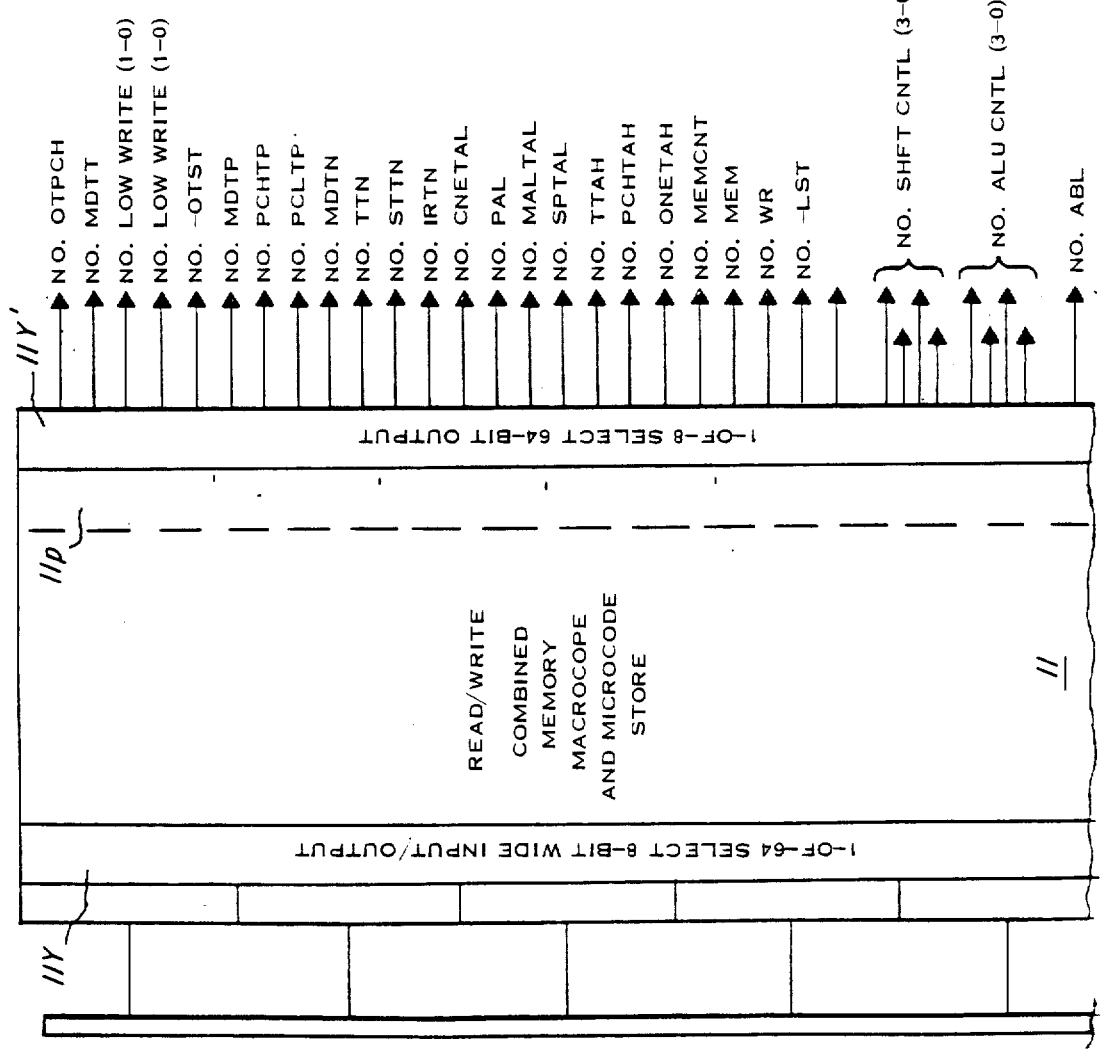

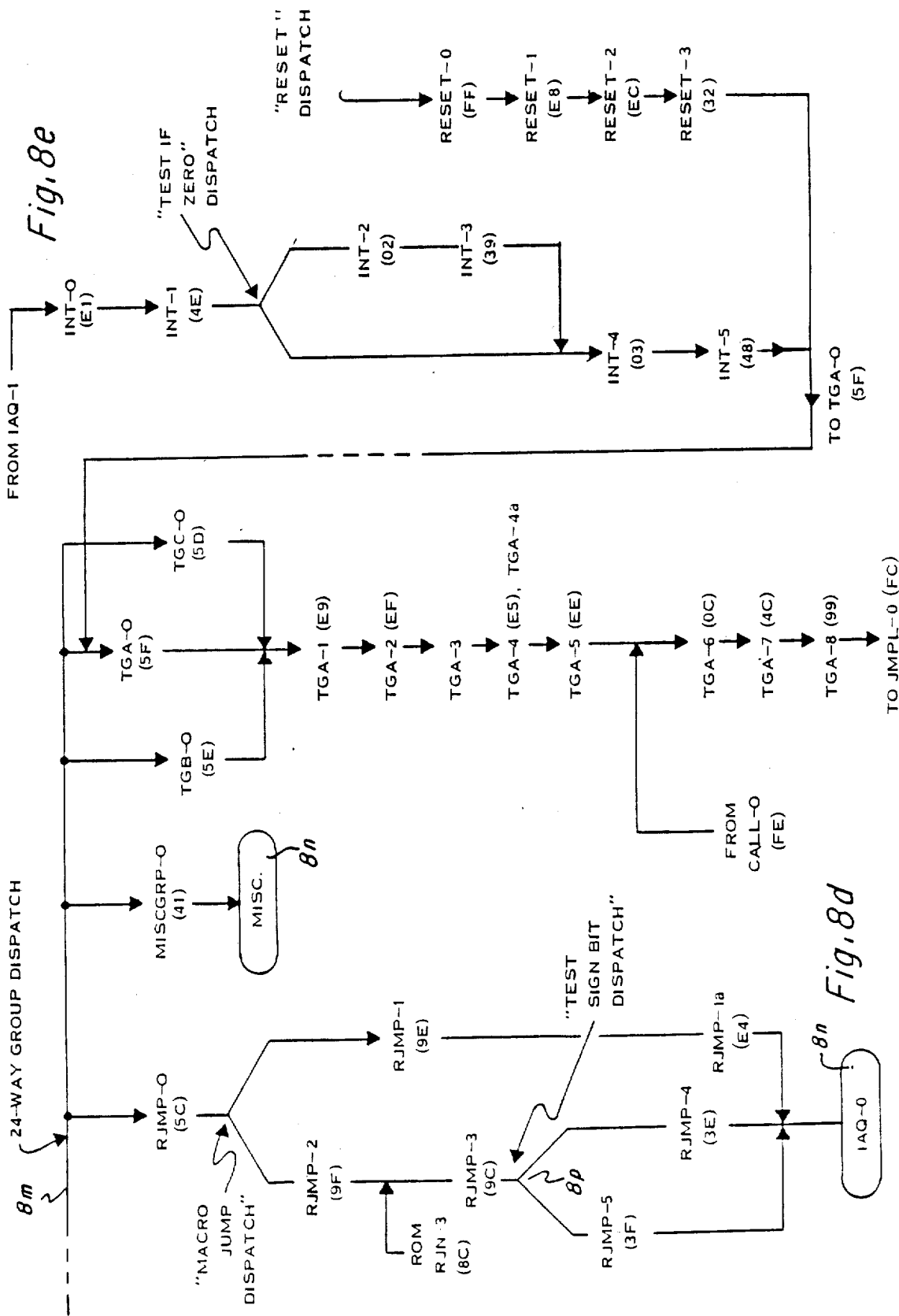

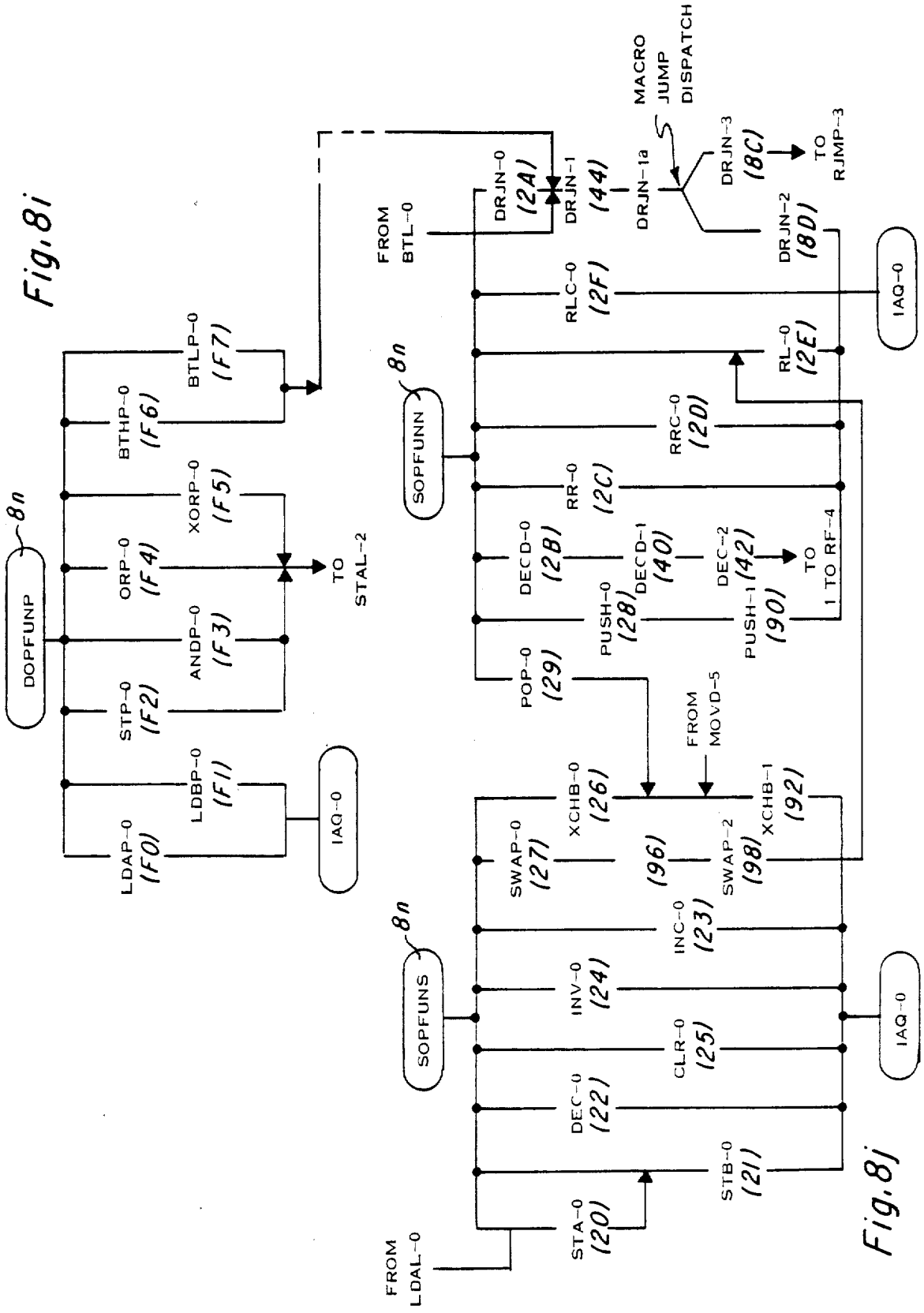

Fig. 9 — OPCODE MAP

| Hi\Lo | 0000 (0) | 0001 (1) | 0010 (2) | 0011 (3) | 0100 (4) | 0101 (5) | 0110 (6) | 0111 (7) | 1000 (8) | 1001 (9) | 1010 (A) | 1011 (B) | 1100 (C) | 1101 (D) | 1110 (E) | 1111 (F) |
|---|---|---|---|---|---|---|---|---|---|---|---|---|---|---|---|---|
| 0000 (0) | NOP | | | | | | | | | | | TSTA/CLRC | MOV A,B | MOV A,Rn | JMP | TRAP 15 |
| 0001 (1) | IDLE | | | | | | | | MOVP Pn,A | MOVP Pn,B | | | TSTB | MOV B,Rn | JN/JLT | TRAP 14 |
| 0010 (2) | | MOV Rn,A | MOV %n,A | MOV Rn,B | MOV Rn,Rn | MOV %n,B | MOV B,A | MOV %n,R | MOVP A,Pn | MOVP B,Pn | MOVP %n,Pn | DEC A | DEC B | DEC Rn | JZ/JEQ | TRAP 13 |
| 0011 (3) | | AND Rn,A | AND %n,A | AND Rn,B | AND Rn,Rn | AND %n,B | AND B,A | AND %n,R | ANDP A,Pn | ANDP B,Pn | ANDP %n,Pn | INC A | INC B | INC Rn | JC/JHS | TRAP 12 |
| 0100 (4) | | OR Rn,A | OR %n,A | OR Rn,B | OR Rn,Rn | OR %n,B | OR B,A | OR %n,R | ORP A,Pn | ORP B,Pn | ORP %n,Pn | INV A | INV B | INV Rn | JP/JGT | TRAP 11 |
| 0101 (5) | EINT | XOR Rn,A | XOR %n,A | XOR Rn,B | XOR Rn,Rn | XOR %n,B | XOR B,A | XOR %n,R | XORP A,Pn | XORP B,Pn | XORP %n,Pn | CLR A | CLR B | CLR Rn | JPZ/JGE | TRAP 10 |
| 0110 (6) | DINT | BTJO Rn,A | BTJO %n,A | BTJO Rn,B | BTJO Rn,Rn | BTJO %n,B | BTJO B,A | BTJO %n,R | BTJOP A,Pn | BTJOP B,Pn | BTJOP %n,Pn | XCHB A | XCHB B | XCHB Rn | JNZ/JNE | TRAP 9 |
| 0111 (7) | SETC | BTJZ Rn,A | BTJZ %n,A | BTJZ Rn,B | BTJZ Rn,Rn | BTJZ %n,B | BTJZ B,A | BTJZ %n,R | BTJZP A,Pn | BTJZP B,Pn | BTJZP %n,Pn | SWAP A | SWAP B | SWAP Rn | JNC/JL | TRAP 8 |
| 1000 (8) | POP ST | ADD Rn,A | ADD %n,A | ADD Rn,B | ADD Rn,Rn | ADD %n,B | ADD B,A | ADD %n,R | MOVD %n,Rn | MOVD Rn,Rn | MOVD %n(B),Rn | PUSH A | PUSH B | PUSH Rn | TRAP 23 | TRAP 7 |
| 1001 (9) | STSP | ADC Rn,A | ADC %n,A | ADC Rn,B | ADC Rn,Rn | ADC %n,B | ADC B,A | ADC %n,R | | | | POP A | POP B | POP Rn | TRAP 22 | TRAP 6 |
| 1010 (A) | RETS | SUB Rn,A | SUB %n,A | SUB Rn,B | SUB Rn,Rn | SUB %n,B | SUB B,A | SUB %n,R | LDA @n | LDA @·Rn | LDA @n(B) | DJNZ A | DJNZ B | DJNZ Rn | TRAP 21 | TRAP 5 |
| 1011 (B) | RETI | SBB Rn,A | SBB %n,A | SBB Rn,B | SBB Rn,Rn | SBB %n,B | SBB B,A | SBB %n,R | STA @n | STA @·Rn | STA @n(B) | DECD A | DECD B | DECD Rn | TRAP 20 | TRAP 4 |
| 1100 (C) | | MPY Rn,A | MPY %n,A | MPY Rn,B | MPY Rn,Rn | MPY %n,B | MPY B,A | MPY %n,R | BR @n | BR @·Rn | BR @n(B) | RR A | RR B | RR Rn | TRAP 19 | TRAP 3 |
| 1101 (D) | LDSP | CMP Rn,A | CMP %n,A | CMP Rn,B | CMP Rn,Rn | CMP %n,B | CMP B,A | CMP %n,R | CMPA @n | CMPA @·Rn | CMPA @n(B) | RRC A | RRC B | RRC Rn | TRAP 18 | TRAP 2 |
| 1110 (E) | PUSH ST | | | | | | | | CALL @n | CALL @·Rn | CALL @n(B) | RL A | RL B | RL Rn | TRAP 17 | TRAP 1 |
| 1111 (F) | | | | | | | | | | | | RLC A | RLC B | RLC Rn | TRAP 16 | TRAP 0 |

A — A Register
B — B Register
Rn — Register File
Pn — Peripheral File
%n — Immediate
@n — Direct
·Rn — Indirect

Fig. 9

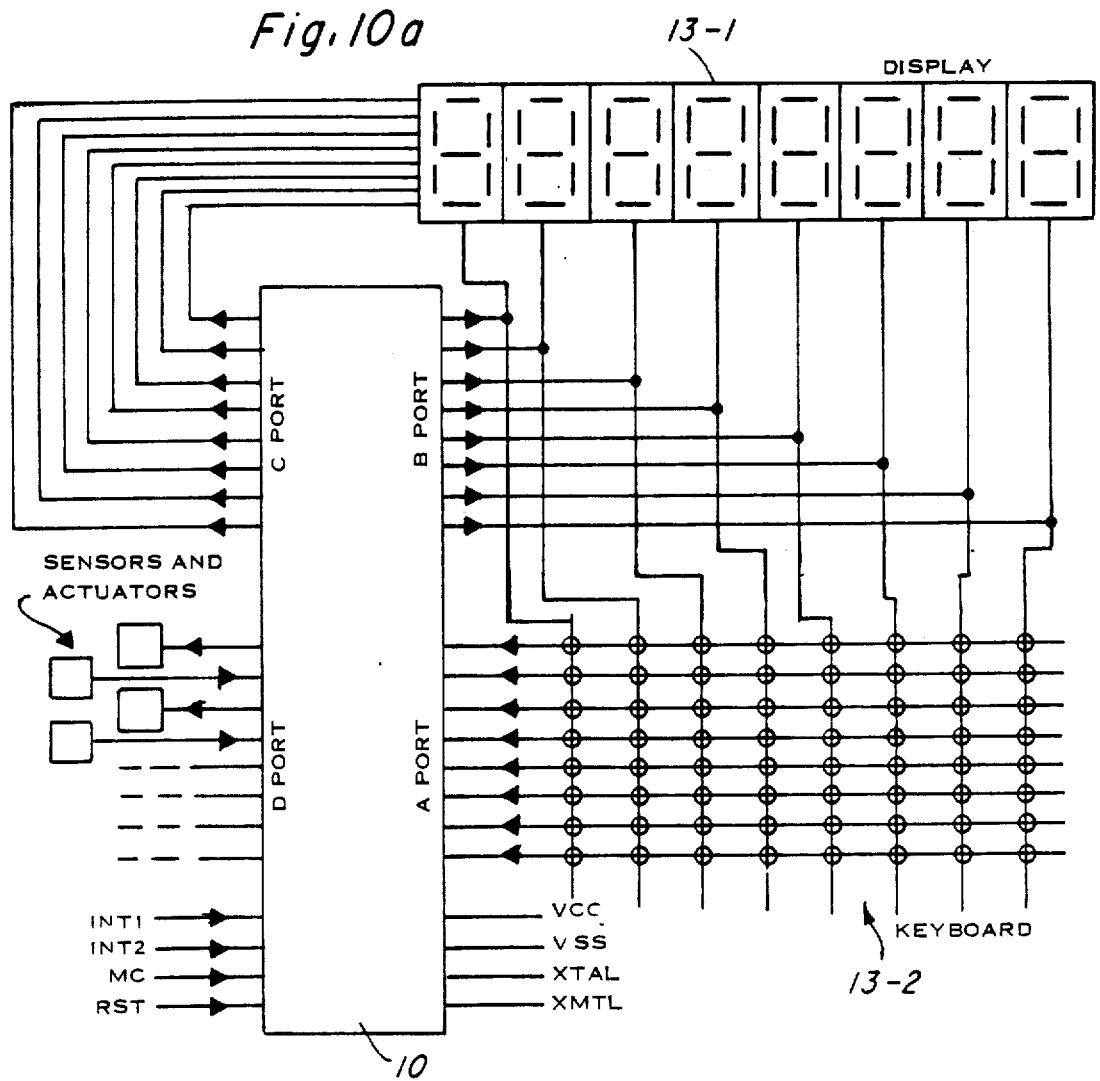

B AND C PORT TIMING WITH ALATCH, R/W, ENABLE AND CLKOUT
FOR OFF-CHIP ACCESSES IN FIG. 13b, 13c, 13d MODE OF OPERATION

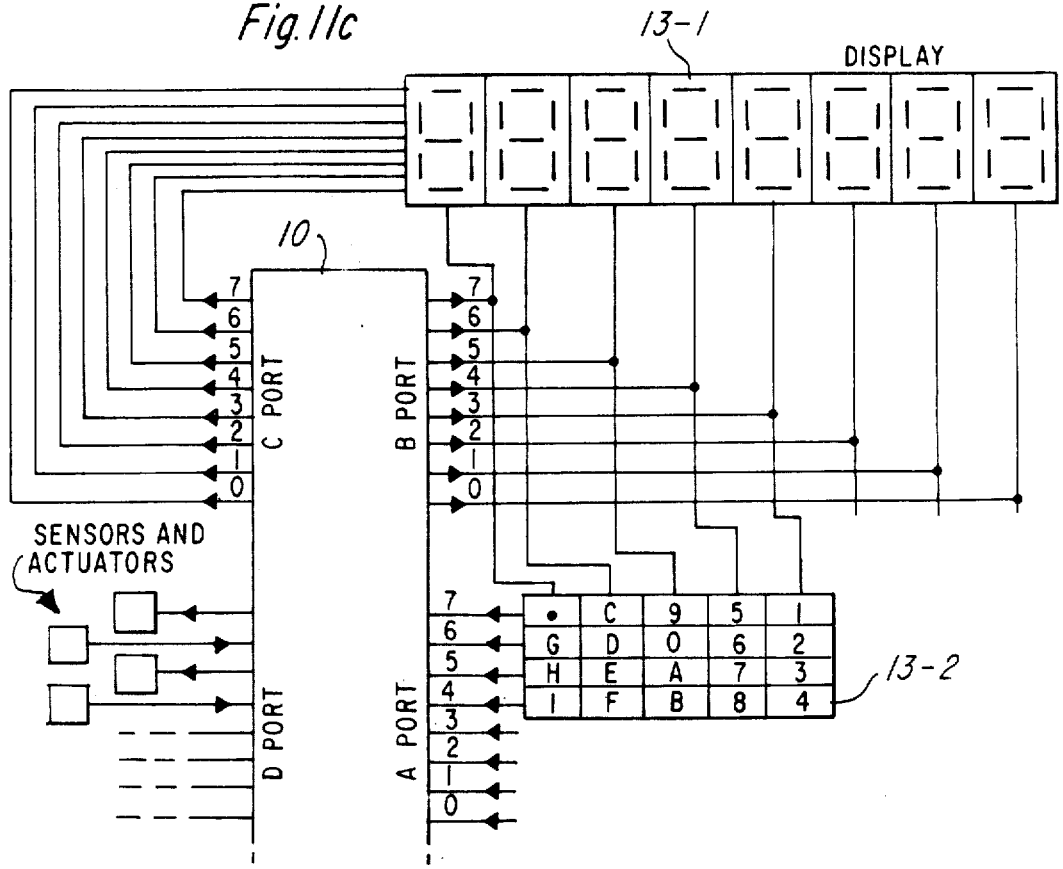

MICROCOMPUTER HAVING READ/WRITE MEMORY FOR COMBINED MACROCODE AND MICROCODE STORAGE

This is a continuation of application Ser. No. 280,588, filed July 2, 1981, now abandoned.

Related cases: This application discloses and claims subject matter also disclosed in the following copending applications:

Ser. No. 280,034 for MICROCOMPUTER WITH COMBINED MICROCODE AND MACROCODE MEMORY, now abandoned.

Ser. No. 280,049 for MICROCOMPUTER WITH BOTH MICROINTERRUPTS AND MACROINTERRUPTS, Ser. No. 297,924 for MICROCOMPUTER WITH MICROINTERRUPTS, now U.S. Pat. No. 4,396,438

Ser. No. 279,902 for MICROCOMPUTER HAVING ACCESS TO MICROCODE FOR ALU OPERATIONS, now U.S. Pat. No. 4,495,563

Ser. No. 280,048 for MICROCOMPUTER WITH SELF-TEST OF MICROCODE, now U.S. Pat. No. 4,490,783

Ser. No. 280,022 for MICROCOMPUTER WHICH FETCHES TWO SETS OF MICROCODE BITS AT ONE TIME, now U.S. Pat. No. 4,471,426 all filed on July 2, 1981 and assigned to Texas Instruments.

BACKGROUND OF THE INVENTION

This invention relates to integrated semiconductor devices and systems, and more particularly to features used in an electronic digital processing system of the single-chip microprocessor or microcomputer form.

Microcomputers and microprocessors of the prior art are identified in the Background of Invention in U.S. Pat. No. 4,402,044, assigned to Texas Instruments.

It is the principal object of this invention to provide an improved microcomputer or microprocessor device which is adaptable for a wide variety of uses but yet is constructed to facilitate low-cost manufacture and to minimize testing costs.

Another object is to provide a microcomputer device that is more flexible in the variety of different uses that can be programmed into a standard chip type. In particular, it is an object to provide a microcomputer device, in which the amount of microcoding employed in instruction execution can be varied without changing any masks in the manufacturing process other than a gate mask.

SUMMARY OF THE INVENTION

In accordance with one embodiment of the invention, a microcomputer device contains a CPU with an arithmetic/logic unit and data/address registers on a single semiconductor integrated circuit, along with combined on-chip read/write memory for macrocode and microcode storage. A macrocode word is fetched from this memory and stored in an instruction register in the CPU, then a sequence of microcode words is fetched from the same memory based on this macrocode word. Both macrocode and microcode may be loaded into the combined memory from external to the chip, s the functions of the microcomputer may be changed for different tasks. The content of both microcode and macrocode, as well as the ratio of macrocode to microcode, can be varied by programming without any change in the circuitry of the chip.

The combined macrocode and microcode memory may be a RAM instead of a ROM, so the user could down-load microcode as well as macrocode from external disc, tape or ROM, or via phone lines, to define the system functions according to his immediate job. Or, different instruction sets may be used during different parts of a job. A terminal may be microprogrammed at one point to do floating point or BCD arithmetic, then at another point to do move-double type instructions for efficient data transfer, for example.

An important feature of the invention is that the microcode can be accessed in byte-wide sections by the internal busses for ALU operations or transfer to external. That is, the microcode stored in the combined ROM can be applied to the ALU or temporary registers or written to the external ports, one byte at a time. This is very useful for test purposes. Otherwise, the only way to test the microcode is to execute every possible function to see if the correct result is obtained.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is an electrical diagram in block form of an MOS/LSI microcomputer chip including CPU, ROM and RAM and utilizing features of the invention;

FIG. 2 is a memory map for the logical address space for the microcomputer of FIG. 1 and FIGS. 2a-2c are detailed memory map like FIG. 2 for the peripheral page for microcomputer and expansion modes;

FIG. 3a is an enlarged detail view of a part of the layout of FIG. 3 showing the regular pattern of the ALU and register strip;

FIG. 4a is a timing diagram like FIG. 4 for a macrocode access cycle;

FIG. 5 is a detailed electrical diagram of the CPU, including ALU, shifter S, registers and busses, in the microcomputer of FIG. 1;

FIG. 6' is a detailed electrical diagram of the combined memory according to another embodiment;

FIGS. 8a-8j are a logic flow chart of the execution of the microinstructions of Tables B and C in the system of FIG. 1;

FIG. 9 is a map of macroinstructions for the example instruction set of Table A;

FIGS. 10a-10c are electrical diagrams of systems using the microcomputer of FIG. 1;

FIG. 11c is an electrical diagram of the system using the program of FIGS. 11a and 11b.

DETAILED DESCRIPTION OF SPECIFIC EMBODIMENT THE MICROCOMPUTER CHIP

Figure 3:
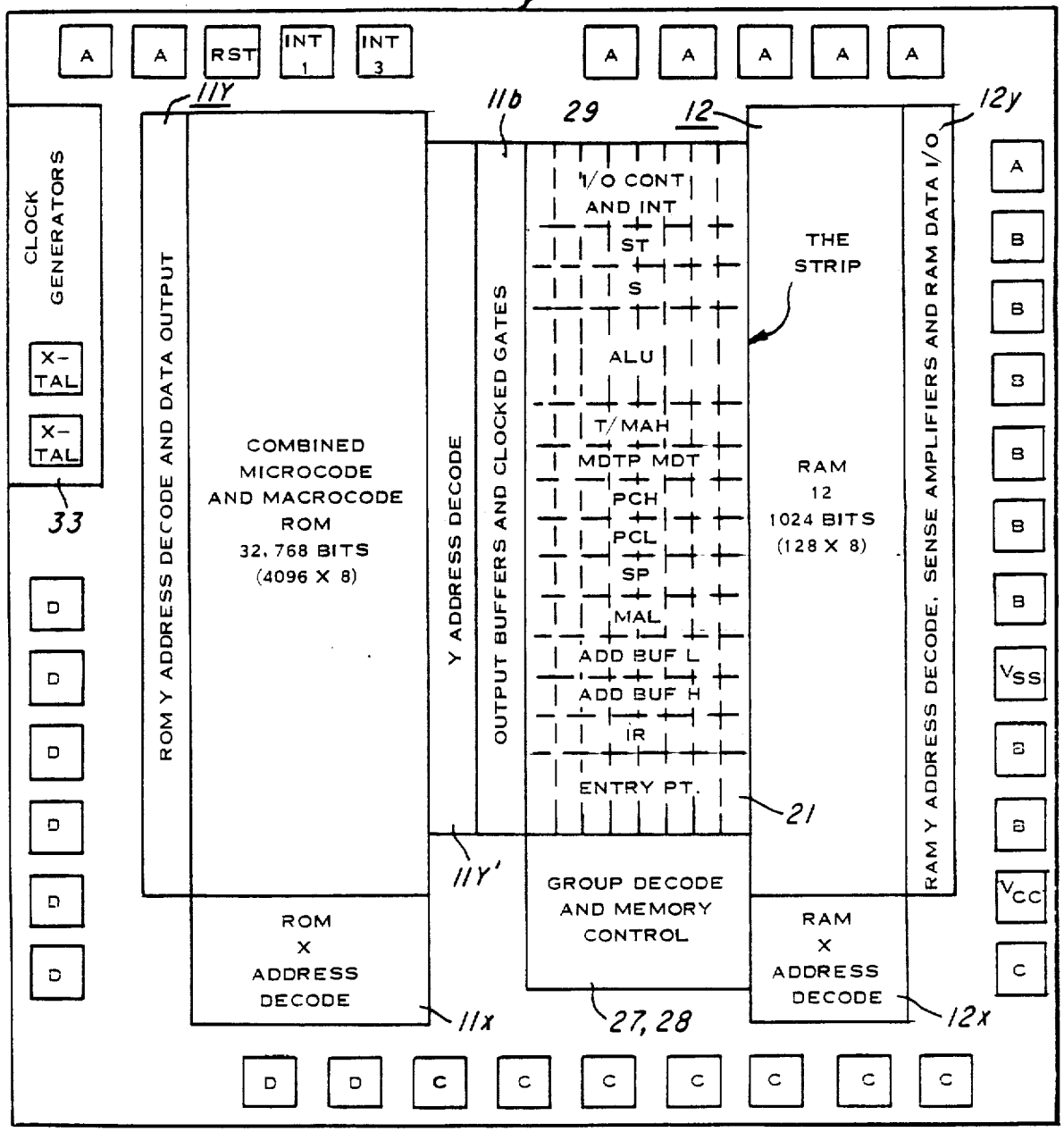
FIG. 3 is a greatly enlarged plan view of the semiconductor chip containing the microcomputer of FIG. 1 showing the physical layout of the various parts of the device.
Figure 3B:
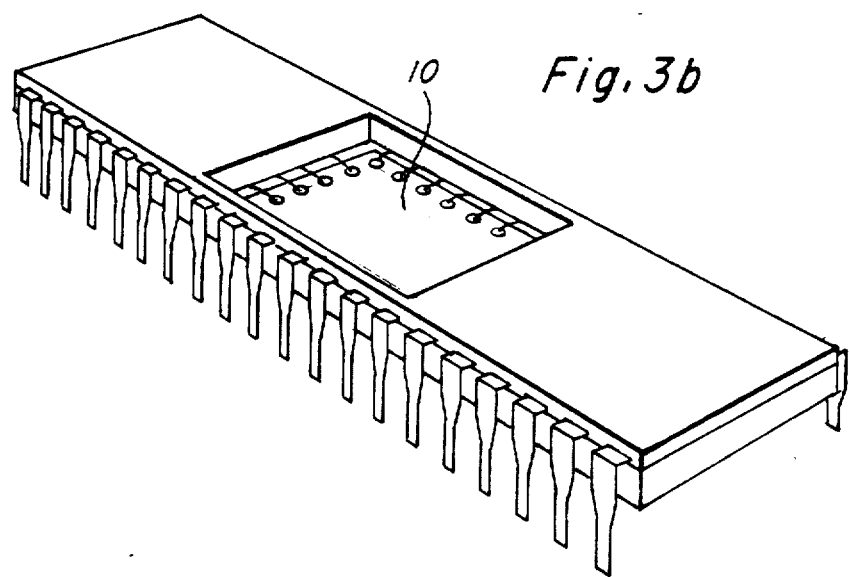
FIG. 3b is a pictorial view of the microcomputer chip of FIG. 3 mounted in a 40-pin dual-in-line package.

With reference to FIG. 1, a microcomputer chip 10 is shown which employs features according to one embodiment of the invention. The chip 10 is a semiconductor integrated circuit of the MOS/LSI type including a silicon bar of less than about 200 mils on a side, mounted in a standard 40-pin package. Totally contained within the chip 10 is a digital processor having a combined user ROM and control ROM 11 according to the invention. This ROM or read-only memory 11 is used both for program storage and for microcode storage. A RAM or read/write memory 12 is used for data storage. The chip includes a CPU 13 which consists of an arithmetic logic unit or ALU 14 with its working registers 15 and busses 16, along with the control ROM output of the ROM 11 which generates microinstructions or control signals on lines 18. The CPU 13 accesses the ROM 11 and RAM 12 by three busses: a memory data bus MD, a high address bus AH, and a low address bus AL, along with three of the control lines 18. In addition, a microaddress bus uA accesses the ROM 11 for microcode fetch. Communication with devices external to the chip is by means of four memory-mapped 8-bit ports A, B, C and D which are accessed by the MD bus and activated by control circuitry responsive to the AH and AL addresses. In this embodiment, the MD, AH and AL busses are each eight bits wide, as are the ALU 14, the registers 15 and the ports, although of course concepts herein described would be applicable to 4-bit, 16-bit or 32-bit devices, for example.

The registers 15 in the CPU 13 include an instruction register IR, a status register ST; a shift circuit S which receives the output of the ALU 14, a register T/MAH which functions as both a temporary store for operands and for the high order byte of the memory address (memory address high), a sixteen bit program counter split into two eight bit registers PCH and PCL (program counter high and low), a stack pointer SP, and a memory address low register MAL. Address buffers 19 generate true and complement address signals on busses AH' and AL' from the address busses AH and AL. Operands are for the most part stored in the RAM 12 which functions as a register file RF, rather than in temporary registers 15 associated with the CPU 13.

The busses 16 interconnect the various registers 15, the ALU 14 and MD, AH' and AL' busses. The ALU 14 always receives a P input from a P bus and an N input from an N bus, and produces an output via shifter S to an output or O bus. Access to these P, N and O busses 16, to the registers 15 and ALU 14, and to the MD, AH and AL busses is controlled by the microcode, i.e. control signals 18 from the ROM 11.

The microcomputer chip 10 operates on the basis of 8-bit macroinstruction words stored in the ROM 11 and transferred to the instruction register IR one at a time. One of many possible examples of a macroinstruction set executed in the CPU 13 is described in Table A. The Table gives the instruction word in mneumonics, also referred to as assembly language or source code, and also gives the machine-language opcode in binary (this is like object code except object is in hex). Usually an opcode plus one or more address bytes are used to execute an instruction. An instruction word or opcode held in IR is an input to an entry point circuit 21 which produces an 8-bit address on micro address lines uA coupled to address circuitry 11x and 11y' for the ROM 11, accessing one of 256 possible addresses for the ROM 11 (in the example embodiment) to produce signals 18 defining one of the microinstructions such as set forth in the example of Tables B and C. One macroinstrution of Table A produces a sequence of microinstructions. A part of each of the microinstructions (i.e. some of outputs 18) is used to generate the next uA address for the ROM; a microjump address is fed back to the entry point circuit 21 via lines 23, and dispatch control information is fed back via lines 24. Thus, a sequence of microinstructions is generated from each macroinstruction loaded into IR; the sequence is also dependent upon status bits in the status register ST and other conditions. Addresses for operands, if needed, are contained in macrocode words from ROM 11 following the opcode and are transferred to MAL or MAH while the opcode stays in IR during this sequence of microcode states. Each address applied to the combined ROM 11 produces either a microcode output 18 via Y decode 11Y' or a macrocode output via Y decode 11Y to memory data bus MD. The CPU cannot access both macrocode and microcode in the same machine state.

A map of the logical address space for the microcomputer of FIG. 1 is shown in FIG. 2. The example embodiment employs 8-bit AH and AL addresses, providing a 16-bit address, and so 216 or 65,536 bytes are available in this space (often referred to as "64K" bytes where one "K" is 1,024). The addresses are shown in four hexidecimal digits, ranging from the first address OOOO to the last FFFF. In this description memory addresses will be given in hex, unless noted. A page is 28 or 256 bytes, i.e. all addresses on a page are defined by AL and the page is selected by AH. The microcomputer 10 uses the zero page (addresses 0000 to 00FF) for the register file RF in RAM 12, the "one" page (addresses 0100 to 01FF) for the peripheral file PF, and the FO to FF pages (addresses F000 to FFFF) for the combined program and microcode memory, ROM 11. Macrocode is 8-bits wide, while microcode in this example is about eight bytes or 64-bits wide, so each address for microcode occupies eight bytes in the map of FIG. 2. Thus, if 256 microinstructions are needed, this will occupy 2048 bytes or 16K bits of the ROM 11. For the example instruction sets, it will be assumed that micro addresses 00 to FF are used for microcode (corresponding to macro addresses F000 to F7FF) and the remainder of the address F800 to FFFF used for macrocode. Some of the alloted spaces for RF and ROM 11 may not be populated, depending upon the size of the ROM and RAM chosen. Other space such as 0200 to EFFF is available for the expansion modes as set forth in copending application Ser. No. 253,624, filed Apr. 13, 1981.

Although not related to this invention and thus not described in detail herein, a microcomputer such as that of FIG. 1, includes control circuitry responsive to the AH' and AL' busses and control bits 18 to define the way in which the CPU 13 accesses the peripheral file PF including external ports, a timer/event counter, reset and interrupt functions. An I/O and interrupt control register at a memory location 0100 of FIG. 2 is loaded directly by the MD bus would be part of the ALU/register strip; this register may contain two memory mode control bits to define memory expansion modes, as well as interrupt masks and flags. A progammable timer and event counter may also included in this peripheral control circuitry, accessed by the MD bus and eight bits wide, advantageously constructed as part of the ALU/register strip.

In this peripheral control circuity, a group decode circuit 27 and memory control circuit 28 receive the AH' and AL' address bits and three control signals 18 (#MEM, #WR and #MEMCNT) and produce controls which select between the ROM 11 (microcode or macrocode), RAM 12, ports A, B, C or D, etc. for access by a given address. Only one of these is activated in any one cycle.

Two or more interrupt input pins INT usually are provided, in addition to a timer interrupt. These INT inputs are connected to interrupt control circuitry 29 which is also responsive to other conditions on the chip. A reset input RST is used to zero or initiallize the microcomputer, overriding any function or interrupt, as is conventional. Microinterrupts may be included as explained below.

The peripheral control circuitry provides a selection of the operating modes defined by the internally-loaded bit-7 and bit-6 of the I/O control register 0100. The address space of FIG. 2 is configured in unique ways for these modes although the register file address space RF remains the same for all modes. The modes are: (1) single-chip microcomputer mode of FIG. 2a where all memory is on-chip in the ROM 11 and RAM 12; (2) a peripheral expansion mode of of FIG. 2b where some additional off-chip circuitry may be accessed in the PF space via ports B and C; or (3) a full expansion mode of FIG. 2c where about 61K bytes of off-chip memory may be accessed by ports B and C, the RF and ROM 11 being the same as FIG. 2. Other modes are available as explained in application Ser. No. 253,624, assigned to Texas Instruments. The various modes allow a wide variety of different functions to be provided by one basic chip type without design, layout or microcode modifications, thus greatly reducing the cost. Input-/output buffers 30 connect the ports A, B, C, D to the the MD bus, as defined by direction control registers P7, P9, P11 (FIG. 2a), for some modes and by the mode control arrangement via group decode 27 and memory control circuitry 28. The buffers 30 include data registers at P6, P8, P10 and P11, accessed by the MD bus.

THE STRIP ARCHITECTURE

In FIG. 3, the microcomputer of FIG. 1 is illustrated in chip layout form. A major part of the area of the chip 10 is occupied by the memory including the combined ROM 11 and RAM 12 with their address decoders. The ROM 11 has associated with it a combined X address decoder 11X and separate Y address decoders 11y and 11y' for macroinstructions and microcode; twelve address bits are used to define one of 4096 eight-bit bytes in the ROM 11, so an address for the ROM 11 needs both the MAL and MAH registers, i.e., address bits from both AL and AH busses for macroinstructions access. In one example, microcode access via uA would require only one page or 256 locations, accessed by an 8-bit address, although additional address space may be added by increasing the uA address width; a 9-bit uA would access 512 locations, for example. The RAM has an X address decoder 12X which selects 1-of-32 row lines, and a Y address decoder 12Y which selects 1-of-4 column lines, so only seven bits are needed for the RAM select (eight if a 256 byte RAM is used).

A primary feature is that the number of microcode states may be varied without a new chip design, layout, mask-making and production effort. In the example, the ROM 11 is 4096×8 or 32K bits in size. If fully populated, when an 8-bit microcode address uA is used, the number of bits in the ROM 11 used for microcode would be 256 times the number of output lines 18. Sixty-four output lines 18 are used for the example instruction set of Table A, and 256 microinstruction addresses or states are reserved (although in one example like in Tables B and C less than 150 are needed), so the microcode part of the ROM is 256×64 or 16K bits. The remainder is available for macrocode (32−16K=16K bits or 2K bytes).

The output ports A, B, C, and D each have eight bonding pads on the chip (total of thirty-two) for connection to external, and the areas of the chip around these bonding pads seen in FIG. 3 are occupied by the buffers 30 used for the ports. It will be noted that the port A is only used for input, so the space needed for the input buffers for this port is much less than for the remaining ports B, C, and D which require tri-state output buffers.

Between the RAM 12 and the microcode buffers 11b on the chip 10 of FIG. 3 is the "strip" which is an array of rows (parallel to control lines 18) and columns (parallel to metal bus lines 16 and ALU/register bits 14, 15) containing all of the 8-bit registers, ALU bits, and like circuitry associated with the busses 16 and control lines 18. As set forth in prior application Ser. No. 210,109, filed Nov. 24, 1980 by McDonough and Guttag, assigned to Texas Instruments, an important feature is that the ALU 14 and its associated registers IR, ST, S, T/MAH, PCH, PCL, SP, and MAL as described above are laid out on the MOS/LSI chip 10 in a regular strip pattern as seen in FIG. 3. Other circuitry connected to the busses and having controls 18 shared by eight bits is also in the strip, such as entry point 21 and, address buffers 19. Each of these registers as well as the ALU contains eight bits or stages which are laid out in a pattern like memory cells, the bits arranged horizontally and alligned vertically as seen in FIG. 3. The MD, AL, AH, O, N and P busses of FIG. 1 are each eight parallel metal strips on top of the cells of the ALU and registers (rather than beside the registers as depicted in FIG. 1), and all of the dozens of control lines 18 are horizontal polysilicon lines typically used as the control gates for transistors in the ALU 14 and its registers and like circuitry. The number of control lines 18 needed for the ALU 14 is greater than for a single register such as the MAL register, for example, and conveniently the space needed to lay out the ALU stages is greater than for a single register, so waste space in minimized. That is, the space needed in the control ROM 17 to generate the controls 18 is about the same as the space needed for the controlled circuitry. This layout arrangment is indeed advantageous because the ALU and registers fit alongside the control ROM with virtually none of the wasted space used merely for routing conductors in conventional construction of microprocessors. All bus lines MD, AL, AH, O, N and P, and all control lines 18 are routed over functional regions or cells of the chip rather than over unused silicon, and almost all 90 degree turns are produced inherently at functional cells rather than in conductor routing. In the prior devices, the control ROM, the registers, the ALU, etc., were islands of circuitry connected by busses or conductors. The enlarged view of FIG. 3a shows a small part of the strip, two-bits wide, illustrating the metal bus lines and the polysilicon control lines 18 for an N-channel silicon gate MOS device made generally by a single-level polysilicon process according to U.S. Pat. No. 4,055,444, assigned to Texas Instruments. Various contacts (not shown) would be made within each register bit or stage from metal to silicon or to polysilicon. It is significant to note that most of the connecting lines from registers to busses illustrated in FIG. 1 are not physically lines or elongated conductors at all but instead are merely metal-to-silicon or metal-to-poly contact areas along the metal bus lines of FIG. 3a. That is, routing of 8-bit sets of parallel conductors is minimized by the strip feature, and the size of the chip 10 is reduced. The busses 16 are staggered so that all six busses are not needed in any one part of the strip, and thus the pitch or maximum width of cells of the strip is minimized since the metal-to-metal spacing is a critical limiting factor in bit density. To this end, the placement of the registers 15 is such that the N bus need not coexist in any register with the AL or AH busses, and the P bus ends where the AL bus starts, as illustrated in FIGS. 1 and 3a. Some of the clocks needed in the registers and ALU of the strip are run in metal lines like the busses 16 (H1 and H4 are shared by adjacent cells in FIG. 3a) so these place further constraints on the density and make the strip concept and bus/register optimum placement more significant. Connections from MD to P or N busses are made by transistors located in the strip like a register and labelled MDtP, MDtN; since this logic requires eight parallel bits of transfer gates, tied to sets of eight parallel busses, and using CROM outputs 18 as controls, it fits well in the strip.

The ROM 11 fits alongside the strip to provide the microcode controls 18 in the control-intensive areas of the ALU and register/bus connections, and alongside the entry point circuit 21 where the address control and jump address lines 23, 24 are needed. The design is oriented toward the ROM 11 as the source of all controls rather than employing random logic for this purpose, and the chip layout of FIGS. 3 and 3a illustrates that the area of the chip is dominated by the RAM and combined ROM with their decoders, plus the strip containing a regular array of ALU/register bits, with little space occupied by other control logic. This design approach is enhanced by and enhances the microprogramming facility which makes the microcomputer 10 particularly easy to modify by changing the micro and macrocode, or changing the partitioning of the ROM 11 between micro and macrocode.

The microcomputer 10 may be modified at four levels, plus the mode control. The first level is changing the macro code or program in the ROM 11, and of course this is the most widely practiced modification. The macro code is defined by a single mask in the manufacturing process as set forth for example in U.S. Pat. Nos. 3,541,543, 4,208,726 or 4,230,504, assigned to Texas Instruments. By rewriting the macrocode, keeping the microinstruction and macroinstruction sets the same, a wide variety of different functions and operations are available. As the second level, the macroinstruction set of Table A may be supplemented (keeping the same microinstruction set of Tables B and C and adding some microinstructions), by using more of the ROM 11 for microcode store. The microcode in the ROM 11 is defined by a single mask in manufacture, the same mask that defines the macrocode, so physically it is just as easy to change the macro or microinstruction sets; however, the macro assemblers and micro assemblers (computer programs used as design aids for customers) then are different. A micro assembler can be written for all likely useful microstates, then only a selected number (256 or less in this example) chosen for a given version. In addition to these ways of altering the device 10, of course, the size of the ROM may be increased to allow more complex algorithmns to be programmed, utilizing the ROM for additional microcode or macrocode. The main feature of the invention, however, is that the ratio of micro to macrocode in ROM 11 may be changed to provide more or less complex micro- and/or macro-instruction sets.

SYSTEM TIMING

Figure 4:
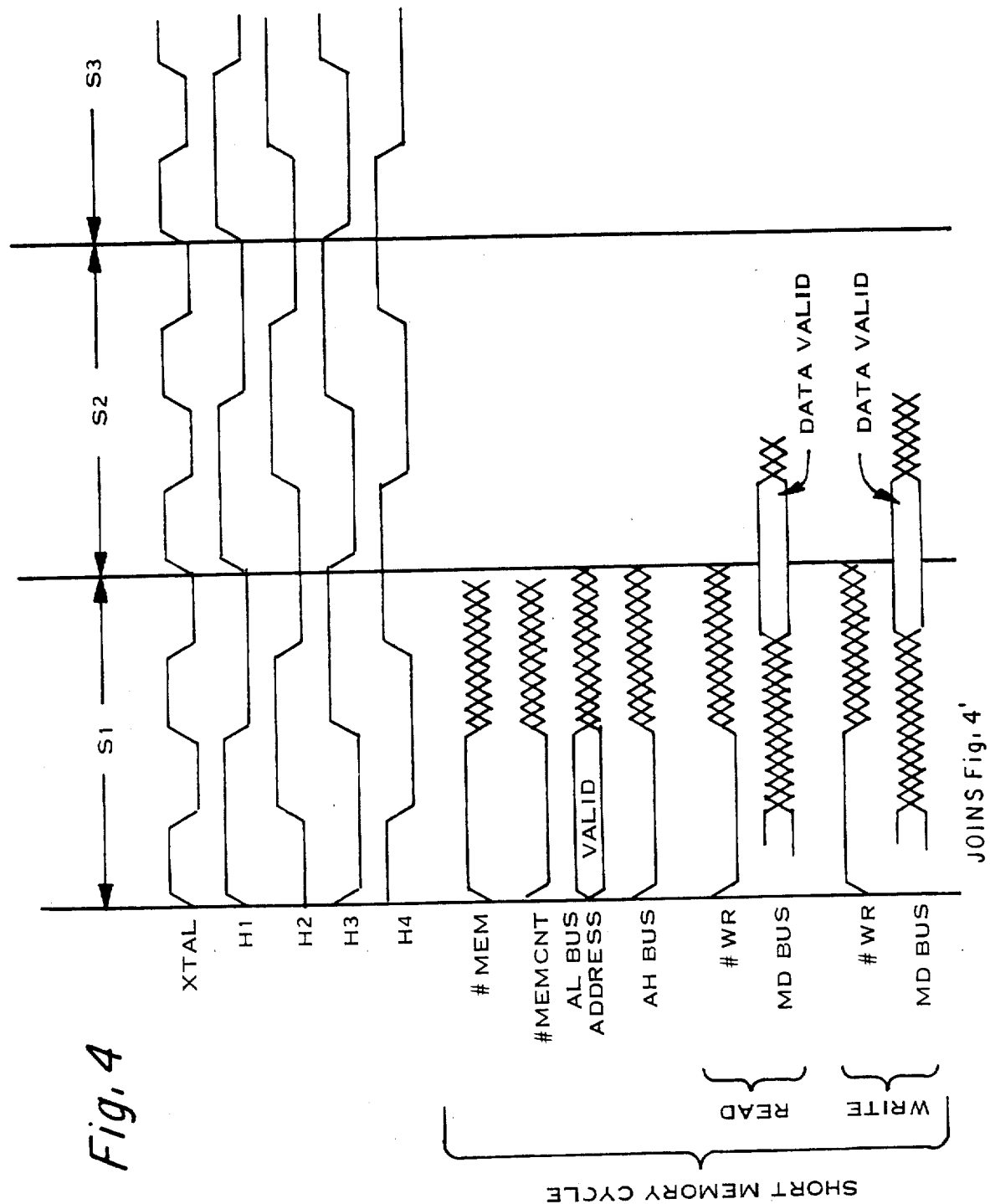
FIG. 4 is a timing diagram showing voltage vs. time for various events in operation of the system of FIG. 1.
Figure 4:
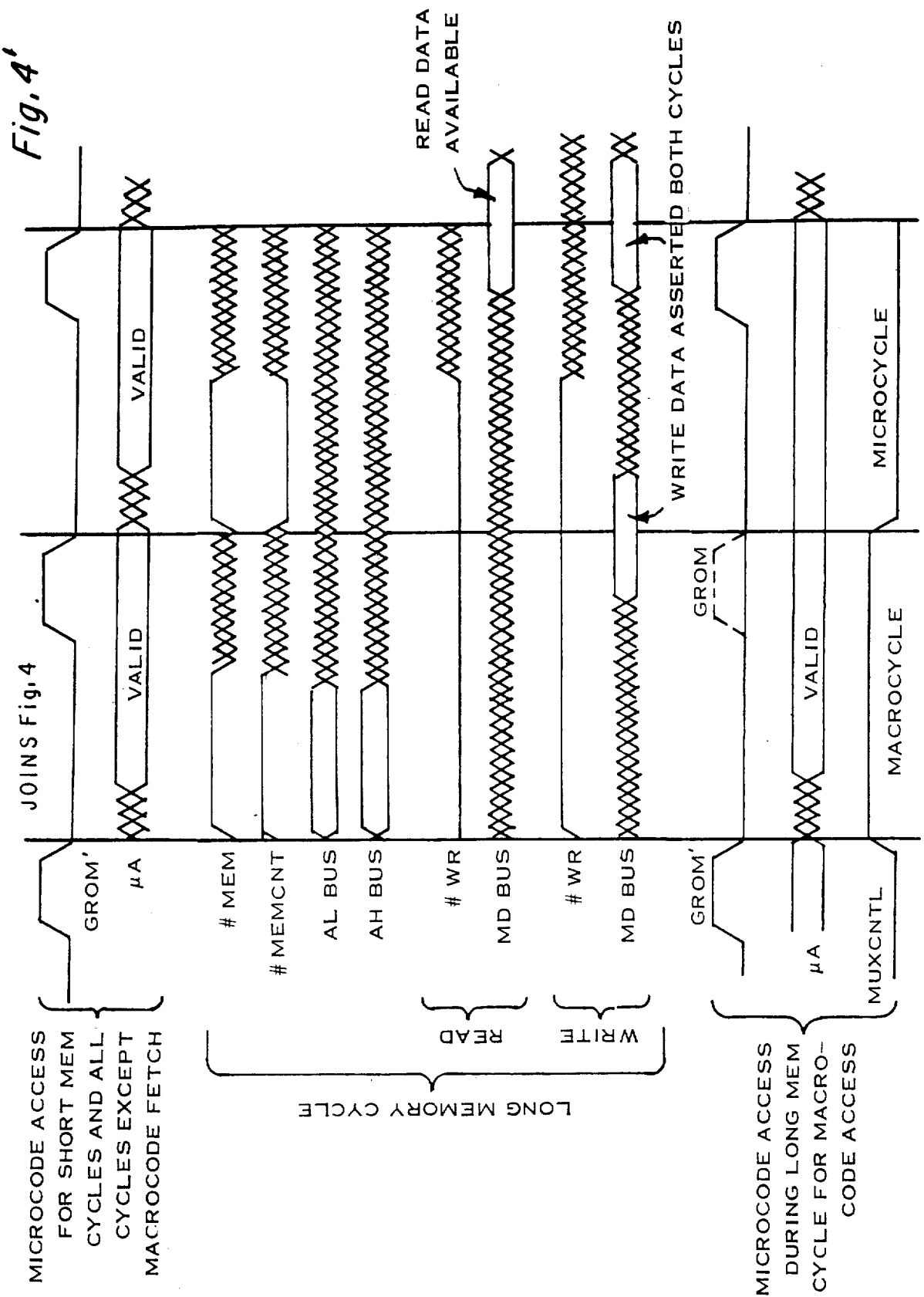

The microcomputer chip 10 operates from a basic clock frequency referred to as Xtal in FIG. 4. This frequency of about 5 MHz is supplied by an internal oscillator 33 controlled by an external crystal coupled to two pads labelled Xtal in FIG. 1 or 3. From the clock Xtal, clock generator circuitry 33 produces four basic overlapping half-cycle clocks H1, H2, H3 and H4 for each microinstruction cycle or state time S1, S2, etc., as seen in FIG. 4. Each state time equals two complete cycles of the clock Xtal. H4 overlaps two state times. Quarter cycles Q1, Q2, Q3 and Q4 are also defined in each state time.

Access to the RAM 12 occurs concurrently with the microcode accesses from the ROM 11. Short memory cycles to access the RAM 12 are completed in one state time such as S1 of FIG. 4; the control #MEMCNT is low and all bits of the AH bus are low during H1, and the RAM address is valid on the AL bus while #MEM is high. The write control #WR is high for write or low for read. The data accessed is then valid on the MD bus during H4 at the end of the cycle, extending over into the beginning of the next cycle, so the data may be loaded into the registers T or IR at the end of a cycle or gated onto the P or N busses at the beginning of the next cycle. All memory references to the register file RF in the RAM 12 use this short cycle.

All other memory references (i.e. to the on-chip ROM 11 for macrocode, the peripheral file PF, and extended memory in expansion modes) require two microinstruction cycles and are called long memory cycles as illustrated in FIG. 4. For long cycles, the memory continue command #MEMCNT is high during the first state time and low during the second. The memory command #MEM must be high during H1 of both cycles, and the address valid on AH and AL during H1 of the first cycle. For read, the write command #WR is low from the beginning of the first cycle through H1 of the second, and the data is valid during H4 beginning at the end of the second cycle. For long write, #WR is high, and the write data is gated onto the MD bus for H4 of both first and second cycles.

Within a given state time or microinstruction cycle, the address on the AH' and AL' busses becomes valid during H2. This address is based on the address loaded onto AH and AL during H1. In the ROM 11, the array is precharged during Q1 with all row or X lines going to Vss and all column or Y lines going to Vcc, then the ROM X address is gated into the array from decoder 11X beginning at Q2 and the ROM Y address coming valid at the beginning of Q2, so the ROM output is valid by Q4, either microcode or macrocode.

In executing the macroinstruction set of Table A, typically from five to ten microcode states such as S1, S2, etc., are needed for an instruction such as add, move, compare, and the like, depending upon the addressing mode, while multiply or divide require many more microcode states.

As seen in FIGS. 4 and 4a, the timing for microcode access to ROM 11 is different during a macrocode fetch. During short memory cycles and all other machine cycles except for macrocode fetch, a GROM' 10 command is asserted (MUXCNTL is low) and the decoders for the ROM 11 accept the uA address which was generated in entry point circuit 21 in the prior cycle. This is illustrated in the center of FIG. 4 and in FIG. 4a. The GROM command does not occur and the address from AH, AL does not activate the ROM 11 decoders 11x, and no output reaches MD via latches 11c. However, if #MEMCNT and an AH address in the FO to FF pages occurs, a MUXCNTL and a GROM command are asserted and the decoders 11x and 11y accept the AH', AL' address; this means a long memory cycle for macrocode fetch is occuring so the microcode access is modified as shown at the bottom of FIG. 4 and in FIG. 4a. The micro address uA output from entry point circuit 21 generated in the last cycle is valid during Q2 of the state previous to S1 and is gated into the ROM 11 decoders by GROM' during Q4 when MUXCNTL is low, producing the microcode output on lines 18 for executing in the S1 state. The address for the macrocode to be fetched becomes valid by Q2 on AL, AH and is latched in buffers 19. The micro address uA to be produced by this state S1 from lines 23, 24 is valid at S1Q1 to S2Q4 and is held by maintaining the lines 23, 24 valid by ltching in the buffers 11b due to the absence of a GROM' command, as seen in FIGS. 4 and 4a. This latched uA is used beginning at S2Q1 for the microaddress for the S3 state. During S2, the ROM 11 is accessed for the macrocode at the address produced on AL, AH during S1. The macrocode data is latched in an 8-bit latch 11c during S1, and the latch produces an 8-bit macrocode output to MD bus when GROM is asserted at S2Q4. The microcode executed in S2' of the macrocode fetch cycle is generated in response to microcode from state S1, and will usually increment PCH, and either load the data coming via MD from ROM 11 into IR or T, or else leave it on MD for use in the next state S3 as an address on AH or AL; this S2' microcode is fetched during S1 at the same time as the fetch of microcode for S2.

THE CPU

Figure 6A:
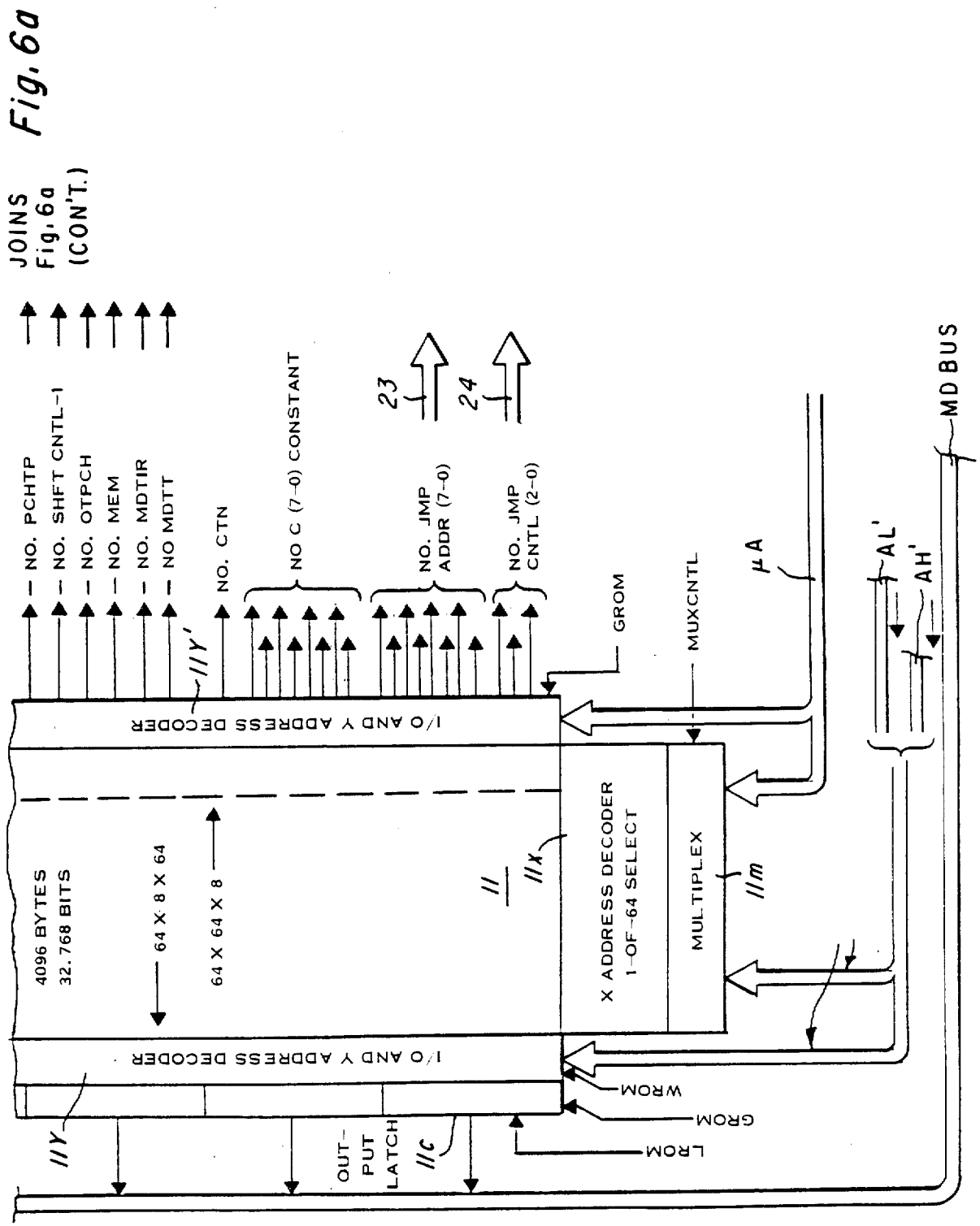
FIG. 6a is a detailed electrical diagram of the combined memory according to another embodiment.
Figure 6:
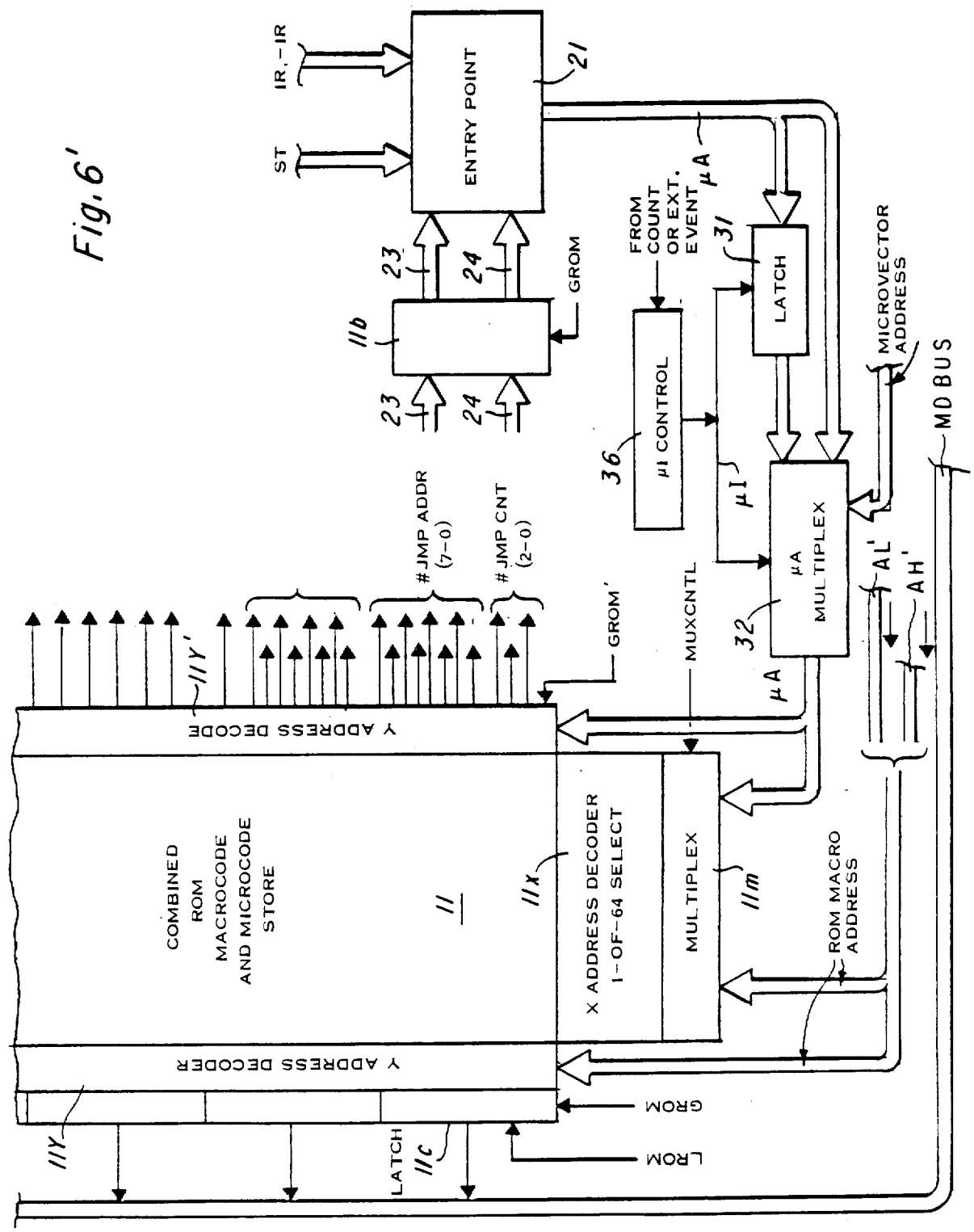
FIG. 6 is a detailed electrical diagram of the combined user ROM and control ROM used in the microcomputer of FIG. 1.

The CPU 13 in the microcomputer 10 of FIG. 1 consists of the ALU 14, the registers 15 and the busses 16 controlled by the microcode output of the ROM 11. In FIG. 5 a more detailed block diagram of the ALU and shifter S and the associated busses is shown, and FIG. 6 shows the ROM 11 and its microinstruction output bits 18. Control of the ALU and access to the busses is defined entirely by these microinstructions or bits 18, identified in FIG. 6 for the illustrative embodiment. An 8-bit micro address on lines µA from the entry point circuitry 21 contains a 6-bit X address on lines 21X going to the X decoder 11X via a multiplex circuit 11m, and also contains a 2-bit Y address on lines 21Y going to Y decoder 11y'. The X decoder 11X in the example selects one of 64 of the X lines in the array of ROM bits of the ROM 11. The Y decoder 11Y' selects 1-of-4 in each group of four Y lines (up to sixty-four groups available). Thus, for each 8-bit address on lines µA, a different "microinstruction" is output on the lines 18; a microinstruction may have any number of the lines 18 active, but usually a combination of only a few lines 18 is active for a given microinstruction. Each line 18 goes to a buffer 11b to drive a higher capacitance load than the array output Y line itself would allow, and to clocked gates and other such logic as needed. All microinstruction bits (control lines 18) in FIG. 6 and elsewhere in this description are referred to with a prefix "#". Some bits are active low and thus have a minus sign prefix, like #-OtST. In the microinstruction bits of FIG. 6, the letter "t" means "to", so #-OtST means "O bus to ST register", i.e., the gates connecting the O bus to the status register are activated by this bit. The eight bit jump address on the lines 23 is denoted #JmpAddr (7-0), while the 3-bit jump control on the lines 24 used for dispatch addressing is denoted #JmpCntl (2-0); these eleven bits are used in the entry point circuit 21 to generate the next micro address µA. All of the twenty bits 18 from #OtPCH down to #ONEtAH in FIG. 6 control the access to registers 15 from busses 16. Of these, #LowWrite0 and #LowWrite1 are decoded to produce pseudo-microinstructions OtPCL, OtMAL and OtSP. The bits #ONEtAL and #ONEtAH place a "1" on the AL or AH busses to generate the B register address 0001 or the PF page address 0100 (hex) in a microinstruction. Default to all 0's on AL and AH is the A register address in the register file. Connections between registers 15 and busses 16 are described in more detail below. The #MEMCNT bit is a "memory continue" control for long memory cycles; the RAM 12 can be accessed for read or write in one state time, but macrocode from the ROM 11 or access to peripherals in PF use two states, so for this reason control line #MEMCNT is active in the first state of every long memory cycle as seen in FIG. 4. #MEMCNT is used to form several other control signals, and always identifies the first or second state of a long memory cycle. The #MEM bit signifies a memory cycle and is active whenever ROM 11, RAM 12 or external memory is accessed. The #WR bit is a write command, so if #MEM and #WR are active a memory write condition exists, while if #MEM is active and #WR is not, a memory read condition exists. The #-LST signal is a load status command for ALU operations; the status register ST can also be loaded from O bus by the #-LST command. The ALU is controlled by nine bits labelled #ShiftCntl (3-0), #AluCntl (3-0) and #ABL; these controls will be described below in more detail.

The microintruction bits 18 are physically arranged in the order used in the strip and not necessarily in the order shown in FIG. 6, so that a control bit 18 is generated as close as possible to the point it is used in the strip.

As seen in FIG. 6, the microcode output includes microcode #uC bits such as #PCHtP', etc., which are applied to a buffer circuit 11b' which delays one state to generate the bits needed for microcode in the second state of a macrocode fetch (S2' in FIG. 4a). These bits are output from buffer 11b' on lines 18b and are the same as some of the bits 18. The second state of a macrocode fetch almost always does one of three things:

(1) the opcode part of the upcoming instruction is loaded into IR and PCH is incremented:

(2) an address byte is loaded onto MD for use via AH or AL during the next state, and PCH is incremented; or (3) the byte accessed from ROM 11 via MD is loaded into T register for use in a later machine state, and PCH is incremented.

To increment PCH, the ALU and micro carry controls are generated as explained below; very few active #μC bits are needed from buffer 11b' because virtually all of the bits 18 are zeros to define the necessary microcode. These operations are illustrated in the microinstruction sequences of Table C by the IAQ-0, IAQ-1 set, as well as BtoPPL-0, BtoPPL-1 and ItoA-0, ItoA-1, for example.

The part of the ROM output buffer 11b, receiving lines 23 and 24 is latched to hold the micro address μA for one state time whenever a GROM' command is asserted; thus, the next address generated from lines 23, 24 in S1 is held until the end of S2 to be used at the beginning of S3. The GROM' command is generated from the microcode bit #MEMCNT and the AH' bits.

FIG. 6 further shows an 8-bit constant output #C (7-0), and a #CtN command to apply the 8-bit constant to the N bus. This constant function is not used in the microinstructions of Table C, but could be used in place of immediate fetches for offsets and the like.

The microinstruction control of access to the registers 15, busses 16 and ALU 14 will now be described in reference to FIGS. 5 and 6.

P Bus

The P bus is one of the inputs to the ALU 14. It is called 'P' for "Positive", because in a subtract operation where the ALU 14 only computes P-N the P bus contains the positive, or left-hand, operand. Referring to FIG. 5, the P bus is loaded from the MD bus via sets of eight each of transistors 16a, 16b, and 16c, loaded from the AL bus via transistor 16d (FIG. 5), loaded from the PCH register via transistor 16e, or from the PCL register via transistor 16f. Any of the AL bus sources may be placed on the P bus by gating them on the AL bus and asserting the #PAL microinstruction bit going to the gates of transistors 16d, connecting the P bus to the AL bus. If no source is specified, i.e., "default", the P bus assumes the value of all zeros. The P bus is loaded in the beginning of a microinstruction cycle, on phase H1. All of the possible P bus sources and the microinstruction bits or outputs 18 needed for each are as follows:

| P Bus Source | Microinstruction Bit(s) |
|---|---|
| MD Bus | #MDtP |
| PCH Register | #PCHtP |
| PCL Register | #PCLtP |
| MAL Register | #MALtAL, #PAL |
| SP Register | #SPtAL, #PAL |
| 01 Constant | #ONEtAL, #PAL |

N Bus

The N bus is the other input to the ALU 14. It is called N for "negative", since on the ALU subtract operation it contains the negative, or right-hand, operand. It is loaded from the MD bus via sets of eight transistors 16a, 16g and 16h, loaded from the T/MAH register via transistor 16i, loaded from the IR register via transistor 16j, the status register ST via transistors 16k, or the 8-bit constant #C (7-0) when #CtN is asserted. It is understood, of course, that there are sets of eight of each of the transistors 16a to 16j, one for each of the eight bits of each bus and each register. Only four transistors in the set 16k are needed. The source of the N bus is indicated directly by a bit in the microinstruction word, as shown below. If the bit is '1', the source is gated onto the N bus. If no source is specified, the N bus assumes the value of all zeros. The N bus is also loaded at the beginning of a microinstruction cycle, on phase H1.

| N Bus Source | Microinstruction Bit(s) |
|---|---|
| MD Bus | #MDtN |
| T Register | #TtN |
| Status Register | #STtN |
| IR Register | #IRtN |
| Constant | #CtN |

AL Bus

The AL or address low bus holds the lower eight bits of all memory addresses. This comprises the entire address for references to the register file RF in RAM 12, or the lower byte for references to the peripheral file PF, on-chip ROM 11 and extended memory in expansion modes. The AL bus is loaded during the phase H1. The sources of the AL bus are the MAL register via transistor 16n, the SP register via transistor 16p, or the constant 01 via transistor 16q. The constant is provided to efficiently address RAM location 01 which is the "B" register. If no source is specified, "default", the AL bus assumes the value 00 which is the A register in the RAM.

The AL bus may also be connected to the P bus via transistor 16d by asserting the #PAL microinstruction bit. in this manner, the AL bus sources (MAL, SP, and the constant 01) may be gated onto the AL bus and then onto the P bus to be operated on by the ALU. Likewise, the P bus sources (PCH, PCL, and MD bus contents) may be gated onto the P bus and then onto the AL bus via transistors 16d and #PAL to serve as low order address lines. The MD bus contents moved in this case are those present at the start of the microinstruction. In summary, all of the possible sources of the AL bus are listed below:

| AL Bus Source | Microinstruction Bit(s) |
|---|---|
| MAL Register | #MALtAL |
| SP Register | #SPtAL |
| PCL Register | #PCLtP, #PAL |
| PCH Register | #PCHtP, #PAL |
| MD Bus | #MDtP, #PAL |
| 01 Constant | #ONEtAL |

AH Bus

The 8-bit AH (Address High) bus contains the high-order byte of the address referenced by the CPU, loaded during H1. It may be loaded with the contents of the PCH register via transistors 16r, the T/MAH register via transistors 16s, or the constant 01 via transistor 16t. The high byte of the program counter is usually transferred to the buffers 19 for use in the memory control and circuitry, and the T/MAH register is used to hold the high byte of other memory addresses for use in a later microinstruction state. The constant 01 is provided to efficiently access addresses in the peripheral file in this embodiment (i.e. page-one addresses of the form 01xx in hex). If no source is explicitly specified in the microinstruction word, "default", the AH bus takes on the value 00; this is useful for referencing the on-chip register file RF in RAM 12. The sources of the AH bus are summarized below:

| AH Bus Source | Microinstruction Bit(s) |
| --- | --- |
| PCH Register | #PCHtAH |
| T/MAH Register | #TtAH |
| 01 Constant | #ONEtAH |

O Bus

The O or output bus always contains the output of the ALU 14 and shifter S combination. As seen in FIG. 5, the O bus contents may be loaded onto the MD bus via transistors 16u and OtM, or into the PCH, PCL, MAL, or SP registers via sets of eight each of transistors 15a to 15d, respectively. The status register ST is loaded from O bus by the true-low microinstruction bit #-OtST and four transistors 15e. The PCH register is loaded by the true-high microinstruction bit #OtPCH. The load signals for the other destination registers (MAL, PCL, SP) are encoded in the two microinstruction bits #Low-Write(1-0), according to the combinations of #Low-Write(1-0) below:

| #LowWrite (1) | (0) | O Bus Destination | Pseudo-Microinstruction Bit |
| --- | --- | --- | --- |
| 0 | 0 | No Write | |
| 0 | 1 | MAL Register | OtMAL |
| 1 | 0 | PCL Register | OtPAL |
| 1 | 1 | SP Register | OtSP |

There is no microinstruction bit that directly loads the MD bus from the O bus, because the MD bus contents are under control of the memory control circuitry by the OtM signal which is asserted on every memory write cycle (on-chip or extended memory), and on the first state of every long memory cycle.

The O bus may be gated onto the MD bus via a set of eight transistors 16u by specifying the appropriate values of the #MEMCNT and #WR microinstruction bits so that OtM will be asserted. The O bus contents may then be loaded into the T/MAH or IR register from the MD bus via transistors 15f and 15g.

In summary, the destinations of the O bus are described below:

| O Bus Destination | Microinstruction Bit(s) |
| --- | --- |
| ST Register | #-OtST |
| PCH Register | #OtPCH |
| PCL Register | OtPCL |
| MAL Register | OtMAL |
| SP Register | OtSP |
| T Register | #WR, #MDtT |
| IR Register | #WR, #MDtIR |
| Short Mem Cycle | #WR, #MEM |
| Long Mem, Cycle 1 | #MEMCNT, #WR, #MEM |
| Long Mem, Cycle 2 | #WR, #MEM |

The O bus is loaded during phase H4 of the microinstruction cycle. It contains the result of the ALU and shifters operations specified in the current microinstruction.

MD Bus

The memory data bus MD is a bidirectional bus that transfer data to and from the CPU 13. Data is valid on MD during phase H4 of the microinstruction cycle, which spans two microinstructions. For example, data may be read via transistors 16b from the MD bus onto the P bus at the beginning of a cycle H1 and the ALU results then loaded back onto MD via transistors 16u at the end of the cycle at H4.

At the beginning of a cycle, the MD bus contents may be loaded on the P or N busses via transistors 16c or 16h, as described earlier. Thus the results of the previous microinstruction (or the data read from memory by it), may be loaded into the ALU 14.

At the end of a cycle, the MD bus may be loaded in one of three ways;

(1) The O bus contents may be gated into the MD bus via transistor 16u and OtM;

(2) The on-chip RAM 12 or ROM 11 may place data onto the MD bus; or (3) controls 27, 28 place data onto the MD bus from ports A, B, C or D, or other peripheral file registers, etc.

The MD bus contents are controlled by the memory control circuitry which sends the OtM signal to the CPU to signal loading this bus from the O bus. The CPU 13 requests use of the MD bus by asserting combinations of the #MEM, #MEMCNT, and #WR signals, as outlined above. The group decode and memory control 27, 28 sends signals to the on-chip ROM 11 and RAM 12 and the ports to control their accesses to the MD bus.

The timing of read and write accesses to memory is explained with reference to FIG. 4. For short memory reads, the data on MD bus is available at the end of the same microinstruction cycle that initiated the read. Data on MD may be loaded into the T/MAH or IR registers during that microinstruction by specifying the #MDtT or #-MDtIR bits, respectively, or may be loaded into the P or N bus on the next microinstruction by specifying the #MDtP or #MDtN bits in the next microinstruction. For short memory cycle writes, the O bus data is placed on the MD bus, and the #WR control asserted. For long memory reads, the desired address is placed on the AH and AL lines, and the #MEMCNT command asserted in the first of the two cycles required. At the end of the second cycle, the data is available on the MD bus. By a command "Load Address", LDADDR, the memory address on AL and AH is latched in buffers 19 going to AL' and AH' on the first cycle, and need not be asserted on the second cycle of a long memory cycle. For long memory writes, the address is specified in the first cycle, and the data is placed on the MD bus for the first and second cycles. Table H summarizes the memory controls and MD bus contents.

In summary, the destinations of the MD bus in the CPU 13 are described below:

| MD Bus Destination | When Loaded | Microinstruction Bit(s) |
| --- | --- | --- |
| T/MAH Register | End of Cycle | #MDtT |
| IR Register | End of Cycle | #-MDtIR |
| P Bus | Start of Cycle | #MDtP |
| N Bus | Start of Cycle | #MDtN |

The MD, P, N, AH, AL and O busses are precharged on H2 or H3 by transistors 16v as indicated.

ALU Operation

The arithmetic logic unit or ALU 14 as seen in block form in FIG. 5 accepts as inputs the values on the P bus and N bus and outputs its result to the shifter S during H4 of every machine state. Its operation is controlled by #AluCntl(3-0) bits inputted via buffers 17b, and by the #ABL bit, both from the current microinstruction. The ALU operates on the values loaded on the P and N busses during H1 of the current microinstruction, and produces an 8-bit ALU output which is input to the shifter S, and also produces two carry bits. Cout, an arithmetic full byte carry bit, and Dout, a 4th-bit half-carry bit used by decimal adjust circuitry in binary coded decimal operations if BCD circuitry is included. The available operations of the ALU are defined in the Table D.

| #AluCntl | | | | | ALU Output | |
|---|---|---|---|---|---|---|
| 3 | 2 | 1 | 0 | #ABL | to Shifter S | Operations |
| 0 | 0 | 0 | 0 | 0 | P + N + Cin | Add |
| 0 | 0 | 0 | 0 | 1 | P XNOR N | Exclusive NOR |
| 0 | 0 | 0 | 1 | 1 | P AND N | AND |
| 0 | 0 | 1 | 0 | 1 | (NOT P) OR N | OR |
| 0 | 0 | 1 | 1 | 1 | N | Pass N |
| 0 | 1 | 0 | 0 | 1 | P OR (NOT N) | OR |
| 0 | 1 | 0 | 1 | 1 | P | Pass P |
| 0 | 1 | 1 | 0 | 1 | FF(hex) | all 1's |
| 0 | 1 | 1 | 1 | 1 | P OR N | OR |
| 1 | 0 | 0 | 0 | 1 | P NOR N | NOR |
| 1 | 0 | 0 | 1 | 1 | 00 | All 0's |
| 1 | 0 | 1 | 0 | 1 | NOT P | Invert P |
| 1 | 0 | 1 | 1 | 1 | (NOT P) AND N | AND |
| 1 | 1 | 0 | 0 | 1 | NOT N | Invert N |
| 1 | 1 | 0 | 1 | 1 | P AND (NOT N) | AND |
| 1 | 1 | 1 | 0 | 1 | P NAND N | NAND |
| 1 | 1 | 1 | 1 | 0 | P − N − 1 + Cin | Subtract |
| 1 | 1 | 1 | 1 | 1 | P XOR N | Exclusive OR |

The carry-in bit Cin of the ALU 14 is specified by the #ShiftCntl(3-0) bits 18 of the microinstruction. For operations requiring no shifting of the ALU contents, #ShiftCntl(3,2) bits are zero and the possible carry-in bits are defined:

| #ShiftCntl | | | | ALU Carry In |
|---|---|---|---|---|
| 3 | 2 | 1 | 0 | |
| 0 | 0 | 0 | 0 | 0 |
| 0 | 0 | 0 | 1 | 1 |
| 0 | 0 | 1 | 0 | uC; micro carry bit |
| 0 | 0 | 1 | 1 | STC; status carry bit |

The micro carry bit uC is the carry out Cout from the ALU operation of the immediately preceding microinstruction. This is not the same as the shift-out bit Sout from the shifter S operation of the previous microinstruction. The status carry bit STC is the carry bit of the status register ST.

The first section of each ALU bit produces a "generate" and/or a "propagate". The arithmetic carry-out Cout bit from the ALU 14 is generated and/or propagated, depending upon #ABL, and if #ABL='1' there is a carry-out during an add or subtract operation in the ALU. For the add operation, Cout=1 indicates there was a carry, i.e. the sum of the (unsigned) operands exceed $2^8$. For the subtract operation, Cout=0 indicates there was a borrow, i.e., the P operand was lower than the N operand (unsigned). For all other operations (i.e.

logical operations), Cout is equal to 0. Cout is sent to the status register ST circuitry for possible loading into STC, the status carry bit.

As an example of ALU operation, an add operation with zero carry in (#AluCntl and #ShiftCntl all zeros) will cause the ALU to calculate the sum of the P and N bus contents. To calculate the difference between the P and N bus contents, #AluCntl=1111 and #ShiftCntl=0001. A '1' must be carried in for this subtract since no borrow was desired. As a complete example, the following two microinstructions read the current byte addressed by the PCL and PCH registers, place it in the T/MAH register, and increment the PCL and PCH registers:

| Bit(s) | Operations(s) |
|---|---|
| First Microinstruction Cycle (Macrocode Fetch S2 of FIG. 4a): | |
| #PCLtP, #PAL | Place PCL on AL bus via P bus |
| #PCHtAH | Place PCH on AH bus |
| none (default) | Place all zeros on N bus |
| #AluCntl=0000, #ShiftCntl=0001 | Adds P and N with Carry in (sets micro carry uC) to increment PCL by 1 |
| #LowWrite=10 (OtPCL) | ALU output goes back to PCL with no shift, via 0 bus |
| #MEMCNT, #MEM | 1st cycle of long read |
| #μC bits | Selected to produce microcode of second cycle |
| #Jump Addr XXXXXXX | This micro address is latched |
| #Jump Cntl XXXX | in 11b for use in third microinstruction cycle S3 |
| Second Microinstruction cycle (S2' in FIG. 4a; Microcode generated by #μC bits in previous micro cycle): | |
| none (don't care-AH,AH) | The contents of AH and AL busses were latched in buffers 19 on the first cycle |
| #PCHtP | Place contents of PCH register on P bus |
| none (default) for N | Place all zeros on N bus |
| #AluCntl=0000, #ShiftCntl=0010 | Add the micro carry uC from the PCL increment in first cycle |
| #OtPCH | ALU output via 0 bus (no shift) is placed back in PCH register |
| #MEM | Memory read continues |
| #MDtT | Place the byte read into the T/MAH register via MD bus |

Notice that an increment was done in the first cycle by using an ALU carry-in of '1'. The second cycle incremented the high byte of the program counter in PCH only if the micro carry bit (uC) generated in the first cycle was '1'. Only six positive bits 18 are generated by #μC bits for the second cycle.

Shifter Operation

The shifter S of FIG. 5 performs a variety of 1-bit shift operations on the 8-bit output of the ALU 14. The #ShiftCntl(3-0) bits on control lines 18 to the ALU control the following entities:

(1) the ALU carry in bit Cin;
(2) the shift direction left or right (or straight, no shift); and
(3) the bit shifted in.

The following describes the various combinations of shift control lines:

| #ShiftCntl | | | | ALU Carry In | Shift Direction | Shift-In Bit |
|---|---|---|---|---|---|---|
| 3 | 2 | 1 | 0 | | | |
| 0 | 0 | 0 | 0 | 0 | | — |
| 0 | 0 | 0 | 1 | 1 | No | — |
| 0 | 0 | 1 | 0 | uC | Shift | — |
| 0 | 0 | 1 | 1 | STC | | — |
| 0 | 1 | 0 | 0 | 1 | | ALU(7) |
| 0 | 1 | 0 | 1 | 0 | Shift | ALU(7) |
| 0 | 1 | 1 | 0 | 1 | Left | STC |
| 0 | 1 | 1 | 1 | 0 | | STC |
| 1 | 0 | 0 | 0 | 1 | | ALU(0) |
| 1 | 0 | 0 | 1 | 0 | Shift | ALU(0) |
| 1 | 0 | 1 | 0 | 1 | Right | STC |
| 1 | 0 | 1 | 1 | 0 | | STC |
| 1 | 1 | x | x | x | Invalid | — |

For #ShiftCntl=00xx, no shifting is performed, so the ALU output bits go directly as inputs to the O bus; the ALU carry-in bit Cin is as described in the ALU description, above. For #ShiftCntl=010X, the ALU output is rotated left, with the least significant bit, ALU(1), shifted in. For #ShiftCntl=011x, the ALU output is rotated left through the status carry bit, STC. For #ShiftCntl=100x, the ALU output is rotated right, and for #ShiftCntl=101x, the output is rotated right through the status carry bit in ST. In each case, #ShiftCntl(1) indicated the ALU carry-in bit.

The shift-out bit Sout shifted out in a rotate instruction is sent to the status register ST. It will be loaded in ST as the new status carry bit STC if the #-LST microinstruction bit is set.

IR Register

The 8-bit instruction register IR is a register intended to hold the current machine opcode (one of the macrocode words or opcodes from ROM 11 via decode 11y and MD bus, i.e. the first bytes of the Table A instructions). The opcode is loaded through a set of eight transistors 15g (FIG. 5) from the MD bus by the #-MDtIR bit in a microinstruction. IR may be loaded into the N bus with the #IRtN bit through transistors 16j. The output of IR, including true outputs IR0 to IR7 and complement outputs −IR0 to −IR7, primarily is used in the entry point circuit 21, FIG. 6.

Status Register

The status register ST, FIG. 5, is a 4-bit register indicating various conditions of the machine. Each bit of the status register has a special meaning. Only bits 4–7 of ST are used in this example, but other embodiments could use additional bits.

STC or the "C" bit referred to in instructions of Table A is the status carry bit. It holds either the carry-out Cout of the ALU 14, the shift-out of the shifter S, or the decimal arithmetic carry-out Dout. STSB is the status sign bit ("N" in Table A), and contains the most significant bit of the O bus contents 0(7). STEZ is the status equal to zero bit, and contains a '1' when all bits of the O bus are zero which is detected by logic in shifter S. STINT is the status interrupt enable bit.

The status register bits may be modified in one of two ways:

(1) by asserting #-OtST, all bits in ST may be replaced by the contents of the O bus via transistors 15e; or (2) by asserting #-LST the STC, STSB, and STEZ bits may be set according to their particular input circuitry via transistors 15n (the STINT bit is unaffected in this case).

When the #-LST signal is asserted, the STC bit will be loaded from one of three sources:

(1) from the ALU arithmetic carry-out bit Cout. Cout is the carry/borrow bit generated by the ALU on arithmetic operations. Cout is loaded if no shifter S operation is specified, i.e. #ShiftCntl=00xx.

(2) from the shifter S shift-out bit Sout. This is the bit shifted out on shifter operations. If a shifter operation is specified (i.e. #ShiftCntl other than 00xx), then Sout is loaded into the carry bit.

(3) from a BCD decimal carry/borrow-out bit computed by decimal adjust circuitry if used.

The status interrupt enable STINT bit may only be modified by loading the O bus contents into the status register ST with #OtST is asserted. The STINT bit corresponds to bit-4 of the O bus in this case. STINT is output from the CPU 13 to the control circuitry for interrupts. If STINT=0, the control circuitry will not pass on an interrupt to the CPU via an IACT control line. If STINT=1, the IACT control is asserted on an interrupt. By dispatching on the IACT bit, the microcode is able to test for interrupts as will be explained.

All of the status bits may be loaded from the status register ST to the N bus via transistors 16k. The STEZ, STSB and STC bits go to the entry point circuit 21.

MEMORY AND PERIPHERY CONTROL

Figure 7:
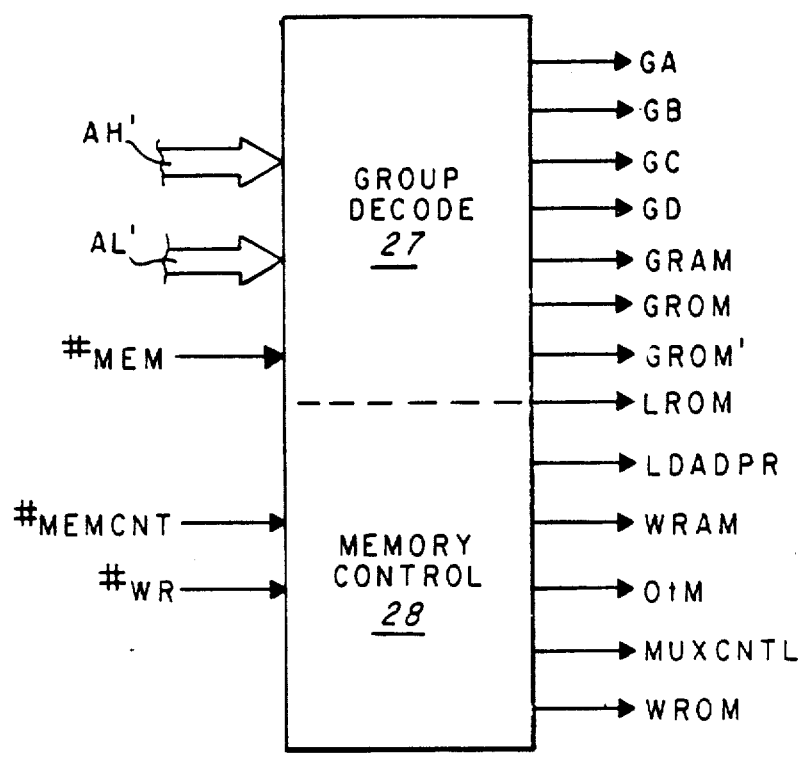
FIG. 7 is an electrical diagram of the group decode and memory control circuitry of the system of FIG. 1.

Referring to FIG. 7, the group decode circuit 27 and memory control circuit 28 is responsive to the address busses AH' and AL' and three of the microcode bits #MEM, MEMCNT and #WR, plus the clocks of FIG. 4, to produce certain control signals.

The ports A, B, C or D are selected by signals GA, GB, GC or GD, respectively, in response to the address AH' and AL'; as seen in FIG. 2a; data for ports A, B, C or D is at locations 0104, 0106 0108 and 010A (even addresses), so one of these ports is activated by one of these addresses, allowing access to MD bus. To set direction of C or D ports, the lowest order address bit-0 of AL' is also used (adds one to 0108 or 010A) to access the direction register part of ports C or D. A "1" written into the direction register bit sets this bit of the port as output, a "0" sets the bit as input.

The RAM 12 is accessed by a GRAM command produced by the group decode 27 in response to a 0000 to 001F (page 0) address on AL' and AH', and read or write is selected by presence or absence of a "write RAM" control WRAM generated in memory control 28 from the #WR microcode.

The ROM 11 is selected for macrocode access by GROM from group decode 27 whenever the address on AH' and AL' is in the F000 to FFFF range and the first cycle of a long memory cycle is indicated as in FIGS. 4 and 4a. GROM activates the latch 11c at the Y decode and output circuit 11Y to allow an 8-bit macrocode word to be loaded onto MD bus from ROM 11. The MUXCNTL command input to the multiplexer 11m when high allows the X address from the AH' and AL' busses to be used in the X address decoder 11X, rather than from the μA bus when MUXCNTL is low.

The ROM 11 is selected for microcode access by the GROM' command which occurs during every machine state except when MEMCNT and the conditions for GROM occur, i.e., except during the first state of a long memory cycle with addresses F000 to FFFF (macrocode fetch). The X decoder 11X to accepts the μA address via multiplexer 11m and GROM' causes the decoder/output circuit 11Y' to be activated and allows a multibit microinstruction output on lines 18 during every machine cycle except macrocode fetch. The MUXCNTL command goes high during S2 of FIG. 4a to cause the AL', AH' address to reach the decoder 11x, instead of the μA.

The circuitry of FIG. 7 also generates a load address command LDADDR to cause the addresses on AH and AL to be loaded into the address buffers 19. This occurs in every machine state except the second state of a long memory cycle. The OtM command is generated in response to the conditions discussed with reference to Table H and FIG. 5. The command LROM to latch the ROM 11 macrocode output in latch 11c is generated by the same conditions which produce GROM and MUXCNTL, but the timing is different; LROM occurs during S2Q4 of FIG. 4a. In another embodiment a "write ROM" command WROM is provided where part of the memory 11 is of the read/write type, as will be explained.

MICROINSTRUCTION SEQUENCE CONTROL WITH DISPATCHING

The micro architecture of the CPU including entry point circuitry 21 and microcode outputs of the ROM 11 is designed to dispatch on various subfields of the IR contents, providing for the execution of an appropriate sequence of microcode as in the logic flow chart of FIGS. 8a-8j and Table B and C for each macrocode or machine opcode of Table A instruction. FIG. 9 shows a map of the opcodes of Table A. The opcode or macrocode loaded into IR may be considered to have two possible formats, and the entry point circuit 21 responds to these formats to produce the micro address μA:

Format 0 is indicated by a '0' in IR(7), the most significant bit of the IR register (all opcodes with 0000 to 0111 for their most significant half). In this format, bits IR(6-4) form a 3-bit "group" field and bits IR(3-0) form a 4-bit "function" field. These are the basic arithmetic and logic dual-operand instructions, for the most part.

Format 1 is indicated by a '1' in IR(7) (all opcodes with 1000 to 1111 for MSH). In this format, bits IR(6-3) form a 4-bit "group" field and bits IR(2-0) form a 3-bit "function" field. These include the peripheral page instructions, single operand instructions, special addressing (direct, indirect, indexed) and traps.

Figures 8A, 8B:
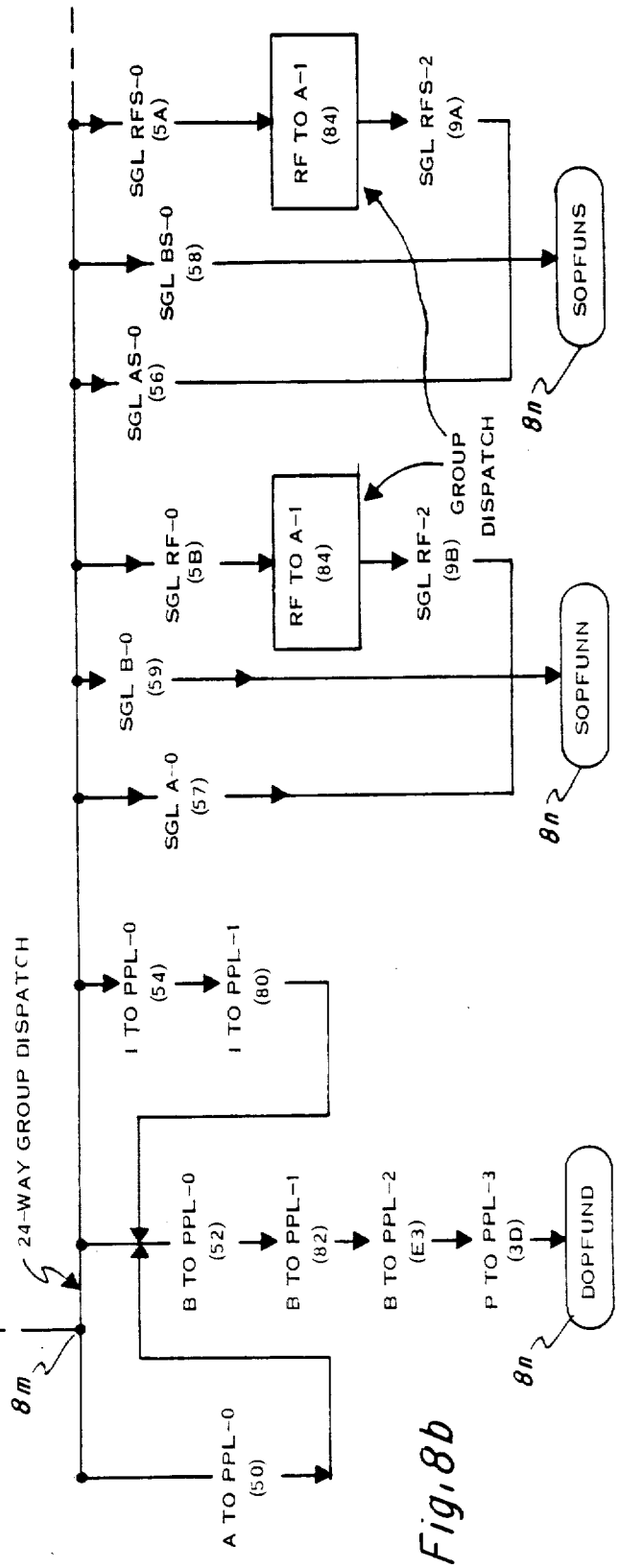

The terms "group" and "function" refer to logic subsets of machine opcodes. In the example shown, the group field in an opcode indicates the addressing mode of the instruction (i.e. which "group" in FIGS. 8a-8j to go to on the first dispatch at decision point 8m, summarized in Table E), and the function field indicates the arithmetic or logical operation performed on the operands on the second dispatch at decision points 8m of FIG. 8, after the operands are fetched. Table F shows an example of function dispatch for the DOPFUN functions. The microarchitecture allows significant sharing of microinstructions among opcodes within the same group or function. In the microcode for the illustrated embodiment, for instance, all opcodes of the format 1 share a microcode state RFtoA-1 which fetches the A register and a general RF register, as seen in FIG. 8b.

Dispatching on an IR subfield may be performed on one of the first microinstructions after the IR is loaded (e.g., at IAQ-2). Thereafter, dispatching may be performed by microinstructions up to and including the next one that reloads the IR. If no dispatching is required during executing a given opcode, then the IR may be used as a general purpose 8-bit register.

The flow of control between microinstructions is determined by how the next microinstruction address μA to ROM 11 is generated in the entry point circuit, in both conditional and unconditional branching.

The microinstructions of Tables B and C, stored in the combined ROM 11 on the chip, may be characterized as horizontally microprogrammed in that each microinstruction indicates the address at which the next microinstruction to be executed is located. The next micro-address μA is specified by two fields of the CROM output 18 (lines 23 and 24):

(1) #JumpAddr(7-0), an 8-bit field indicating a base address in ROM 11; and
(2) #JmpCntl(2-0), a 3-bit code indicating one of eight dispatch offsets from the address of #JmpAddr(7-0).

If #JmpCntl(2-0)='000', then the #JmpAddr field is simply used directly as the address of the next microinstruction; an example in FIG. 8b is the BtoPPL-0 through BtoPPl-3 series. If #JmpCntl(2-0) is nonzero, it indicates which control lines will replace the low order bits of #JmpAddr, and so form the next micro-address μA. This technique is refered to as dispatching in application Ser. No. 253,624, and is readily implemented in MOS technology.

In the example device, a maximum of 256 microinstructions are possible, each consisting of a multi-bit word (outputs 18) in FIG. 6, but a total of only about 150 microinstructions are required to implement an example instruction set of Table A, and so only about 150 8-byte wide words of the ROM are used. Each of these is a 64-bit word, containing a possible sixty-four outputs 18 of microinstruction control, although fewer bits may actually be used. Additional microcoded functions for the device (new macroinstructions not in Table A) may be added by implementing a subset of the Table A instruction set, or replacing it entirely. The functions executed may be expanded by using more of the ROM 11 for microcode.

The dispatch field bits actually replace the low order address bits in the #JmpAddr(7-0) field; they are not ORed with them. For example, suppose #JmpAddr was specified to be 00010001, and the #JmpCntl(2-0) lines set to '110', indicating a dispatch on STC, the status carry bit input. If STC were '0' the next micro address would be 00010000. The possible dispatch fields implemented in the entry point circuit are summarized in Table G, and each of the displatch possibilities is further explained below; however, the microinstruction sequences for the illustrative instruction set will be examined.

Figure 8C:
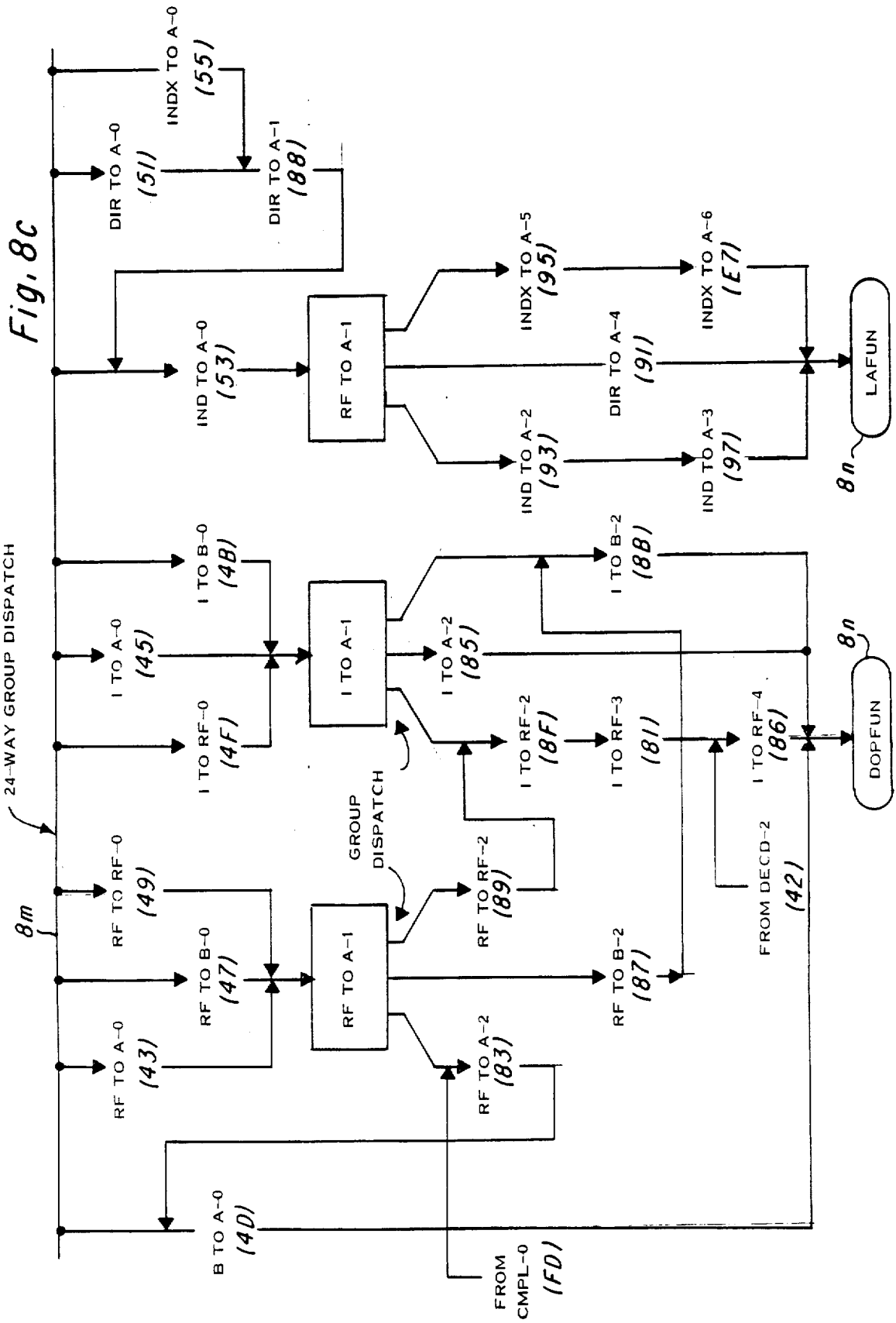
Figure 8F:
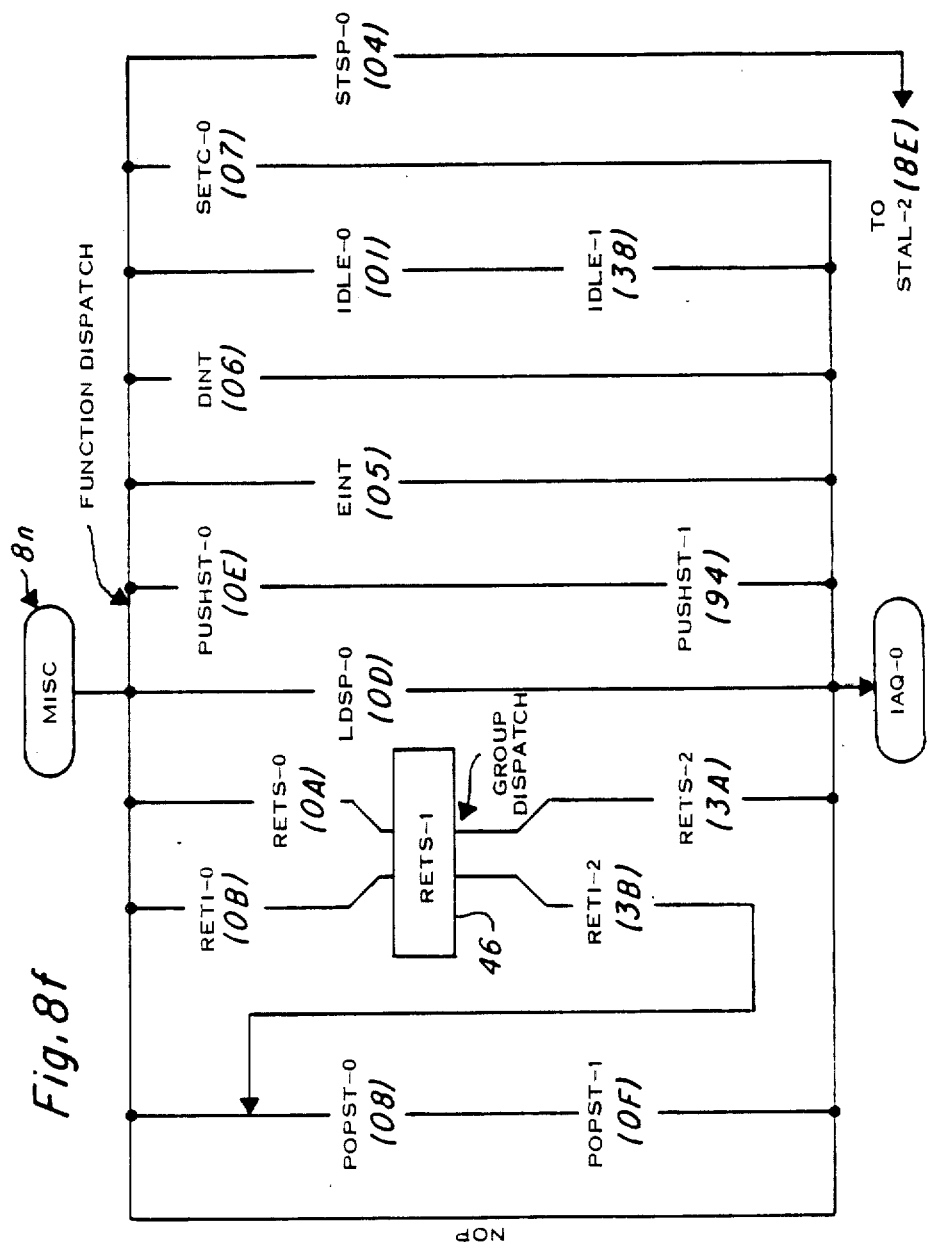
Figure 8G:
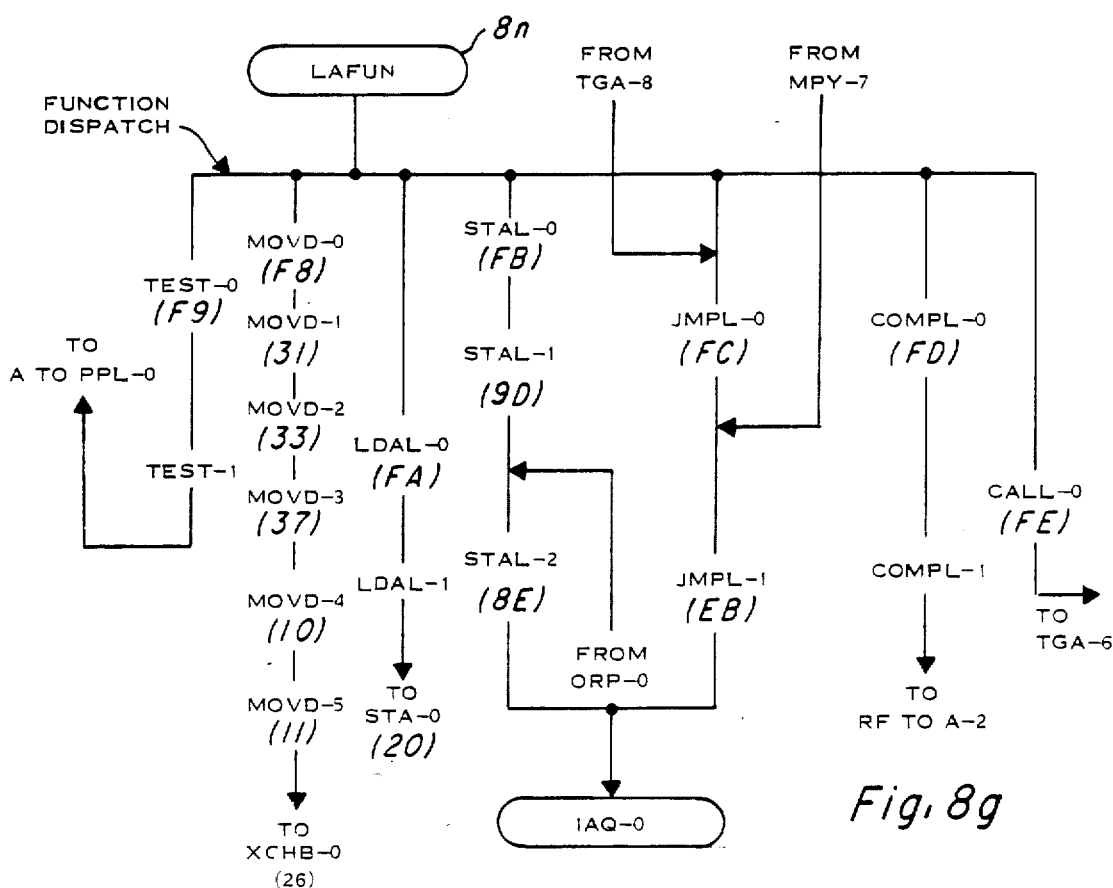
Figure 8H:
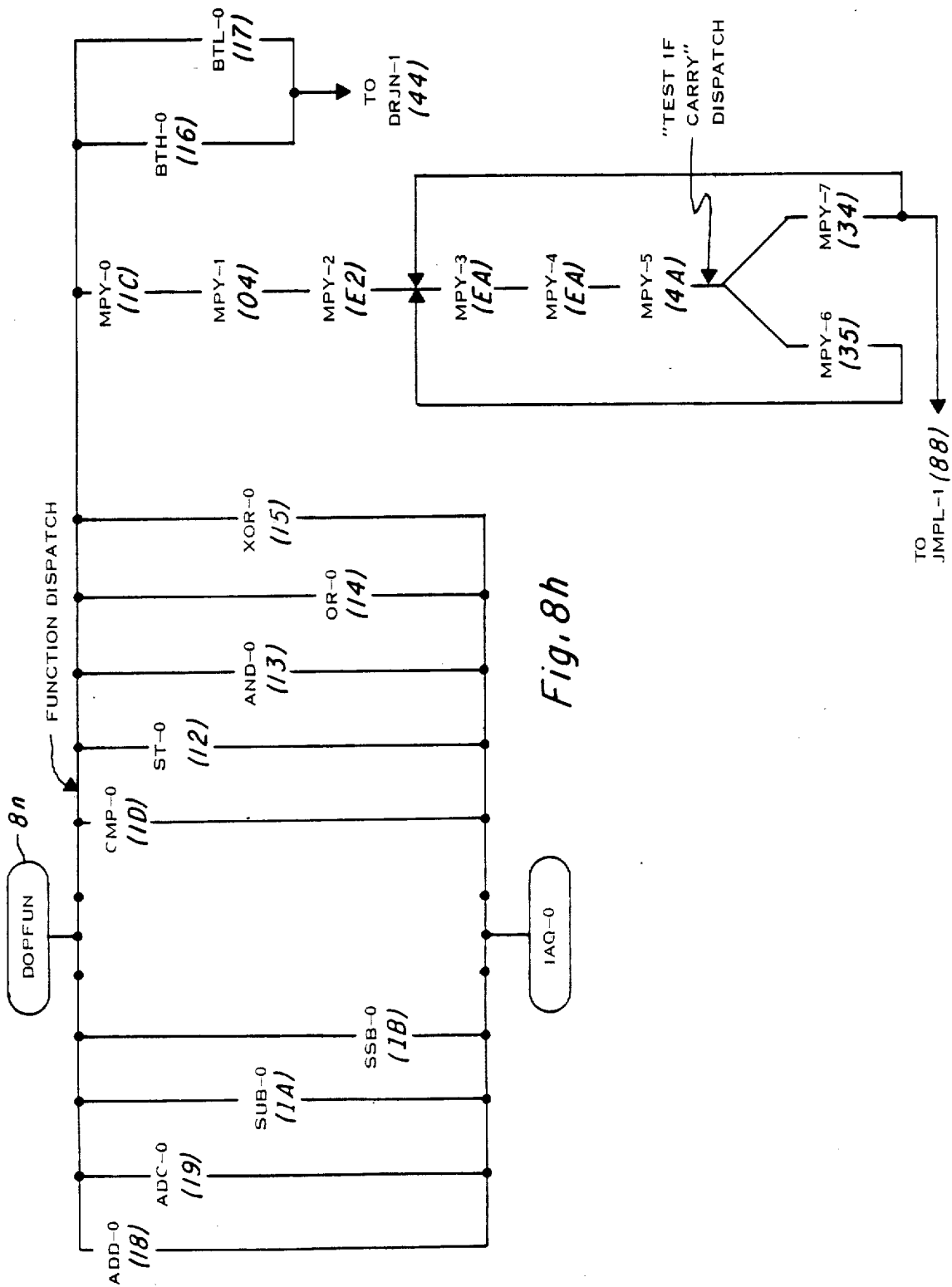

In FIGS. 8a-8j, a flow chart of the microinstructions of Tables B and C as executed to implement the macroinstruction set of Table A is illustrated. FIG. 8 references microinstructions of Table C by name, as well as the ROM micro addresses μA of Table C in hex. FIG. 8 and Tables B and C are only partial listings of the microinstruction set, given as examples. Execution of each of the Table A macroinstructions begins with the instruction acquisition IAQ sequence of FIG. 8, starting at IAQ-0. Assuming no interrupt or reset is asserted, a group dispatch is performed on the group field at IAQ-2, selecting one of twenty-four addresses for one of the operand addressing modes or for miscellaneous, jumps or traps. These twenty-four alternatives are shown in FIGS. 8b-8d. Note that some of the operand fetch microinstructions are shared by several addressing modes, particularly RFtoA-1 which is used by eight different modes or paths, or "immediate-to-A", ItoA-1, used in five different paths. All four of the B-register-to-peripheral-page BtoPPL microstates are used in the A-register-to-peripheral and immediate-to-peripheral modes. For the general opcodes, after stepping through the operand fetch microstates of FIGS. 8b–8d for the appropriate addressing mode, a function dispatch is performed, using the low order bits of the instruction word (#JmpCntl=001), to select one of up to sixteen possible functions to execute on the operands which have been fetched; these are shown in the Figures: dual operand function DOPFUN, dual operand function-peripheral DOPFUNP, single operand function normal SOPFNN, single operand function special SOPFUNS, long access function LAFUN, or miscellaneous MISC. All of these end in a return to IAQ-0 at micro address 00. Note that the Table A macrocode mneumonic such as ADD, MOV, CMP, etc., is used for the microinstruction for functions in the flow chart of FIGS. 8a–8j.

Dispatch Modes for Micro Addressing

The dispatch modes as summarized in Table G include unconditional, function, test sign bit, test if zero, test if interrupt, group, test if carry, test status, and reset.

The first type of dispatch is unconditional braching. If no conditional branching of the microcode is desired, #JmpCntl=000. This causes the device to branch unconditionally to the microinstruction at the address on the eight #JmpAddr lines 23 after the current microinstruction is executed. The address is formed by the output bits 18 in the #JmpAddr (7-0) field of the current microinstruction. This type is used for sequences like BtoPPL-0, BtoPPL-1, BtoPPL-2, etc. of FIG. 8b.

The next type is function dispatch used to select the function at decision points 8n, SOPFUNN, DOPFUN, etc. in FIGS. 8f–8j. Function dispatch is defined in Table F. When #JmpCntl=001, the next microinstruction is determined by the low four bits of the IR register. The base address for dispatch is formed in the #JmpAddr(7-0) field of the microinstruction. The next micro address is determined by replacing the bits 3-0 of the base adress with bits 3-0 of the IR register, so the offset can be up to sixteen. A function dispatch is a dispatch on the "function" field of the instruction word in the register IR. The function field indicates the arithmetic operation to be performed. This is contrasted with the 'group' field, bits 7-4, which indicate the addressing mode of the macro instruction (Table A instruction). Even though format "1" instructions have a 3-bit function field (IR bits 2-1-0), the function dispatch still performs a 16-way branch on the lower four bits of the IR register. The function dispatch for format "1" opcodes thus depends on the value of the IR(3) bit.

Another type is the test sign bit dispatch. The signal bit which is the contents of bit-7 the T/MAH register, T(7), may be used for dispatch by specifying #JmpCntl='010'. Two alternative jumps exist here. One is the 8-bit address of the microinstruction to be executed if T(7) is '1', and the other is the address of the microinstruction to be executed if T(7) is '0'. The address for T(7)=1 is the address for T(7)=0 plus 1. The address for T(7)=0 is loaded into the #JmpAddr field, then 1 is added if the test indicates T(7)=1.

The next type of dispatch is "test if zero". The microcode may test the value on the O bus of the immediately preceding microinstruction by specifying #JmpCntl='011'. When this code appears in microinstruction i, it tests the O bus contents of the previously executed microinstruction, i-1. The entry point logic 21 replaces #JmpAddr(0) bit with a bit which is '1' when the O bus is all zeros and '0' otherwise.

Another type of dispatch is "test if interrupt". The microcode tests for a pending interrupt by dispatching on the IACT (Interrupt Active) signal input from the interrupt control circuitry 29. This is accomplished by #JmpCntl=100 in the output 18. This type is used in FIG. 8 at IAQ-1 to branch off to INT-O if an interrupt is signalled. As with other dispatch instructions, two alternative addresses exist, one (E1) is the microinstruction address of INT-0 to branch to if IACT='1', and the other (E0) is the address of IAQ-2 branched to if IACT='0'; these are adjacent addresses. The IACT line is asserted when an interrupt condition is detected. IACT can be asserted only when STINT (Status Interrupt Enable) is '1'. Interrupts may be signalled from the external interrupts INT or an internal timer interrupt, for example.

Another type of dispatch is "group dispatch". This is done at IAQ2, decision point 8m of FIGS. 8a–8d as well as after RFtoA-1 in FIG. 8b at decision points 8p. Note that another group dispatch is possible at 8p because the opcode is still in IR. Group dispatch is defined in Table E. Dispatching on the group field of the IR register is accomplished by specifying '101' in the #JmpCntl field. The base address field is defined by the #JmpAddr field of the microinstruction. As described above, there are twenty-four groups defined, eight in format 0, IR(7)=0, and sixteen in format 1, IR(7)='1'. The groups may be numbered as in Table E. The group dispatch performs a 24-way dispatch on the group field by replacing the low order bits of #JmpAddr lines 23 with a function of the group number. The high nibble of the IR register, IR(7-4), is placed in the low nibble of the next address, shifted by one bit. The low order bit of the next address is IR(3) OR NOT IR(7). For format '0' instructions, NOT IR(7)='1', and the 0 bit of the next address always equal '1'. Thus, the machine will jump to a micro address which is the base address plus (group *2)+1 for format '0' group numbers. For format '0' instructions, NOT IR(7)='0', and the 0 bit of the next address equals IR(3). Thus, the machine will jump to a micro address+IR(3) for format '1' group numbers.

In a group dispatch, the CROM addresses "base address", "base address+2", "base address+4", etc., may be used for other microinstructions; only alternate micro addresses are used after the 24-way group dispatch. The example microinstruction set of Tables B and C and FIGS. 8a–8j uses the group dispatch at IAQ-2 after the instruction is loaded into the IR. Each "group" corresponds to one of the addressing modes, and the microcode executed after the dispatch fetches the appropriate operands for this instruction. A "function" dispatch is then done, and the microcode branches to perform the appropriate ALU operation on the operands. In this manner, the operand fetch microinstructions are shared among the instructions, but each instruction has its own microcode to perform the function of the instruction.

A "test if carry" type of dispatch is also available. The microcode tests the value of the carry bit in status register ST by performing a dispatch on the STC bit. This is indicated by #JmpCntl(2-0)='110'. The bit tested is the value of the STC or status carry bit after the execution of the immediately preceding microinstruction, i.e. the microinstruction executed prior to the one containing the #JmpCntl(2-0)=110 bits. The STC bit is placed in bit-(O) of #JmpAddr, and the result used as the next microinstruction address. If the STC bit is '1', control transfers to one address, and if STC='0', control transfers to the next lower address.

Another available type of dispatch is "test status register" or macro jump. The contents of the status register are tested with this "macro jump" dispatch by specifying #JmpCntl(2-0)='111'. This dispatch tests eight possible conditions of the status register, indicated by the three bits in IR(2-0). If the condition is true, control transfers to the base address plus 1. If the condition is not true, control transfers to the base address. The conditions tested for macro jump are indicated in Table I.

The base address field must be even and is placed into the #JmpAddr field of the microinstruction. The result of the condition test is placed in bit-0 of #JmpAddr to form the new microinstruction address. The macro jump dispatch is used in the microcode of Table B to implement a conditional branch instruction.

Another type of dispatch is the reset operation, microstate Reset-O of Table B. When the RESET pin of chip 10 is asserted (driven high externally), control circuitry asserts the RST signal to the CPU. The entry point logic 21 immediately forces the next microinstruction address μA to be hex FF or all ones, grounding the μA lines on H1. Unlike the normal interrupt facility, the microcode does not poll the RST line; rather, the microinstruction at μA address FF is unconditionally forced to be the next microinstruction executed. The sequence of microinstructions RESET-0 to RESET-3 of Tables B and C or FIG. 8e executed upon reset results in fetching a subroutine entry point address at a fixed address such as FFEE in the macrocode part of the on-chip combined ROM 11 and branching to this subroutine.

ADDRESSING MODES FOR MACROINSTRUCTIONS

The macroinstructions of Table A are shown also in an instruction map of FIG. 9 wherein the most significant half MSH of the instruction is listed across the top and the least significant half LSH is listed down the left side, in binary and hex. Thus, an ADD instruction with an addressing mode of "B, A" has an opcode of 0101000 in binary or 68 in hex; this addressing mode means that the contents of the B register or R1 in RAM 12 is added to the contents of the A register (R0 in the RAM) and the sum is written into the A register, so B is the source address and A is the destination address. The B, A addressing mode uses the least possible states in execution, and shares some of these states with several other instructions, such as MOV, AND, OR, XOR, SUB, CMP, etc., all of which have the same MSH opcode of 0110.

The ADD B,A and MOV B,A instructions (and the like) are dual operand instructions using the A and B registers. Also, single operand instructions can use the A or B register; for example the instruction DEC A (opcode=10110010) means decrement the A register, or the instruction CLR B (opcode=11000101) means clear the B register. Instructions in the 1011 column of FIG. 9 operate on the A register, and instructions in the 1100 column operate on the B register (with exceptions as noted), and these are single operand instructions. Generally, the A or B register (or B,A) addressing modes require only five machine states to execute, three of these being instruction acquisition shared by all.

Register file addressing is also available for most instructions; this mode is identified by Rn in FIG. 9, and means that one of the 128 or 256 registers in the register file RF or RAM 12 is the source or destination address. So, for an instruction "ADD Rn, Rn" the opcode is 00111000 (FIG. 9) followed by two 8-bit addresses of the two registers Rn, Rn used for the source and destination operands; thus three bytes are needed for an ADD Rn, Rn instruction. To execute such an ADD Rn, Rn instruction, ten machine states are used, but the source and destination fetch states are shared with all other similar instructions such as AND, OR, MOV, SUB, CMP, etc., all having a MSH opcode of 0100. Register file addressing with A or B register addressing is used in the MSH columns for 0001 and 0011 opcodes, for all of the common arithmetic and logic instructions. Again, single operand Rn addressing is used for instructions of the Rn or 1101 column of FIG. 9. Thus, "ADD R113,A" means add the contents of A register to the contents of the 113th register in RF or RAM 12 and store the sum in the register R113. "MOV R5, R78" means copy the contents of R5 into R78. "DEC R78" means decrement the contents of R78. Since the A and B registers are in the register file as R0 and R1, these may be used in the Rn, Rn addressing mode.

All of the major instructions can use the immediate addressing mode which is specified by "%n" in FIG. 9, particularly the 0010, 0101, 0111 and 1010 columns for MSH. Immediate addressing uses the contents of a byte following the opcode byte as an operand. Thus, "MOV %98, R123" means replace the contents of register R123 with the hex number 98; this sequence requires three bytes to define, these being "01110010 10011000 01111011" in machine instruction format (object code in binary as actually codes in ROM 11), and the three bytes would be stored in sequential addresses in the ROM 11, accessed in sequence by incrementing the program counter.

Peripheral file addressing specifies one of the PF addresses or registers P0 to P255 (see FIGS. 2 and 2a) as an 8-bit field following the opcode. Thus, the I/O ports A, B, C, D, etc. may be accessed (depending upon the operating mode), all by the instructions in the three columns 1000, 1001, and 1010 of FIG. 9 containing a Pn notation. For example, the instruction "MOVP A, P2" means copy the contents of A register into the P2 address.

As seen in FIG. 9, there are five instructions which can use direct memory addressing, these being LDA, STA, BR, CMPA and CALL; in each of these the opcode 10001XXX is followed by two bytes which specify a 16-bit address that contains the operand. Direct memory addressing is specified by an "at" sign @, so "LDA @F47D" means copy the contents of memory location F47D (hex) into register A, or BR @F47D means branch to address in F47D.

Another addressing mode is register file indirect; the same five instructions, LDA, STA, BR, CMPA and CALL which can use direct can use register file indirect addressing, and these are in the 1001 column of FIG. 9. This mode is specified by asterisk * followed by the register name. The specified register contains the least significant half of a 16-bit address. The most significant half of the address is contained in the next higher register. Thus, STA *R45 means copy the contents of register A into address hex-43F8 (where R46 contains 43 and R45 contains F8).

These same five instructions LDA, STA, BR, CMPA and CALL can employ an indexed addressing mode in which the address of the operand is the sum of the contents of B register and a 16-bit direct address n. The address n is proceded by @ and following by (B) so STA @ 43F8(B) means copy the contents of the A register into the memory location specified by the contents of B added to the contents of 43F8 (hex). The opcodes for all these instructions start with 1010 as seen in FIG. 9.

THE OPERATING MODES

With reference to FIG. 2a, the primary operating mode of the microcomputer 10 of FIG. 1 is the microcomputer mode in which all of the memory is contained within the ROM 11 and RAM 12. The device is initiallized by RST or reset to be in the microcomputer mode; that is, zeros are placed in the bit-7 and bit-6 of the I/O control register 0100. In this mode, only five or six bytes of the peripheral file PF are used, the remaining 250 have no function. The peripheral register numbers P0, P4, etc., and hex addresses of the peripheral file registers for the microcomputer mode are shown in FIG. 2a. Port A is used only for input and port B in only an output, while ports C and D are either output or input; thus, registers P9 and P11 define the direction of data in the ports C and D, but no such control registers are needed for ports A and B as they are unconditionally input or output. The port A, B, C, D data registers are contained within input/output buffers and are accessed by the MD bus, using addresses 04, 06, 08 and 0A (in hex) on the AL bus and page-one or 00000001 on the AH bus. Similarly, AL addresses 09 and 0B access the control registers contained in buffers for ports C and D. A "0" in the control register bit sets the port for input and a "1" sets it for output. An address applied to AL and AH in the unused areas will produce no meaningful result, so the ROM 11 program is of course written to avoid these addresses.

In FIG. 10a a system containing an eight digit display 13-1 and a keyboard matrix 31-2 is shown which uses the device of FIG. 1 in its microcomputer mode. The C port outputs are used for the segments of the display and the B port outputs drive the digits of the display 13-1 and columns of the keyboard matrix 13-2 as illustrated in U.S. Pat. Nos. 3,988,604, 3,921,142 or 4,158,431 for example. The rows of the keyboard matrix 13-2 are applied to the A port inputs. A 8×8=64 key matrix is possible, but ususally less are needed. Other activators and sensors such as in the microwave oven controller of the Van Bavel U.S. Pat. No. 4,158,431, assigned to Texas Instruments, may be connected to the D port as inputs or outputs. An example of a program for display scan in the system of FIG. 10a is set forth in Table J and explained below.

Figure 10B:
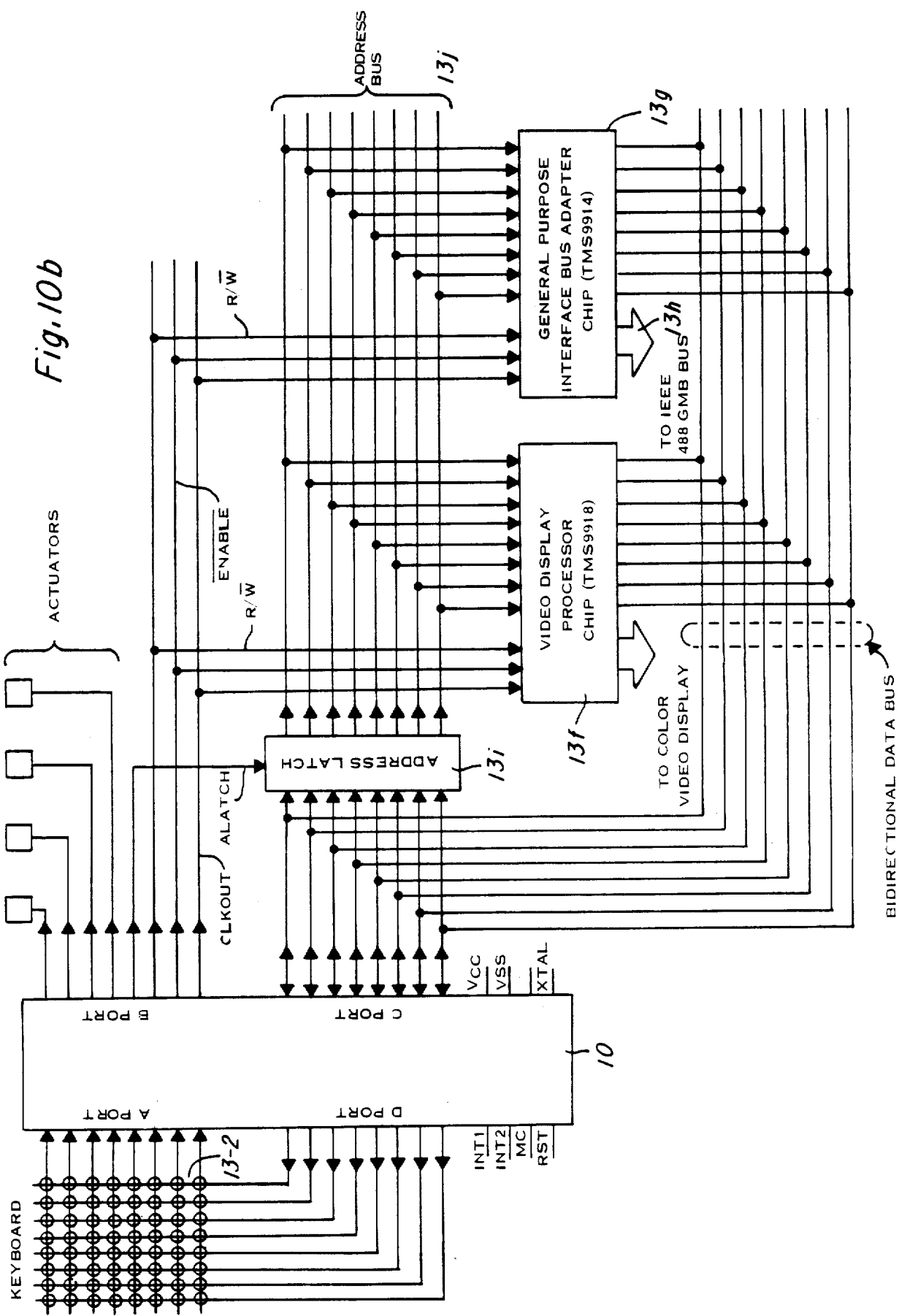

In the peripheral expansion mode of the memory map of FIG. 2b, the peripheral page 0100 to 01FF, 256 bytes, is utilized for off-chip accesses. The C port is used as a multiplexed 8-bit address/data bus, and four bits of the B bus are dedicated as control lines ALATCH, R/W, ENABLE and Clock Out as illustrated in the system of FIG. 10b. This system employs the microcomputer 10 of FIG. 1 as the main processor in a system which uses two other attached processors. One is a video display processor 13f as described in U.S. Pat. No. 4,243,984 issued to Guttag et al, assigned to Texas Insruments. The other is a general purpose interface bus adapter chip 13g which allows the chip 10 to inteface with a standard IEEE 488 bus 13h. The chip 10 produces an 8-bit address on the C port which is latched into an 8-bit latch 13i by the address latch signal ALATCH on port B4, then the address is available on an address bus 13j for the chips 13f and 13g when the enable signal on port B6 goes active. The chips 13f and 13g are synchronized with chip 10 by the clock output on port B7. The C port is then used for data from or to the chip 10 and chips 13f and 13g, depending upon the read/write control R/W on port B5. The chips 13f and 13g are thus configured to respond to addresses 0108, 0109 and 01OA to 01FF on busses AL and AH. The AH bus of FIG. 1 will always contain 01 in this mode for off chip accesses, of course. The A port functions as an input and the D port as input or output in this peripheral expansion mode, so other functions are executed aside from accessing the chips 13f and 13g; for example, actuators and sensors, or a keyboard matrix as in FIG. 10a may be used here also.

Figure 10C:
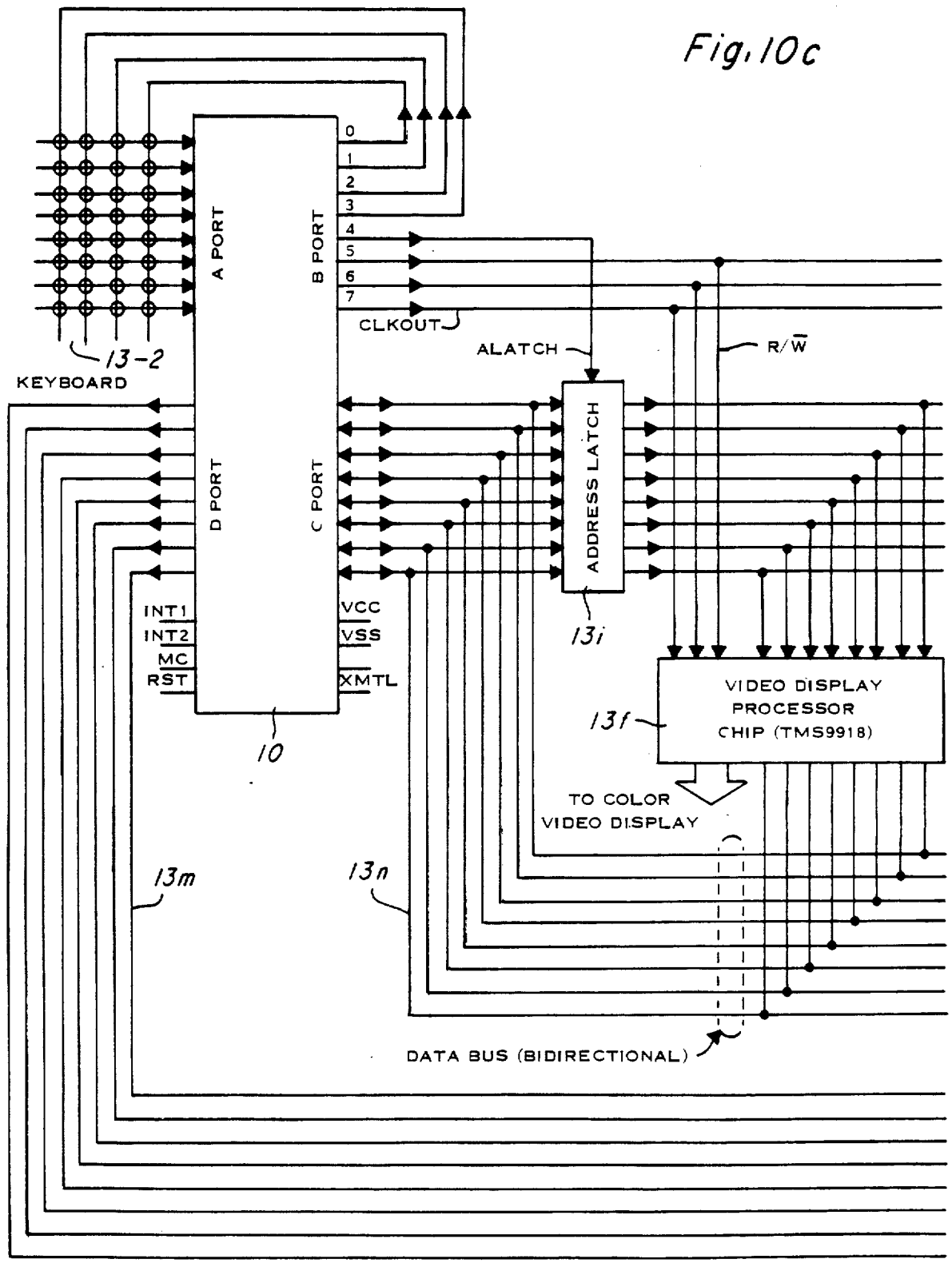
Figure 10C:
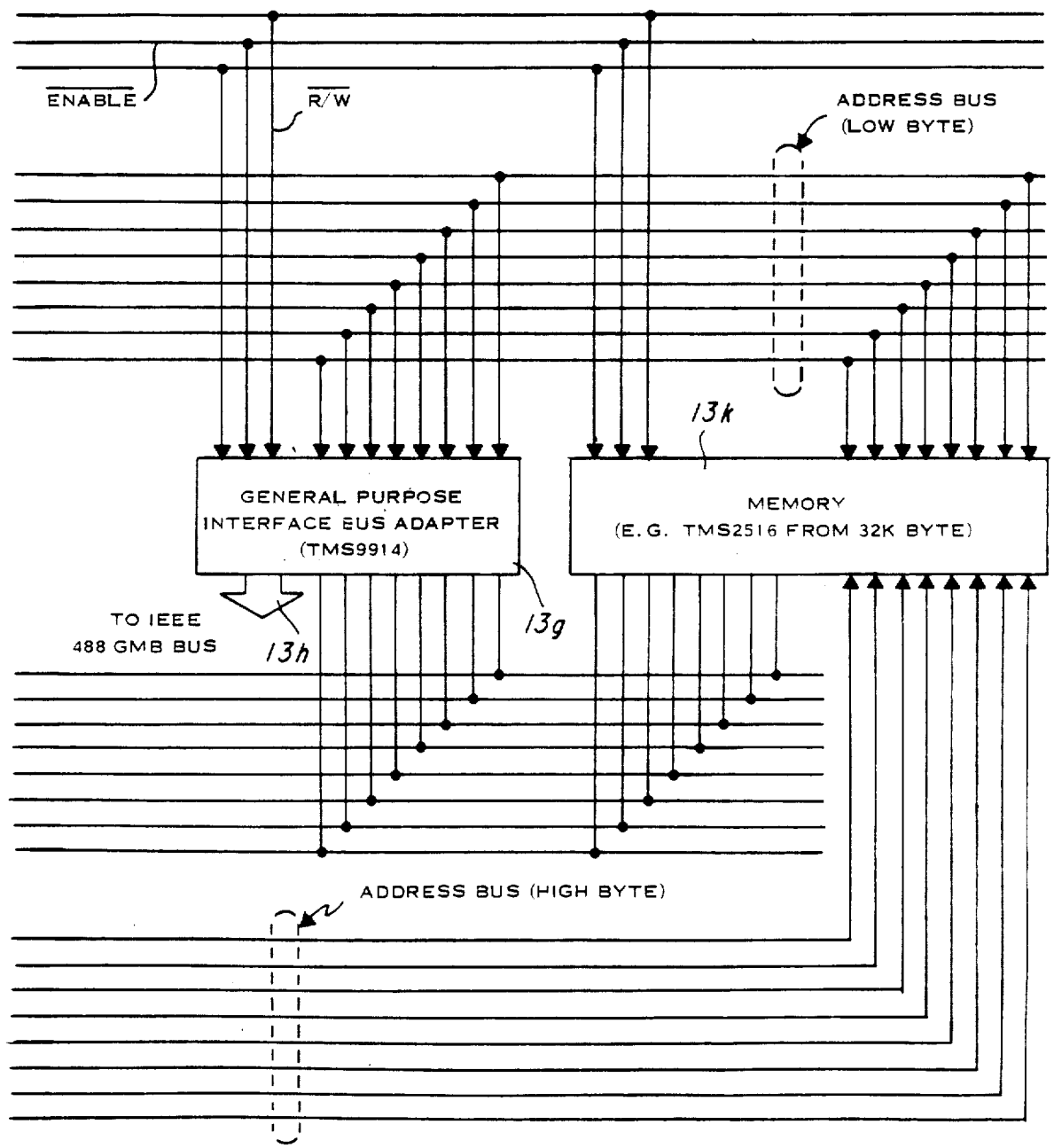
Figure 10D:
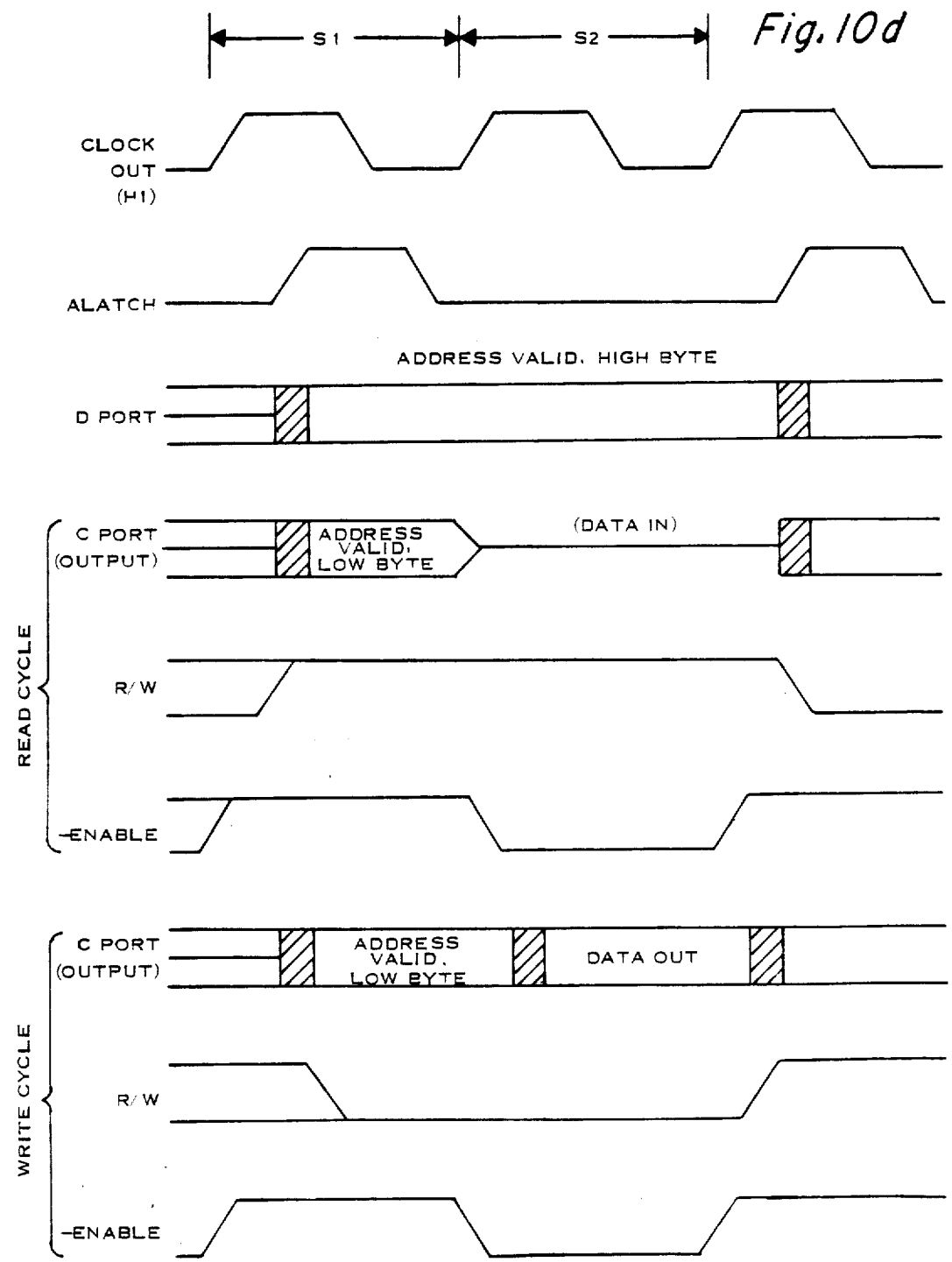
FIG. 10d is a timing diagram for operation of the systems of FIGS. 10b or 10c.

The full expansion mode of FIG. 2c and FIG. 10c provides the 8-bit address output on C port as in FIG. 10b plus anothr address byte on D port which may address a memory chip 13k, for example. The full expansion mode allows a full 64K (two bytes-C port and D port) of off chip address range; addresses 0108 to EFFF are available for off chip access. As above, port B at address 0106 provides the memory control and clocking on bits B4, B5, B6, B7. The memory chip 13k may be a 32K device, for example, and the lower byte address from C port is latched at 13i while the high byte goes directly to the chip 13k on lines 13m. The data bus 13n going to the C port is shared by the chips 13f, 13g and 13k. The system of FIG. 10c thus has much greater program capability, compared to that of FIG. 10b, but the D port is not available for other I/O. A keyboard matrix 13-2 could be connected to the remaining four bits of the B port (address 0106, bits 0-3) and the A port as shown, however.

KEYBOARD AND DISPLAY SCAN PROGRAM

Figure 11A:
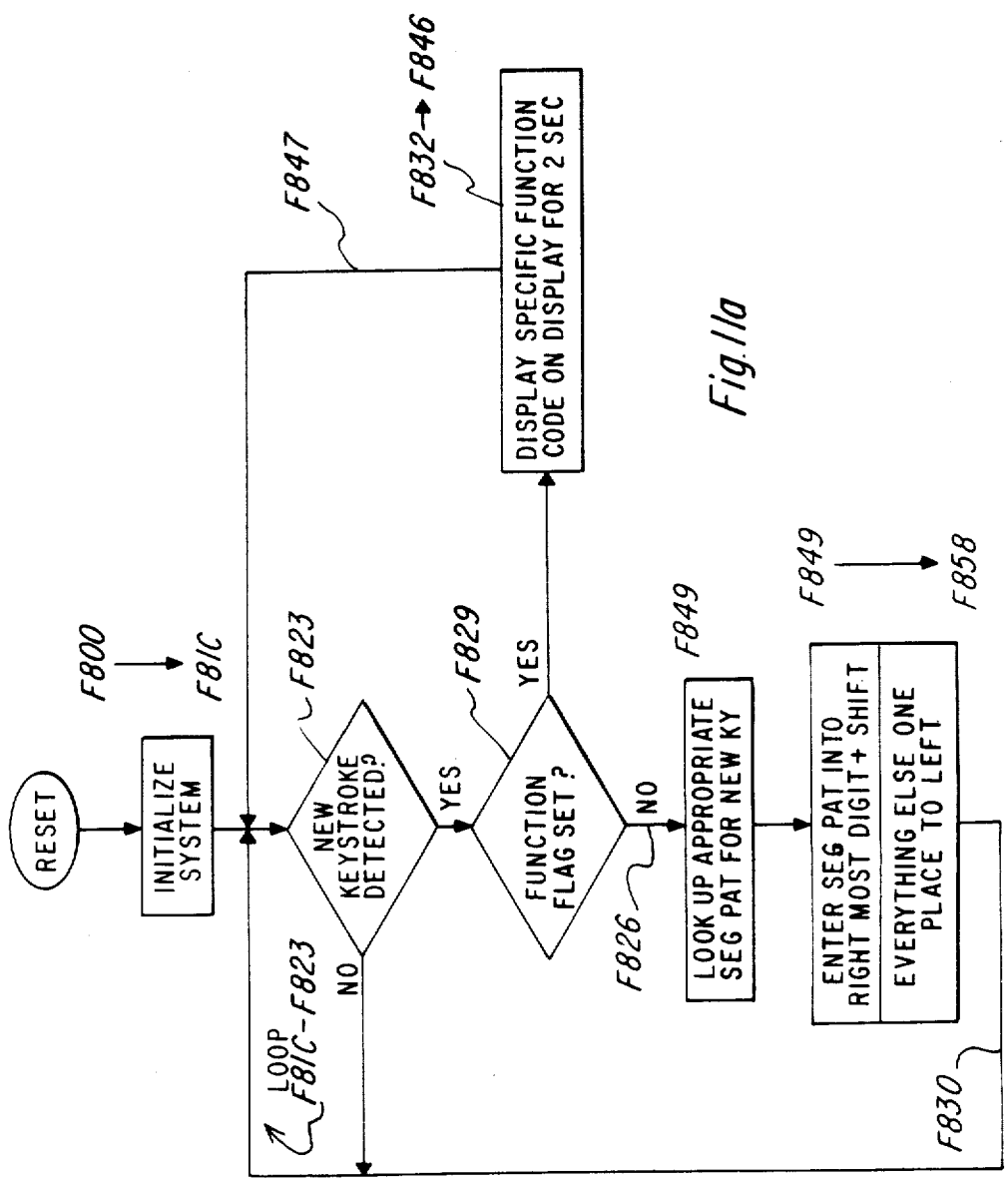
FIGS. 11a-11b are logic flow charts for execution of a keyscan routine in the system of FIG. 10.
Figure 11B:
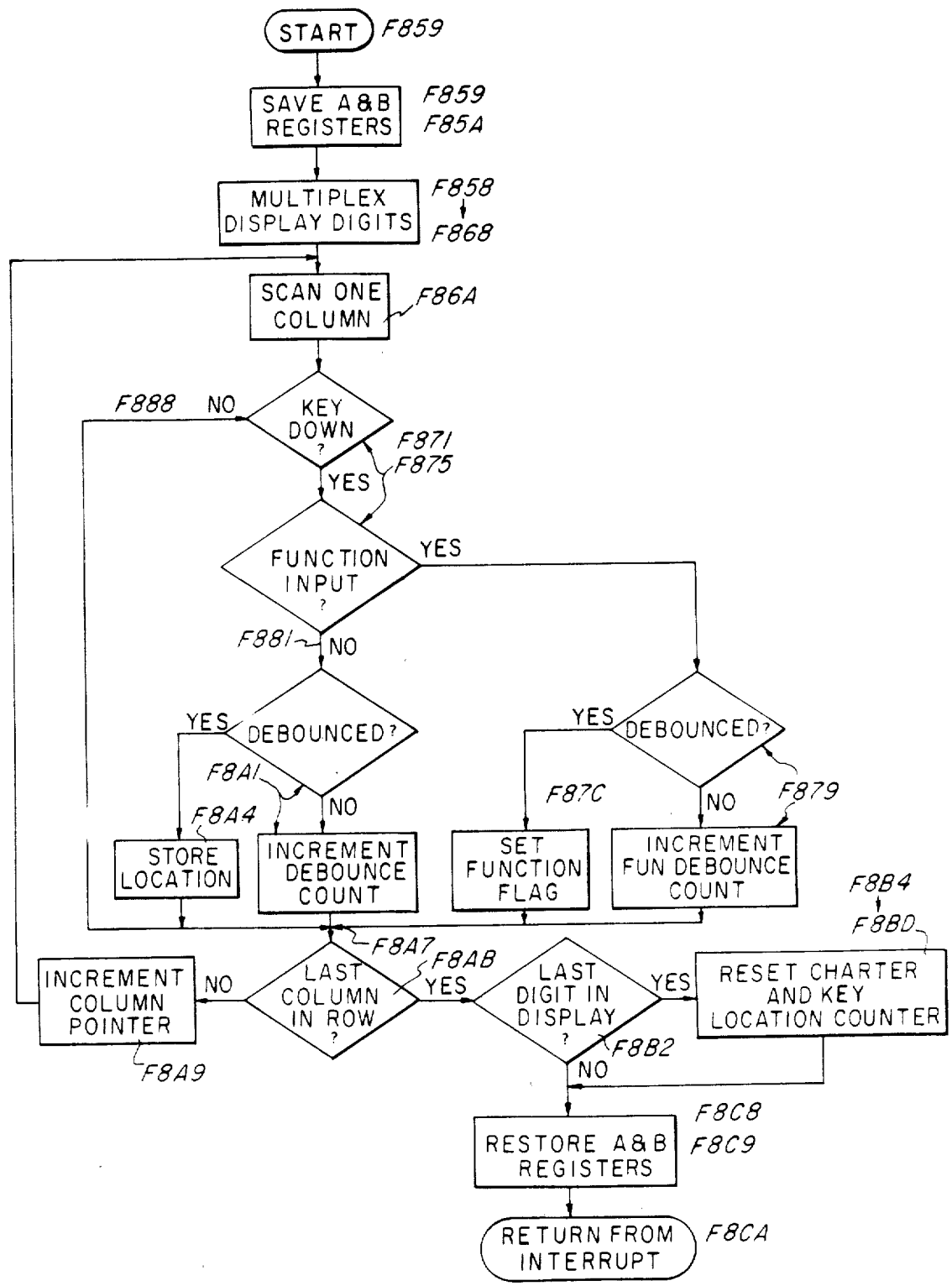

An example of a program executed in the microcomputer 10 connected in a system of FIG. 10a is listed in Table J and shown in flow chart form in FIGS. 11a and 11b. The keyboard input part of the program could be used in the FIGS. 10b–10c systems. The microcomputer 10 having features of the invention permits keyboard and display functions under control of the fixed program in the ROM 11 rather than requiring external control circuitry. The method implemented in the program uses time-multiplexing of the display 13-1 and scanning the keyboard 13-2 with the digit-actuating B-port signals as disclosed in U.S. Pat. No. 4,074,351, assigned to Texas Instruments. In this example, a single-pole push button keyboard 13-2 with twenty keys and an eight-character LED display 13-1 are used; the program can be modified to handle up to a sixty-four single-pole keyboard and sixteen character display (using D port) with minimal changes, mostly in the intiallization subroutine INIT. However, the example program uses only the twenty keys shown in FIG. 11c, so only five of the B port bits (B3–B7) and four of the A port bits (A4–A7) are used in keyboard scan. The other three B port bits (B0–B2) actuate digits of the display but not the keyboard. The asterisk key (*) is referred to in the program as "FUN" or function key.

The format of Table J includes the ROM 11 address on the left, followed by the object code in hex, then the source statement using the macroinstruction mneumonics of Table A with accompanying operands, plus comments on the operation performed. This program listed in Table J is used with a background program which would occupy the remainder of the ROM 11. The keyboard and display scan program of Table J uses only about 225 bytes of the ROM 11, particularly addresses F800 to F8EB including look-up tables, so about 1800 bytes remain for the background program. Definitions of terms used in the Table J program are given in Table K.

The initiallization routine INIT at F800 to F81E is executed during the power-up reset operations and does not form part of the display and key scan functions implemented repeatedly by the Table J program. The background program operates with a hardware timer interrupt which uses the timer 26 in the peripheral file PF to generate INT2 interrupts at a fixed rate to insure that the display routine is called often enough so that the display characters 13-1 do not flicker. The timer P2 is set to decimal "208" and the prescaler P3 set to "3", for the internal clock mode, by the instructions MOVP %D0, P2 and MOVP %C3, P3 at F810 and F813 in the INIT routine. This setting generates an INT2 interrupt about once every millisec when the timer increments to zero; each INT2 causes the program counter PCL, PCH to be loaded with the timer interrupt vector located at FFFA and FFFB, invoking the timer interrupt routine TINTR at F859, saving A and B in the stack and leading into the display/keyscan routine, MUXSCN at F85B.

After INIT, the program as seen in FIG. 11a enters a loop at F81F to F823 which continuously checks to see if the keyscan routine has left a new debounced key entry in DEBKEY, R119. This is done by writing hex 80 or 10000000 into B register and exchanging B with DEBKEY, then a bit test of 80 and B to see if they are the same; if not jump back to F81F, "KYDD". If a new keystroke has been loaded into DEBKEY, the instruction at F829 checks to see if it is the function key, and if so the instructions at F832 to F847 are executed to show the function symbol in the display for two seconds, then return to the F81C loop to wait for the next keystroke. If the keystroke is not the function key, F82F is executed, calling the STRSEG subroutine at F849-F859 which enters the segment pattern for this key (obtained from look-up table at F8DF) into the right most digital of SARRAY-1 and moves other digits one place to the left. At F858 RETS, execution returns to F81C to enter the looop to wait for the next key.

During the execution of the program of FIG. 11a, the occurance of the interrupt INT2 at counter timer-out causes execution to shift to the timer interrupt routine of FIG. 11b. This routine is listed at F859 to F8CA of Table J, and begins with saving the A and B registers then ends with restoring these registers before the return instruction F8CA RETS; the PUSH and POP instructions implement this function.

In the TINTR part of the program, the chip 10 enables only one character of the display 13-1 at a time (one bit of B port), by the MOVP A,.P6 instruction at F868, beginning with the left-most or 0 character. At that point, the appropriate segment lines for that character location are energized by loading the port C register 010A with a segment pattern obtained from a look-up table; this is performed by the MOVP A,.P8 instruction at F863. A switch closure is detected at one bit of port A by the MOVP .P4,A instruction at F86A. If no key is down in that column, detected at F871, the remaining columns are examined via the loop of F871, F888, F8A7, F8AB and back to F86A, as seen in FIG. 11b. If the function key is down and debounced as detected at F879, the function flag is set at F87C and the remaining columns looked at via the path through F8A7 and F86A as before. For keys other than the function key the path via F881 tests for debounce, and if so the location of the down key is stored by F8A4 to be then used in the main program.

Debounce is used to eliminate effects of transients when a key is pushed. When a key is detected, it is not acted upon unless it appears for the number of scans defined by DEBNCE, in this case four, stored in the function count register (FCNT) R127 or successive-read register (SUCCRD) R121. Whenever a key is detected but the number of successive detections is less than four, the register R121 or R127, as the case may be, is decremented (count is incremented) and the scan resumed via F879 or F8A1. Thus, a key must be down for about four milliseconds before an indication of its presence is passed back to the main program.

The program of Table J and FIGS. 11a, 11b merely scans the keyboard and displays what is entered. The operations performed on the functional commands and numbers entered are not included. These could be included in the loops of FIG. 11a, such as at F830. This is, the D port inputs could be scanned and/or outputs energized as in FIG. 10a; also, other interrupts INT1 and INT3 could be processed.

THE SELF-TEST PROCEDURE

A microcomputer 10 constructed according to the invention may contain a self-test procedure as set forth in U.S. Pat. No. 4,158,431 issued to Van Bavel et al, assigned to Texas Instruments. The procedure of U.S. Pat. No. 4,158,431 consists of exercizing all of the display characters 13-1 and keys 13-2 as well as all of the I/O devices on the D port of FIG. 10a, all under control of a sequence of macroinstructions in the ROM 11 as manufactured. This self-test procedure establishes that all of the external elements of the system are working and gives some indication that the chip 10 itself is fully functional, but this is not an exhaustive check. Prior to connecting into such a system, however, functional testing must be done. For example, to test the contents of the ROM 11 after manufacture (either prior to delivery to the customer or by the customer as incoming material inspection) it has previously been the practice to read out the entire contents of the ROM, one word at a time, and compare each word with the desired bit pattern. Microcomputer devices which allow such testing are disclosed and claimed in U.S. Pat. No. 3,921,142 issued to John D. Bryant et al and U.S. Pat. No. 4,024,386 issued to E. R. Caudel and Joseph H. Raymond, both assigned to Texas Instruments. Such tests, however, require that the test machine store the entire ROM code, 2048 or 4096 bytes, and require a different check code for each different ROM code. Further, the check requires at least one transfer between test machine and device under test for each type of the ROM. These factors make the test unduly long, require extensive test data or software, and/or use up excessive amounts of program space in the test machine.

As set forth in co-pending Ser. No. 276,421, filed June 22, 1981 by J. D. Bellay and assigned to Texas Instruments, the microcomputer 10 may employ a test method in which a two-byte macro-code is fixed in the ROM 11 upon manufacture and used to check the remaining macro-code. This two-byte code is different for each ROM code or program and represents some function of all of the other bytes coded in the ROM. For example it might be the LSB's of the sum of all the other bits in the ROM, or preferably some other function which provides a multiple check of all bits. This two-byte code is referred to as a cyclic redundancy code or CRC and is a 16-bit value which is a function of every bit of data used to create it. The CRC is calculated using every byte of the macrocode in the ROM except the CRC itself which is stored at a location such as F802 and F803 in a 2048 bit ROM 11 or or F002 and F003 in a 4096 bit ROM 11:

The program of Table L is loaded into the RAM 12 of the chip 10 while the chip is in one of the expansion modes (FIG. 2b or 2c), by a sequence of move double MOVD or move MOV instructions. For example, MOVD %7D02, R10 in the microprocessor mode places the first two bytes of the object code of Table L in RF locations R10, R11. In this manner, all of the code of Table L is stored in RAM 12, and then a MOV %00, P1 instruction returns the microcomputer 10 to the single-chip mode of FIG. 2a; the address of R10 had been loaded into the program counter PCL while in expansion mode and PCH is zero so execution of the Table L code begins. The two-byte address in ROM 11 being accessed for test is AL, AH (two of the RF registers, R125 and R124). The present calculation result is QL, WH (in R127, R126). The code at 0B to 1B merely checks to see if AL, AH is at the address of the CRC code in ROM 11 (F902 and F903, for example); if so AL, AH is incremented two bytes. The code at 1D to 2A checks to see if the AL, AH address has incremented past FF, in which event all of the ROM has been processed so a jump to the CHKDON sequence is executed; otherwise the point AL, AH is incremented and the main calculation BUILDF is executed. This calculation at 2D to 48 processes the current QH, QL value with the new byte in Reg B which was fetched from the AL, AH address, and produces a new QH, QL value. BUILDF ends in a jump back to the LOOP starting at 0B. After all bytes in ROM have been passed through BUILDF, the check is finished. The code at 4A to 4F then defines port C as an output and outputs a hex 55 (binary 01010101) to indicate to external that the calculation is finished, so the test machine is alerted to look for the 2-byte result on the C and D ports. The original code from F902, F903 is compared at 53 and 5E with the QH, QL value, and the comparison output. About 890,000 machine states are needed by the microprocessor 10 to execute this test program, but this is all internal; the test machine does not need to store unique codes and off-chip accesses are not needed for the bulk of the test.

According to one embodiment of the present invention, however, an additional test arrangement is available. The microcode itself may be accessed one byte at a time and checked against a check-code stored in ROM 11 or an externally stored representation of the microcode. To this end, the microcode part of the ROM 11 may be accessed in a decoder 11y, latch 11c, and the MD bus, to be written into a peripheral file by a MOV%n, Pn instruction, for example, or written into the A register by MOV %N, A from which it may be operated upon internally and/or written to external by a MOVP A, Pn instruction. The fetch immediate microcode is usually used to fetch operand addresses or constants for compare, but can be used to apply bytes of the microcode from ROM 11 to one of the output ports B, C or D. An instruction MOVP %FF01,P6 executes the following microcode states: IAQ-0; 1AQ-1; IAQ-2; ItoPPL-0; Ito-PPL-1; BtoPPL-0; BtoPPL-1; BtoPPL-2; BtoPPL-3; STP-0, STAL-2; then goes back to IAQ-0; this sequence is seen in FIG. 8 and Tables B and C. During the ItoPPL-0 state (corresponding to S2 in FIG. 4a), the byte of microcode at FF01 (macrocode address of FIG. 2) which is one byte out of eight bytes of one of the microcode states of Table B and C, is accessed for processing in the ALU, writing off-chip, or writing in RAM 12. In using the test program of Table L to check the microcode as well as the macrocode, the CRC code stored in F902 is calculated to take into account all bytes of the microcode part of the ROM 11, as well as the macrocode. The method operates as before, and the LDA *AL instruction at hex-21 fetches all bytes of the ROM 11, including microcode.

This method of testing of microcomputer chips is advantageous in development and more importantly in large volume production operations, which have presented several problems. The number of external pins is limited, and the data available on the pins is constrained by the instruction set and internal circuitry. Thus, hundreds of internal nodes and signals are not available externally for test in a packaged device; internal probing is meticulous and very time consuming. It has been necessary, therefore, to provide test machines which cycled through virtually every possible operation of the devices to check for defects in manufacture. Test equipment for LSI chips is of course computer-controlled, but still this type of testing has been not only excessively time-consuming in execution, but also prohibitively expensive in software costs because every different ROM code for each consumer requires a different test sequence; even so, such tests were incomplete because execution of some instruction sequences are data-dependent and all possible combinations could never be implemented or even envisioned; furthermore time and program memory limitations in the test machine impose practical constraints. Therefore, the capability of directly testing the microcode simplifies the equipment and procedures needed.

RAM STORAGE OF MICROCODE AND MACROCODE

The memory 11, instead of being a "ROM" programmed in manufacture, may be of the read/write type with static RAM cells, so that both macrocode and microcode is loaded from external to the chip. Referring to FIG. 6a, the memory 11 is the same as before except that a "write ROM" control WROM is included and the decoder 11Y is an input/output circuit instead of just an output circuit. The group decode 27 and memory control 28 produce the WROM commands when GROM AND #WR occur. A part of the memory 11 must remain permanently programed so that enough macrocode and microcode exists to perform the task of loading the remainder of the memory. To this end, the reset microcode of Table C is fixed in a permanent ROM part 11p of memory 11 along with microcode needed to execute a long read from the peripheral file PF and a long write to the memory 11. So, the reset sequence is supplemented by adding a loop in microcode (see Table C) which reads port A, for example, and writes the port A data to the memory 11 until all of the read/write addresses of the memory 11 are loaded.

The microcode addresses for this function and reset would be changed so that all are in the FFFF end of the array, or other location convenient from a fabrication and programming standpoint. After the memory 11 is initially loaded, and the task for the loaded program completed, the entire read/write part 11w of the memory 11 maybe reloaded with new microcode and macrocode, or only parts of it replaced for new tasks. The permanently-programed part 11p contains whatever macrocode and microcode needed for this update task, in addition to the reset or initial loading task.

MICROINTERRUPTS

The execution of microinstructions of FIGS. 8a–8j and Tables B and C can be interrupted by a microinterrupt arrangement which is in addition to and completely separate from the function of the macrointerrupt pins INT of FIG. 1 or the INT-0 to INT-5 microinstructions of FIG. 8e. Referring to FIG. 6', a microinterrupt signal $\mu I$ generated by a microinterrupt control latch 36 causes the microaddress existing at S1Q2 of FIG. 4 to be saved in an 8-bit latch 31, and causes a microvector address (for example, 60 or 01100000) to be applied via lines $\mu A$ to the decoders of ROM 11 by control of a multiplexer 32. The vector address begins a sequence of microinstructions as set forth in Table M to:
 (a) preserve all pending registers, addresses, and status bits
 (b) fetch Timer-1 value from an RF register (R63 in the example)
 (c) decrement Timer-1 value and write back to RF (R63)
 (d) if Timer-1 value equals zero, set interrupt flag-1 (R62, bit-0)
 (e) continue (b) to (d) if Timer-2, Timer-3, etc. are included
 (f) return to the pending microinstruction sequence In (a), the $\mu$INT-0 microinstruction merely saves the MD bus since the PCL, PCH, AML, T/MAH, IR, ST and SP registers are not used or disturbed in the sequence of Table L. Alternatively, the data on MD bus could be saved in the stack by push and pop microinstructions. The status register ST need not be stored by a microinstruction because the #LST bit is not asserted in Table M.

Instead of using an RF register as the flag, another bit of the status register ST could be employed. Or, a hardware latch could be used to generate a macrointerrupt enable. In the above embodiment microinstructions must be added to the IAW sequence to tests the microinterrupt flag (R62, bit-0) at the beginning of each new macroinstruction execution, before testing for macrointerrupts; a bit test is implemented before IAQ-0 to check the microinterrupt flag and if set dispatch to the normal interrupt routine INT-O which, for example, can be used to write, a new value in the timer register R63, etc., and perform whatever function desired, such as by a trap routine using macrocode. See IAQ-0a and IAQ-0b in Table M. If more than one timer is used, all the flags would be polled.

The number of timers operating during a given task can be variable. One of the RF registers can be designated to define the number of separate timers in operation, and the microcode of Table M written to loop a number of times set by the number in this register. Further, the interval between microinterrupts can be variable by using one or two of the PF registers such as P2 and P3 to define the count chain; in this manner (using two such registers) the time between microinterrupts can be varied over a range of $2^{16}$, under macrocode control.

To the assembly level programmer writing in macrocode the effect of the microinterrupt arrangement is exactly as it a hardware timer had timed out. Only the microprogrammer need be aware that the CPU is time-shared to implement the timer. The microinterrupt arrangement of FIG. 6' functions as a one-level microsubroutine, and of course may be used for many purposes other than timers.

CONCLUSION

The microcomputer described in detail herein is in the form of an N-channel silicon gate integrated circuit in a single silicon chip. However, features of the invention can of course be used in devices made by other processes such as metal gate, P-channel, CMOS, silicon-on-sapphire, and the like. Also, the combined memory 11 has been described as a mask-programmable ROM of the fixed-program type, but of course an electrically-programmable ROM or electrically-erasable ROM may be used. The ROM 11 is referred to as a program memory and the RAM 12 as a data memory, and these are the primary functions in many applications; it is understood, however, that "data" from the ROM 11 is used in some algorithms ("data" being numerical constants and the like), and that the device can execute macroinstruction codes from the RAM 12, macrocode or program blocks can be down-loaded into RAM 12 from external tape or disc drive, or from a telephone coupler, for example, and executed from RAM 12. Furthermore, additional control lines and functions such as READY, HOLD, bus-station code, etc. as in said application Ser. No. 210,109, now U.S. Pat. No. 4,402,044, may be used in a device having features of the invention.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or emobodiments as fall within the true scope of the invention.

TABLE A

THE INSTRUCTION SET

ARITHMETIC INSTRUCTIONS
ADC: ADD WITH CARRY
 Opcode: 0XXX1001
 Definition: Add the source operand to the destination operand (both from RAM 12) with carry-in and store the result at the destination address in RAM 12. Set status bit C to '1' on carry-out of (s)+(d)+C. Set N and Z on result. Application: ADC is used to implement multi-precision addition of signed or unsigned integers.

ADD: ADD
 Opcode: 0XXX1000
 Definition: Add the source operand to the destination operand and store the result at the destination address in RAM 12. Set status bit C to '1' on carry-out of (s)+(d). Set N and Z on result. Applications: ADD is used to add two bytes, and may be used for signed two's complement or unsigned addition.

CMP: COMPARE
Opcode: 0XXX1101
Definition: Subtract the source operand from the destination operand; do not store the result. Set status bit C to '1' if (d) is logically greater than or equal to (s). Set N to '1' if (d) is arithmetically less than (s). Set Z to '1' if (d) is equal to (s). Applications: CMP is used to compare the destination operand to the source operand. The N bit is set to '1' if (d) is less than (s), interpreting (d) and (s) as two's complement integers. The C bit is set to '1' if (d) is greater than or equal to (s), interpreting (d) and (s) as unsigned integers. For either signed or unsigned interpretations, the Z bit is set to '1' if (d) and (s) are equal. The status bits are set upon the result of computing (d)−(s). N and Z are set on the result of this subtraction. The carry bit C is a "borrow" bit—i.e. it is "0" if (d) is logically less than (s). Negative numbers are considered arithmetically less than, but logically greater than, positive numbers. The CMP instruction can be used with the conditional branch instructions to branch on the comparison between the destination operand (D) and the source operand (s).

DEC : DECREMENT
Opcode: 1XXX0010
Definition: Subtract one from a copy of the operand and store the result in the operand address. Set status bit C to '1' if (d) decrements from 00 to FF; '0' otherwise. N: set on result. Z: set on result.

INC : INCREMENT
Opcode: 1XXX0011
Definition: ADD one to a copy of the operand and store the result at the operand address. Set status bits C to '1' if (d) incremented from FF to 00; '0' otherwise. Set N, Z on result.

SBB : SUBTRACT WITH BORROW
Opcode: 0XXX1011
Definition: Subtract the source operand and borrow-in from the destination operand and store the result at the destination address in RAM 12. Set status bits C to '1' if no borrow is required, '0' otherwise. Set N, Z on result. Applications: SBB is used for multiprecision two's complement subtract. A SBB instruction with an immediate operand of zero value is equivalent to a conditional decrement of the destination operand. With (s)=0, if C='0', then (d) is decremented, otherwise it is unchanged. A borrow is required if the result is negative, in this case, the carry bit is set to '0'.

SUB : SUBTRACT
Opcode: 0XXX1010
Definition: Subtract the source operand from the destination operand and store the result at the destination address. Set status bit C to '1' if result equal to or greater than 0; '0' otherwise. Set N, Z on result. Applications: SUB is used for two's complement subtraction. The carry bit is set to '0' if a borrow is required, i.e. if the result is negative.

JUMP AND BRANCH INSTRUCTIONS
BTJO : BIT TEST AND JUMP IF ONE
Opcode: 0XXX0110
Definition: Logically AND the source and destination operands and do not copy the result. If the result is non-zero, then perform a program counter relative jump using the offset operand. The program counter is set to the first byte AFTER the BTJO instruction before the offset is added. Set status bits to zero. Set Z, N on (s) AND (D). Applications: The BTJO instruction is used to test for at least one bit which has a corresponding one bit in each operand. For example, the source operand can be used as a bit mask to test for one bits in the destination address.

BTJZ : BIT TEST AND JUMP IF ZERO
Opcode: 0XXX0111
Definition: Logically AND the source and the inverted destination operand; do not copy the result. If the result is not equal to zero, then perform a program counter relative jump using the offset operand. The program counter is incremented to the instruction after the BTJZ instruction before the offset is added. Set status bits to '0'. Set Z, N on (s) AND (NOT d). Applications: The BTJZ instruction is used to test for at least one zero bit in the destinition operand which has a corresponding one bit in the source operand.

BR : BRANCH
Opcode: 1XXX1100
Definition: Branch directly to location specified by the 16-bit addressing mode. The effective address is obtained using any one of the three extended addressing modes. Set no status bits on direct and indirect addressing. For indexed addressing, C, N, Z set on addition of B and the low address byte.

DJNZ : DECREMENT REGISTER AND JUMP IF NON ZERO
Opcode: 1XXX1010
Definition: Decrement the operand the copy result to operand address. If result is non-zero, then take relative jump. Set status bit C to '1' if (d) decrements from 00 to FF; '0' otherwise. Set Z, N on resulting (d). Applications: The DJNZ instruction is used for looping control.

JC (etc.) : JUMP ON CONDITION
Opcode: 11100XXX
Definition: If tested condition is true, PC+offset is loaded into PC. No status bits are affected. Execution Results: The following table lists each conditional jump instruction, and the condition in which it will cause a jump to the location specified in the operand field.

| | Condition for Jump (Status Bit Values) | | | |
|---|---|---|---|---|
| Mnemonic | Carry | Negative | Zero | Instruction |
| JC | 1 | x | x | Jump if Carry |
| JN | x | 1 | x | Jump if Negative |
| JNC | 0 | x | x | Jump if No Carry |
| JNZ | x | x | 0 | Jump if NonZero |
| JP | x | 0 | 0 | Jump if Positive |
| JPZ | x | 0 | x | Jump if Positive or Zero |
| JZ | x | x | 1 | Jump if Zero |

Applications: The Jump on Condition instructions may be used after a CMP instruction to branch according to the relative values of the operands tested. After MOV, MOVP, LDA, or STA operations, a JZ or JNZ may be used to test if the value moved was equal to zero. JN and JPZ may be used in this case to test the sign bit of the value moved.

JMP : JUMP UNCONDITIONAL
Opcode: 11100000

Definition: Jump unconditionally using program relative addressing. PC plus offset is loaded into PC. No status bits are affected. Target address is within −127 to +128.

LOAD AND MOVE INSTRUCTIONS
LDA : LOAD A REGISTER
Opcode: 1XXX1010

Definition: Copy the contents of the source operand address to and A register; addressing modes include direct, indexed, and indirect. Set status bit C to '0'. Z, N are set on value loaded. Applications: The LDA instruction is used to read values stored in extended memory. The direct addressing provides an efficient means of directly accessing a variable in general memory. Indexed addressing provides an efficient table look-up capability. Indirect addressing allows the use of very large look-up tables and the use of multiple memory pointers since any pair of file registers can be used as the pointer. The 'decrement register and jump if non-zero' instruction (DJNZ) can be used with either indexed or indirect addressing to create fast and efficient program loops or table searches.

LDSP : LOAD STACK POINTER
Opcode: 00001101

Definition: Copy the contents of the B register to the stack pointer register. No status bits are affected. Applications: LDSP is used to initialize the stack pointer.

MOV : MOVE
Opcodes: 0XX0010, 110X000X

Definition: Copy the source operand to the destination operand address. Set status bit C to '0'. Z, N are set on value loaded. Applications: MOV is used to transfer values in the register file. Immediate values may be loaded into registers directly from the instruction.

STA : STORE A REGISTER
Opcode: 10XX1011

Definition: Copy the contents of the A register to the operand address; addressing modes include direct, indexed, and indirect. Set status bits C to '0'. N, Z are set on value loaded. Application: The STA instruction is used to read values not stored in the register or peripheral files. The direct addressing provides an efficient means of directly accessing a variable in general memory. Indexed addressing provides an efficient table look-up capability for most applications. Indirect addressing allows the use of very large look-up tables and the use of multiple memory pointers since any pair of file registers can be used as the pointer. The 'decrement register and jump if non-zero' instruction (DJNZ) can be used with either indexed or indirect addressing to create fast and efficient program loops or table searches.

STSP : STORE STACK POINTER
Opcode: 00001001

Definition: Copy the contents of the stack pointer register to the B register. No status bits are affected. Applications: LDSP is used to save the stack pointer if required. This instruction can be used to test the stack size.

SWAP : NIBBLE SWAP
Opcode: 1XXX0111

Definition: Swap the least significant nibble (4 bits) of the operand with the most significant nibble and copy the result to the operand address. The SWAP instruction is equivalent to four consecutive rotate left (RL) instructions with the carry status bit set equal to the least significant bit of the result. Set status bit C to Bit 0 of result. Z, N are set on result. Applications: SWAP is used to manipulate four bit operands, especially during packed BCD operations.

XCHB : EXCHANGE WITH B REGISTER
Opcode: 11010110

Definition: Copy the operand to the B register and then copy the original operand value to the B register. Set status bit C to '0'. Z, N are set on original contents of B. Applications: XCHB is used to exchange a file register with the B register without going through an intermediate location. The XCHB instruction with the B register as the operand can be used to test the B register contents for sign and equality with zero, like TSTB instruction.

LOGICAL INSTRUCTIONS
AND : AND
Opcode: 0XXX0011

Definition: Logically "and " the source operand to the destination operand and store the result at the destination address. Set status bit C to '0'. N, Z are set on result. Applications: AND is used to perform a logical AND of the two operands.

CLR : CLEAR
Opcode: 1XXX0101

Definition: Replace the operand value with all zeroes. Set status bits C and N to '0'. Z is set to '1'. Applications: CLR is used to clear or initialize any file register including the A and B registers.

INV : INVERT
Opcode: 1XXX0100

Definition: Invert or complemment all bits in the operand. Set status bit C to '0'. N, Z are set on result. Applications: INV performs a logical "or" one's complement of the operand. A two's complement of the operand can be made by following the INV instruction with an increment (INC).

OR : OR
Opcode: 0XXX0100

Definition: Logically "OR" the source operand to the destination operand and store the result at the destination address. Set status bits C to '0'. N, Z are set on result. Applications: OR is used to perform a logical OR of the two operands.

NOR : EXCLUSIVE OR
Opcode: 0XXX0101

Definition: Logically "exclusive or" the source operand to the destination operand and store the result at the destination address. Set status bit C to '0'. N, Z are set on results. Applications: XOR is used to perform a bit wise exclusive OR of the operands. The XOR instruction can be used to complement a bit(s) in the destination operand.

ROTATES
RL : ROTATE LEFT
Opcode: 1XXX1110

Definition: Shift the operand to the left one bit position and fill the least significant bit and the carry status bit with the value of the original most significant bit; copy the result to destination address. Set status bits C to Bit(7) of original operand. N, Z are set on result. Applications: An example of the RL instruction is: If the B register contains the value 93, then the RL instruction changes the contents of B to 27 and sets the carry status bits. Numbers are in hex.

RLC : ROTATE LEFT THROUGH CARRY
Opcode: 1XXX1111

Definition: Shift the operand to the left one bit position and fill the least significant bit with the original value of the carry status bit; copy the result to the destination address. Move the original operand most significant bit to the carry status bit. Execution Results: Bit(n)-→Bit(n+1); Carry→Bit (0); Bit(7)→Carry. Set status bit C to bit(7) of operand. N, Z are set on result. Applications: An example of the RLC instruction is: if the B register contains the value 93 and the carry status bit is a zero, then the RLC instruction changes the operand value to 26 and carry to one. Numbers are in hex.

RR : ROTATE RIGHT
Opcode: 1XXX1100

Definition: Shift the operand to the right one bit position and fill the most significant bit and the carry status bit with the value of the original least significant bit; copy the result to operand address. Execution Results: Bit(n+1)→Bit(n); Bit(0)→carry also. Set status bit C to Bit(0) of operand. N, Z are set on result. Applications: An example of the RR instruction is: If the B register contains the value 93, then the RR instruction changes the contents of B to C9 and sets the carry status bit.

RRC : ROTATE RIGHT THROUGH CARRY
Opcode: 1XXX1101

Definition: Shift the operand to the right one bit position and fill the most significant bit from the carry status bit. Fill the carry status bit with the value of the original least significant bit. Set status bit C to Bit(0) of operand. N, Z are set on result. Applications: An example of the RRC instruction is: If the B register contains the value 93 (hex) and the carry status bit is zero, then the RRC instruction changes the operand value to 49 (hex) and sets the carry status bit.

SUBROUTINE CALLS
CALL : CALL
Opcode: 1XXX1110

Definition: Push the current PC on the stack and branch to the effective operand address. For Indirect and Direct addressing mode there is no effect on Status bits. For Indexed mode, C, N, Z are set on addition of B and low address byte. Applications: CALL is used to invoke a subroutine. The PUSH and POP instructions can be used to save, pass, or restore status or file register values.

RETS : RETURN FROM SUBROUTINE
Opcode: 00001010

Definition: Pull the top two bytes from the stack and branch to the resulting 16-bit address. No status bits are affected. Applications: RETS is typically the last instruction in a subroutine. RETS results in a branch to the location immediately following the subroutine call instruction.

TRAP : SUBROUTINE TRAP
Opcodes: 1111XXXX, 11101XXX

Definition: Push the current PC on the stack and branch to the subroutine using a 16-bit address stored in high memory. No status bits are affected. Application: TRAP is used to invoke a subroutine. The PUSH and POP instructions can be used to save, pass, or restore status or file register values. There are 24 TRAP vectors which correspond to TRAP 0 through TRAP 24. The TRAP vectors are stored in memory in preselected vector address ending in FFFF. TRAP 1, TRAP 2, and TRAP 3 correspond to the hardware-invoked interrupts 1, 2, and 3 respectively. The hardware-invoked interrupts, however, push the program counter and the status register before branching to the interrupt routine, while the TRAP instruction pushed only the program counter. TRAP 0 will branch to the same code executed for a system reset.

STACK Instructions
POP : POP FROM STACK
Opcode: 1XXX1001

Definition: Remove the top entry from the stack and copy to the operand address. Decrement the stack pointer to point to the new top-of-stack entry. Set status bit to '0'. N, Z are set on value popped. Applications: The data stack can be used to save or to pass operands, especially during subroutines and interrupt service routines. The POP instruction pulls an operand from the stack.

PUSH : PUSH ON STACK
Opcode: 1XXX1000

Definition: Increment the stack pointer and place the operand value on the stack as the new top-of-stack. Set status bit C to '0'. N, Z are set on value pushed. Applications: The data stack can be used to save or to pass operands, especially during subroutines and interrupt service routines. The PUSH instruction places an operand on the stack.

CONTROL INSTRUCTIONS
CLRC : CLEAR CARRY
Opcode: 10110110

Definition: Clear the carry status; the sign and zero flags are determined by the contents of the A register. Set status bit C to '0'. N, Z are set on value of A register. Applications: CLRC is used to clear the carry flag if required before an arithmetric or rotate instruction. Note that the logical and move instructions typically clear the carry status. The CLRC instruction is equivalent to the TSTA instruction.

DINT : DISABLE INTERRUPTS
Opcode: 00000110

Definition: Clear the interrupt enable flag in the status thus disabling further interrupts. Set status bit I to '0'. C, N, Z are set to '0'. Applications: DINT is used to turn off all interrupts simultaneously. Since the interrupt enable flag is stored in the status register, the POP ST, LDST, and RETI instructions may reenable interrupts even though a DINT instruction has been executed. During the interrupt service, the interrupt enable bit is automatically cleared after the old status register value has been pushed onto the stack.

EINT : ENABLE INTERRUPTS
Opcode: 00000101

Definition: Set the interrupt enable flag in the status thus enabling interrupts. Set status bit I to '1'. C, N, A set to '1'. Applications: EINT is used to turn on all enabled interrupts simultaneously. Since the interrupt enable flag is stored in the status register, the POP ST, LDST, and RETI instructions may disable interrupts even though a TINT instruction has been executed. During the interrupt service, the interrupt enable bit is automatically cleared after the old status register value has been pushed onto the stack. Thus, the EINT instruction must be included inside the interrupt service routine to permit nested or multilevel interrupts.

IDLE : IDLE UNTIL INTERRUPT
Opcode: 00000001
Definition: Suspend further instruction execution until an interrupt or a reset occurs. No status bits are affected. Applications: IDLE is used to allow the program to suspend operation until either an interrupt or reset occurs. The programmer assures that the interrupt enable status bit (and individual interrupt enable bits in the I/O control register) are set before executing the IDLE instruction.

NOP : NO OPERATION
Opcode: 00000000
Definition: Perform no operation. No status bits are affected. Execution results in PC+1 loaded into PC. Applications: NOP is a null instruction which can be used as a pad instruction.

RETI: RETURN FROM INTERRUPT
Opcode: 00001011
Definition: Pull the top two bytes from the stack to form the return address, pull the status from the top of stack, and branch to the return address. No status bits are affected because ST register is loaded from stack. Applications: RETI is typically the last instruction in a interrupt service routine. RETI restores the status register to its state immediately before the interrupt occurred and branches back to the program at the instruction boundary where the interrupt occurred.

SETC: SET CARRY
Opcode: 00000111
Definition: Set the carry and zero status flags and clear the sign status flag. Set status bit C to '1'. N is set to '0'. Z is set to '1'. Applications: SETC is used to set the carry flag if required before an arithmetic or rotate instruction.

TSTA: TEST A REGISTER
Opcode: 10110000
Definition: Set the status bits on the value of the A register. Set status bit C to '0'. Z, N are set on value in A register. Applications: This instruction can be used to set the status bits according to the value in the A register. It is equivalent to the TSTA instruction. It may be used to clear the carry bit.

TSTB: TEST B REGISTER
Opcode: 11000001
Definition: Set the status bits on the value of the B regiseter. Set status bit C to '0'. Z, N are set on value in B register. Applications: This instruction can be used to set the status bits according to the value in the B register. It may be used to clear the carry bit.

PERIPHERAL FILE INSTRUCTIONS

BTJOP: BIT TEST AND JUMP IF ONE—PERIPHERAL
Opcode: 10XX0110
Definition: Logically AND the source and destination operands and do not copy the result. If the result is non-zero, then perform a program counter relative jump using the offset operand. The program counter is set to the first byte AFTER the BTJO instruction before the offset is added. Set Status bit C to zero. Z, N are set on (s) AND (D). Application: The BTJOP instruction is used to test for at least one bit position which has a corresponding '1' in each operand. For example, the source operand can be used as a bit mask to test for one bits in the destination peripheral file register, i.e. test bit 0 of the input A port, and jump if it is a '1'.

BTJZP: BIT TEST AND JUMP IF ZERO—PERIPHERAL
Opcode: 1000X0111
Definition: Logically AND the source and inverted destination operands, and do not copy the result. If the result is non-zero, then perform a program counter relative jump using the offset operand. The program counter is set to the first byte AFTER the BTJO instruction before the offset is added. Set status bit C to zero. Z, N are set on (s) AND (NOT D). Applications: Similar to STJOP.

ANDP: AND-PERIPHERAL
Opcode: 10XX0011
Definition: Logically AND the source and the peripheral file register specified in the destination, and place the result in the PF register. The source may be the A or B registers, or an immediate value. Set status bit C to '0'. Z, N are set on result. Applications: ANDP may be used to clear an individual bit in the peripheral file. Thus, it may be used to set an individual output line to zero. This may be done with an ANDP instruction where the source is an immediate operand that serves as a mask field. For example, bit 5 of the I/O control register (PO) is cleared, thus disabling level 3 interrupts.

MOVP: MOVE TO/FROM PERIPHERAL
Opcode: 10XX0010
Definition: Read or write data to the peripheral file. The destination is read before the source is written into it. Set status bits C to '0'. Z, N are set on value moved. Applications: MOVP is used to transfer values to and from the peripheral file. This may be used to input or output 8-bit quantities on the I/O ports. For examples, MOVP P6,A reads the data on input port B. The instruction MOVP B,P4 outputs the contents of the B register onto I/O port A. The peripheral file also contains control registers for the interrupt lines, the I/O ports, and the timer controls. A peripheral file port is read during ALL peripheral file instructions including output operations such as 'MOV A, P1'. If this read is undesirable as a result of hardware concerns, then a STA instruction should be used, using the memory-mapped address of the peripheral register.

ORP: OR-PERIPHERAL
Opcode: 10XX0100
Definition: Logically OR the source operand to the destination peripheral file register and write the result to the peripheral file register. The source may be the A or B registers, or an immediate value. Set status bit C to '0'. N, Z are set on result. Applications: ORP is used to perform a logical OR of the source operand with a peripheral file location, and write the result back to the peripheral file. May be used to set an individual bit in the I/O control register, for example.

XORP: EXCLUSIVE-OR PERIPHERAL FILE
  Opcode: 10XX0101
Definition: Logically exclusive-or the source operand to the peripheral file register specified, and write the result to the peripheral file register. Execution Results: (s) XOR (d)→(d). Set status bit C to '0'. N, Z are set on result. Applications: XORP is used to perform a bitwise exclusive OR of the operands. The XORP instruction can be used to complement a bit(s) in the destination PF register. For example, invert bit 0 of P9, which is the port C data direction register, thus reversing the direction of the bit.

TABLE B
MICROINSTRUCTIONS

| MICRO ADDRESS μA HEX | BINARY | MICRO-INSTRUCTION | MICRO ADDRESS μA HEX | BINARY | MICRO-INSTRUCTION |
|---|---|---|---|---|---|
| 00 | 00000000 | IAQ-0,IAQ-1 | 30 | 00110000 | |
| 01 | 00000001 | IDLE-0 | 31 | 00110001 | MOV-1,MOVD-2 |
| 02 | 00000010 | INT-2 | 32 | 00110010 | RESET-2 |
| 03 | 00000011 | INT-4 | 33 | 00110011 | |
| 04 | 00000100 | MPY-1 | 34 | 00110100 | MPY-7 |
| 05 | 00000101 | EINT-0 | 35 | 00110101 | MPY-6 |
| 06 | 00000110 | DINT-0 | 36 | 00110100 | |
| 07 | 00000111 | SetC-0 | 37 | 00110101 | MOVD-3 |
| 08 | 00001000 | POPST-0 | 38 | 00110000 | IDLE-1 |
| 09 | 00001001 | STSP-0 | 39 | 00110001 | INT-3 |
| 0A | 00001010 | RETS-0 | 3A | 00111010 | RETS-2 |
| 0B | 00001011 | RETI-0 | 3B | 00111011 | RETI-2 |
| 0C | 00001100 | TGA-6 | 3C | 00111000 | |
| 0D | 00001101 | LDSP-0 | 3D | 00111101 | BtoPPL-3 |
| 0E | 00001110 | PushST-0 | 3E | 00111110 | RJMP-4 |
| 0F | 00001111 | LDST-0 | 3F | 00111111 | RJMP-5 |
| 10 | 00010000 | MOVD-4 | 40 | 01000000 | DecD-1 |
| 11 | 00010001 | MOVD-5 | 41 | 01000001 | MiscGrp-0 |
| 12 | 00010010 | ST-0 | 42 | 01000010 | DecD-2 |
| 13 | 00010011 | AND-0 | 43 | 01000011 | RFtoA-0,RFtoA-1 |
| 14 | 00010100 | OR-0 | 44 | 01000100 | DRJN-1,DRJN-1a |
| 15 | 00010101 | XOR-0 | 45 | 01000101 | ItoA-0,ItoA-1 |
| 16 | 00010110 | BTH-0 | 46 | 01000110 | RETS-1 |
| 17 | 00010111 | BTL-0 | 47 | 01000111 | RFtoB-0,RFtoA-1 |
| 18 | 00011000 | ADD-0 | 48 | 01001000 | INT-5 |
| 19 | 00011001 | ADC-0 | 49 | 01001001 | RFtoRF-0 |
| 1A | 00011010 | SUB-0 | 4A | 01001010 | MPY-5 |
| 1B | 00011011 | SBB-0 | 4B | 01001011 | ItoB-0,ItoA-1 |
| 1C | 00011100 | MPY-0 | 4C | 01001100 | TGA-7 |
| 1D | 00011101 | CMP-0 | 4D | 01001101 | BtoA-0 |
| 1E | 00011110 | | 4E | 01001110 | INT-1 |
| 1F | 00011111 | | 4F | 01001111 | ItoRF-0 |
| 20 | 00100000 | STA-0 | 50 | 01010000 | AtoPPL-0 |
| 21 | 00100001 | STB-0 | 51 | 01010001 | DIRtoA-0 |
| 22 | 00100010 | DEC-0 | 52 | 01010010 | BtoPPL-0,BtoPPL-1 |
| 23 | 00100011 | INC-0 | 53 | 01010011 | INDtoA-0,RFtoA-1 |
| 24 | 00100100 | INV-0 | 54 | 01010100 | ItoPPL-0,ItoPPL-1 |
| 25 | 00100101 | CLR-0 | 55 | 01010101 | INDXtoA-0 |
| 26 | 00100110 | XCHB-0 | 56 | 01010110 | SglAS-0 |
| 27 | 00100111 | SWAP-0 | 57 | 01010111 | SglA-0 |
| 28 | 00101000 | PUSH-0 | 58 | 01011000 | SglBS-0 |
| 29 | 00101001 | POP-0 | 59 | 01011001 | SglB-0 |
| 2A | 00101010 | DRJN-0 | 5A | 01011010 | SglRFS-0,RFtoA-1 |
| 2B | 00101011 | DecD-0 | 5B | 01011011 | SglRF-0,RFtoA-1 |
| 2C | 00101100 | RR-0 | 5C | 01011100 | RJMP-0 |
| 2D | 00101101 | RRC-0 | 5D | 01011101 | TGC-0 |
| 2E | 00101110 | RL-0 | 5E | 01011110 | TGB-0 |
| 2F | 00101111 | RLC-0 | 5F | 01011111 | TGA-0 |
| 80 | 10000000 | | E0 | 11100000 | IAQ-2 |
| 81 | 10000001 | | E1 | 11100001 | INT-0 |
| 82 | 10000010 | | E2 | 11100010 | MPY-2 |
| 83 | 10000011 | RFtoA-2 | E3 | 11100011 | BtoPPL-2 |
| 84 | 10000100 | | E4 | 11100100 | RJmp-1a |
| 85 | 10000101 | ItoA-2 | E5 | 11100101 | TGA-4,TGA-4a |
| 86 | 10000110 | ItoRF-4 | E6 | 11100110 | |
| 87 | 10000111 | RFtoB-2 | E7 | 11100111 | INDXtoA-6 |
| 88 | 10001000 | | E8 | 11101000 | RESET-1 |
| 89 | 10001001 | RFtoRF-2 | E9 | 11101001 | TGA-1 |
| 8A | 10001010 | MPY-4 | EA | 11101010 | MPY-3 |
| 8B | 10001011 | ItoB-2 | EB | 11101011 | JMPL-1 |
| 8C | 10001100 | DRJN-3 | EC | 11101100 | RESET-2 |
| 8D | 10001101 | DRJN-2 | ED | 11101101 | |
| 8E | 10001110 | STAL-2 | EE | 11101110 | TGA-5 |
| 8F | 10001111 | ItoRF-2,ItoRF-3 | EF | 11101111 | TGA-2,TGA-3 |
| 90 | 10010000 | PUSH-1 | F0 | 11110000 | LDAP-0 |
| 91 | 10010001 | DIRtoA-4 | F1 | 11110001 | LDBP-0 |
| 92 | 10010010 | XCHB-1 | F2 | 11110010 | STP-0 |
| 93 | 10010011 | INDtoA-2 | F3 | 11110011 | ANDP-0 |

TABLE B-continued

MICROINSTRUCTIONS

| MICRO ADDRESS µA HEX | MICRO ADDRESS µA BINARY | MICRO-INSTRUCTION | MICRO ADDRESS µA HEX | MICRO ADDRESS µA BINARY | MICRO-INSTRUCTION |
|---|---|---|---|---|---|
| 94 | 10010100 | PUSHST-1 | F4 | 11110100 | ORP-0 |
| 95 | 10010101 | INDXtoA-5 | F5 | 11110101 | XORP-0 |
| 96 | 10010110 | SWAP-1 | F6 | 11110110 | BTHP-0 |
| 97 | 10010111 | INDtoA-3 | F7 | 11110111 | BTLP-0 |
| 98 | 10011000 | SWAP-2 | F8 | 11111000 | MOVD-0 |
| 99 | 10011001 | TGA-8 | F9 | 11111001 | TEST-0,TEST-1 |
| 9A | 10011010 | SglRFS-2 | FA | 11111010 | LDAL-0,LDAL-1 |
| 9B | 10011011 | SglRF-2 | FB | 11111011 | STAL-0 |
| 9C | 10011100 | RJMP-3 | FC | 11111100 | JmpL-0 |
| 9D | 10011101 | STAL-1 | FD | 11111101 | CMPL-0,CMPL-1 |
| 9E | 10011110 | RJMP-1,ItoA-1 | FE | 11111110 | CALL-0 |
| 9F | 10011111 | | FF | 11111111 | RESET-0 |

TABLE C

THE MICROINSTRUCTION SET

| Micro-Instruction | Microinstruction Bits | Operations |
|---|---|---|
| IAQ-0 (00) First half of instruction fetch; increment PCL via ALU | | |
| | #PCHtAH | PCH goes to AH bus |
| | #PCLtP, #PAL | PCL goes to AL bus via P bus |
| | default N | All zeros to N bus for input to ALU |
| | #AluCntl = 0000 | Add P and N for increment |
| | #ShftCntl = 0001 | Carry-In is "1" |
| | #OtPCL | ALU output goes to PCL |
| | #MEMCNT, #MEM | First half of long read |
| | #JmpAddr = (E0) | Test for interrupt; if not go to |
| | #JmpCntl = 100 | IAQ-2 (dispatch executed next state) |
| | #uC bits | Microcode for next state |
| IAQ-1 Second half of inst. fetch; increment PCH; sample Interrupts; Microcode generated in prior state | | |
| | Don't Care to AH, AL | Address went out on AH', AL' during first half |
| | #PCHtP | PCH to P bus for ALU input |
| | default N | All zeros to N bus for ALU input |
| | #AluCntl = 0000 | Add P and N |
| | #ShftCntl = 0010 | Increment on uC of PCL |
| | #OtPCH | ALU output goes to PCH |
| | #MEM | Second half of long read |
| | #MDtIR | Instruction from memory goes to IR |
| IAQ-2 (E0) Prefetch B register; Group dispatch to addressing mode | | |
| | default AH | All zeros to AH bus |
| | #ONEtAL | 01 on AL bus for B register address |
| | #PAL | AL to P bus for pass |
| | default N | All zeros to N bus for pass |
| | #AluCntl = 0000 | Add P and N for pass P |
| | #ShftCntl = 0000 | Zero carry in |
| | #OtMAL | ALU output (B register address) goes to MAL |
| | #MEM | Short memory read cycle to fetch B register |
| | #MDtT | B register contents loaded into T register from MD bus |
| | #JmpAddr = (40) | 24-Way Group dispatch based on contents of IR |
| | #JmpCntl = 101 | |
| BtoA-0 (4D) B Register to A Register Addressing Mode; Fetch A Register to MAL | | |
| | default AH, AL | All zeros to AH, AL for A register address |
| | #PAL | Zeros to P bus for pass |
| | default | zeros to N bus for pass |
| | #AluCntl = 0000 | Add P plus N (pass zeros) |
| | #ShftCntl = 0000 | Zero carry in |
| | #OtMAL | Zeros to MAL |
| | #MEM | Fetch A Register, result on MD bus |
| | #JmpAddr = (10) | Function dispatch to DOPFUN, using |
| | #JmpCntl = 001 | function field in IR |
| RFtoA-0 (43) Register file to A Register Addressing Mode; 1st Half of long read; increment PCL | | |
| | #PCHtAH | Address for immediate fetch |
| | #PCLtP | PCL to P bus |
| | #PAL | PCL to AL via P bus |
| | default N | Zeros to N bus for increment |
| | #AluCntl = 0000 | Add P plus N |
| | #ShftCntl = 0001 | Carry in is 1 to increment PCL |
| | #OtPCL | Result from ALU back to PCL |
| | #MEMCNT, #MEM | First half of long read |

TABLE C-continued
THE MICROINSTRUCTION SET

| Micro-Instruction | Microinstruction Bits | Operations |
|---|---|---|
| | #JmpAddr = (80) | Group Dispatch using field in IR (executed next state) |
| | #JmpCntl = 000 | |
| | #uC bits | Microcode for next state |
| RFtoA-1 Second half of Register File Fetch; increment PCH; Microcode generated in prior state | | |
| | Don't Care to AH, AL | Address bus continues from previous state |
| | #PCHtP | Set up PCH for increment |
| | default N | Zeros to N bus |
| | #AluCntl = 0000 | Add P plus zeros for increment |
| | #ShftCntl = 0010 | Microcarry uC in from PCL incr |
| | #OtPCH | Sum to PCH |
| | #MEM | 2nd half of long read; data on MD bus |
| RFtoA-2 (83) Fetch register file operand | | |
| | default AH | Zeros to AH for RF address |
| | #PAL,#MDtP | Low byte of RF address comes from previous memory fetch |
| | default N | Zeros to N bus for pass |
| | #AluCntl = 0000 | Pass P bus to MAL using Add |
| | #ShftCntl = 0000 | Zero carry-in |
| | #OtMAL | Result to MAL via 0 bus |
| | #MEM | Short memory read |
| | #MDtT | Read source operand into T register |
| | #JmpAddr = (4D) | Uncond Jump to BtoA-0 for A register fetch |
| | #JmpCntl = 000 | |
| RFtoB-0 (47) Register file to B Register addressing mode; First half of long read; increment PCL | | |
| | #PCHtAH | Address for immediate fetch |
| | #PAL,#PCLtP | PCL to AL and P bus |
| | default N | Zeros to N for increment |
| | #AluCntl = 0000 | Add P plus N |
| | #ShftCntl = 0001 | Carry-in is 1 for increment |
| | #OtPCL | Result back to PCL |
| | #MEMCNT,#MEM | First half of long read |
| | #JmpAddr = (87) | Uncond Jump to RFtoB-1 (executed next state) |
| | #JmpCntl = 000 | |
| | #uC bits | Microcode like RFtoA-1 for next state |
| RFtoB-2 (87) Fetch RF operand | | |
| | default AH | Zeros high byte for of RF address |
| | #MDtP,#PAL | Low byte of RF address comes from previous fetch |
| | default N | Zeros to N for pass P |
| | #AluCntl = 0000 | Add P plus N for pass |
| | #ShftCntl = 0000 | Zero carry |
| | #OtMAL | Result to MAL |
| | #MEM | Short read cycle |
| | #MDtT | Read source operand into T register |
| | #JmpAddr = (8B) | Uncond jump to ItoB-2 |
| | #JmpCntl = 000 | |
| RFtoRF-0 (49) Register file to register file addressing mode; fetch RF and increment PCL | | |
| | #PCHtAH | High byte of address |
| | #PCLtP,#PAL | PCL to AL and P bus for RF address |
| | default N | Zeros to N for increment |
| | #AluCntl = 0000 | Add P plus N |
| | #ShftCntl = 0001 | Carry-in is 1 for increment |
| | #OtPCL | Result back to PCL |
| | #MEMCNT;#MEM | First half of long read |
| | #JmpAddr = (84) | Uncond jump to RFtoA-1 |
| | #JmpCntl = 000 | |
| RFtoRF-2 (89) Fetch register file operand | | |
| | default AH | High byte of register file address |
| | #MDtP,#PAL | Low byte of address comes from previous fetch |
| | default N | Zeros to N for pass P |
| | #AluCntl = 0000 | Add P plus N for pass |
| | #ShftCntl = 0000 | Zero Carry |
| | #OtMAL | Result to MAL |
| | #MEM | Short read cycle |
| | #MDtT | Source operand from RF to T register |
| | #JmpAddr = (8F) | Uncond jump to ItoRF-2 to fetch destination operand |
| | #JmpCntl = 000 | |
| ItoA-0 (45) Fetch immediate operand; increment PCL | | |
| | #PCHtAH | Address for immediate fetch |
| | #PCLtP,#PAL | PCL to AL and P bus for fetch and |

TABLE C-continued
THE MICROINSTRUCTION SET

| Micro-Instruction | Microinstruction Bits | Operations |
|---|---|---|
| | | increment |
| | default N | Zeros to N bus |
| | #AluCntl = 0000 | Add P plus N |
| | #ShftCntl = 0001 | Carry-in is 1 for increment |
| | #OtPCL | Result back to PCL |
| | #MEMCNT,#MEM | First half of long read |
| | #JmpAddr = (80) | 3-way group dispatch on IR field; executed next state |
| | #JmpCntl = 101 | |
| | #uC bits | Microcode for next state |
| ItoA-1 Second half of immediate fetch; increment PCH; Microcode generated in prior state | | |
| | don't care AH, AL | Address defined in first half |
| | #PCHtP | Set up PCH for increment |
| | default N | Zeros to N bus |
| | #AluCntl = 0000 | Add P plus N |
| | #ShftCntl = 0010 | Micro carry in from PCL increment |
| | #OtPCH | Result back to PCH |
| | #MEM | Second half of long read |
| | #MDtT | Source operand to T register |
| ItoA-2 (85) Fetch Register A as destination operand | | |
| | default AH, AL | Zeros to AH and AL for A register address |
| | default P, N | Zeros to P and N busses |
| | #AluCntl = 0000 | Add P plus N; all zeros |
| | #ShftCntl = 0000 | Zero carry in |
| | #OtMAL | Zeros to MAL |
| | #MEM | Short read cycle for A register, result on MD |
| | #JmpAddr = (12) | Function dispatch on IR low; DOPFUN |
| | #JmpCntl = 001 | |
| ItoB-0 (4B) Immediate operand to B register addressing mode | | |
| | #PCHtAH | High address for immediate fetch |
| | #PCLtP,#PAL | PCL to AL and P bus for fetch and increment |
| | default N | Zeros to N for increment |
| | #AluCntl = 0000 | Add P plus N |
| | #ShftCntl = 0001 | Carry in is 1 for increment |
| | #OtPCL | Result back to PCL |
| | #MEMCNT,#MEM | First half long read |
| | #JmpAddr = (80) | 3-way group dispatch on IR field; executed in next state |
| | #JmpCntl = 101 | |
| | #uC bits | Microcode like ItoA-1 for next state |
| ItoB-2 (8B) Fetch B register for destination operand | | |
| | default AH | Zeros to AH bus for register file address |
| | #ONEtAL | 01 to AL bus for B register address |
| | #PAL | 01 to P bus |
| | default N | Zeros to N for pass |
| | #AluCntl = 0000 | Add P plus N for pass |
| | #ShftCntl = 0000 | Zero carry in |
| | #OtMAL | Output to MAL |
| | #MEM | Short read cycle for B register, result on MD |
| | #JmpAddr = (10) | Function dispatch using IR low; to DOPFUN |
| | #JmpCntl = 001 | |
| ItoRF-0 (4F) Immediate operand to register file mode; increment PCL Microcode same as ItoB-0 (4B) | | |
| ItoRF-2 (8F) Address fetch for register file destination operand; increment PCL | | |
| | #PCHtAH | Microcode same as ItoRF-0 and ItoB-0 |
| | #PCLtP,#PAL | |
| | default N | |
| | #AluCntl = 0000 | |
| | #ShftCntl = 0001 | |
| | #OtPCL | |
| | #MEMCNT,#MEM | |
| | #JmpAddr = (86) | Uncond jump to ItoRF-4; executed next state |
| | #JmpCntl = 000 | |
| | #uC bits | Microcode next state |
| ItoRF-3 Second half of register file address fetch; Microcode generated in ItoRF-2 | | |
| | don't care AH, AL | Address busses continued from previous cycle |
| | #PCHtP | Set up PCH for increment |
| | default N | Zeros to N bus |
| | #AluCntl = 0000 | Add P plus N |

TABLE C-continued

THE MICROINSTRUCTION SET

| Micro-Instruction | Microinstruction Bits | Operations |
|---|---|---|
| | #ShftCntl = 0010 | Increment on micro carry from PCL |
| | #OtPCH | Result back to PCH |
| | #MEM | Second half of long read |
| ItoRF-4 (86) Fetch register file operand | | |
| | default AH | Zeros to AH for register file address |
| | #MDtP, #PAL | LSH of address comes from fetch in previous state |
| | default N | Zeros to N for pass P |
| | #AluCntl = 0000 | Add P plus N (Pass P) |
| | #ShftCntl = 0000 | Zero carry in |
| | #OtMAL | Result to MAL |
| | #MEM | Short read cycle for destination operand |
| | #JmpAddr = (10) | Function dispatch on IR low; to DOPFUN |
| | #JmpCntl = 001 | |
| AtoPPL-0 (50) Addressing Mode for A register to peripheral page logical; fetch A register to T register as source operand | | |
| | default AH, AH | Zeros for A register address |
| | don't care P,N | No ALU operation so P,N ALU and |
| | don't care #AluCntl | carry controls are "don't care" |
| | don't care #ShftCntl | |
| | #MEM | Short read cycle |
| | #MDtT | A reg contents to T reg as source operand |
| | #JmpAddr = (52) | Uncond jump to BtoPPL-0 |
| | #JmptCntl = 000 | |
| BtoPPL-0 (52) B Register to Peripheral File; Immed fetch for peripheral address; Incr. PCL | | |
| | #PCHtAH | Address for immed fetch |
| | #PAL, #PCLtP | PCL to AL bus and P bus |
| | default N | Zeros to N |
| | #AluCntl = 0000 | Add P plus zeros |
| | #ShftCntl = 0001 | Carry-in = 1 for incr |
| | #OtPCL | Sum back to PCL |
| | #MEMCNT, #MEM | 1st half of immed fetch |
| | #JmpAddr = (E3) | Uncond jump to BtoPPL-2; executed next state |
| | #JmpCntl = 000 | |
| | #uC bits | Microcode for next state BtoPPL-1 |
| BtoPPL-1 Second half of long read for peripheral address fetch; increment PCH; Microcode generated in prior state | | |
| | don't care AH, AL | Address latched from prior state |
| | #PCHtP | Set up PCH for incr |
| | default N | Zeros to N bus |
| | #AluCntl = 0000 | Add P plus zeros |
| | #ShftCntl = 0010 | Micro Carry-in for incr PCH |
| | #OtPCH | Sum to PCH |
| | #MEM | 2nd half of long read |
| BtoPPL-2 (E3) Fetch Peripheral Page Operand | | |
| | #ONEtAH | Page address on AH for PF |
| | #PAL, #MDtP | AL address comes from fetch in prior state |
| | default N | Zeros to N bus |
| | #AluCntl = 0000 | Add P plus zeros |
| | #ShftCntl = 0000 | No carry (pass P) |
| | #OtMAL | ALU output (pass P) to MAL |
| | #MEMCNT, #MEM | 1st half of long read to fetch destination operand from peripheral page |
| | #JmpAddr = (3D) | Uncond jump to BtoPPL-3 |
| | #JmpCntl = 0000 | |
| BtPPL-3 (3D) 2nd Half Peripheral Page Read | | |
| | don't care AH,AL | 2nd half of long read |
| | don't care P, N | No ALU operation |
| | don't care #AluCntl, #ShftCntl | |
| | #MEM | Complete long read |
| | #JmpAddr = (F0) | Function dispatch; 16-way branch on 4-bits of IR; to DOPFUNP |
| | #JmpCntl = 001 | |
| ItoPPL-0 (54) Immed operand to Peripheral Page Addressing Mode | | |
| | Same microcode as BtoPPL-0 except Uncond jump to BtoPPL-0 (52) to be executed next state | |
| ItoPPL-1 Immed operand to Peripheral Page; fetch immed to T register; Microcode generated in ItoPPL-0 | | |
| | Same microcode as BtoPPL-1 plus #MDtT; Uncond jump to BtoPPL-0 (52) | |
| SglA-0 (57) Single Operand Addressing Mode, A Register | | |

TABLE C-continued
THE MICROINSTRUCTION SET

| Micro-Instruction | Microinstruction Bits | Operations |
|---|---|---|
| | default AH, AL | Zeros for A Reg Address on AH, AL |
| | default P, N | Zeros to P bus and N bus |
| | #AluCntl = 0000, | Pass zeros using Add |
| | #ShftCntl = 0000 | |
| | #OtMAL | Result to MAL |
| | #MEM, #MDtT | Fetch A to T reg for push |
| | #JmpAddr = (28) | Function Dispatch - to SOPFUNN |
| | #JmpCntl = 001 | |

SglB-0 (59) Single Operand, B Register
    Same microcode as SglA-0 except #ONEtAL for B reg address and #ALtP to leave B reg address in MAL SglRF-0 (5B) Single Operand, RF
    Same microcode as BtoPPL-0 except generate microcode for state just like RFtoA-1

SglRF-2 (9B) Fetch RF operand

| | | |
|---|---|---|
| | default AH | zeros for RF page |
| | #MDtP, #PAL | MD used as address for fetch and passed to MAL |
| | default N | Zeros to N for pass P |
| | #AluCntl = 0000, | Pass P using add |
| | #ShftCntl = 0000 | |
| | #OtMAL | Address from MD to MAL |
| | #MEM, #MDtT | Read destination operand, to T reg for Push |
| | #JmpAddr = (28), | |
| | #JmpCntl = 001 | Function Dispatch - to SOPFUNN |

SglAS-0 (56) Single Operand; A Reg; Special Operations
    Same microcode as SglA-0 except no #MDtT; function dispatch to (20) SOPFUNS SglBS-0 (58) Single Operand; B Reg; Special
    Same microcode as SglB-0 except no #MDtT; Function Dispatch to (20) SOPFUNS SglRFS-0 (5A) Single Operand; RF; Special Operations
    Same microcode as SglRF-0; Generate microcode for state like RFtoA-1

SglRFS-2 (9A) Single Operand; RF; Special Operations
    Same microcode as SglRF-2 except no #MDtT; function Dispatch to (20) SOPFUNS INDtoA-0 (53) Indirect through Reg File; Lower reg has high byte of address, upper reg has low byte of address
    Same microcode as BtoPPL-0; Generate microcode for state like RFtoA-1 then group dispatch INDtoA-2 (93) Fetch Low byte of indirect address
    Same microcode as SglRF-2 except #AluCntl = 1111 for subtract to decrement RF address to next byte; Uncond jump to INDtoA-3 (97)

INDtoA-3 (97) Fetch high byte of indirect address

| | | |
|---|---|---|
| | default AH | Zeros for RF page |
| | #MALtAL | Low byte of RF address |
| | default P | Zeros to P bus for pass |
| | #TtN | Pass T reg |
| | #AluCntl = 0000, | Pass using add |
| | #ShftCntl = 0000 | |
| | #OtMAL | T reg to MAL |
| | #MEM, #MDtT | Read high byte of indirect address to T reg |
| | #JmpAddr = (F9), | Function dispatch, LAFUN |
| | #JmpCntl = 001 | |

DIRtoA-0 (51) Direct Two Byte Long Addressing Mode; PC+1 has high byte of address, PC+2 has low byte
    Same microcode as BtoPPL-0; Uncond jump to INDtoA-1 (53)

DIRtoA-1 2nd Half high byte address fetch
    Same microcode as BtoPPL-1, plus #MDtT to store in T reg DIRtoA-4 (91) Pass low btye of Address to MAL

| | | |
|---|---|---|
| | don't care AH, AL | No memory cycle |
| | #MDtP | Low byte from memory |
| | default N | Zeros to N for pass |
| | #AluCntl = 0000, | Pass using add |
| | #ShftCntl = 0000 | |
| | #OtMAL | Result to MAL |
| | #JmpAddr = (F9), | Function Dispatch using low IR |
| | #JmpCntl = 001 | |

INDXtoA-0 (55) Long Indexed Addressing Mode; PC+1 has high byte of Table Address; PC+2 has low byte

| | | |
|---|---|---|
| | don't care AH, AL | No memory cycle |
| | default P | Zeros to P bus for pass |
| | #TtN | T reg to N bus |
| | #AluCntl = 0000, | Pass N bus to MAL using add |
| | #ShftCntl = 0000 | |
| | #OtMAL | Result to MAL |

TABLE C-continued
THE MICROINSTRUCTION SET

| Micro-Instruction | Microinstruction Bits | Operations |
|---|---|---|
| | #JmpAddr = (51), #JmpCntl = 000 | Uncond Jump to DIRtoA(0) |
| INDXtoA-5 (95) Add low byte of address to B reg (in MAL) | | |
| | don't care AH | No memory cycle |
| | #MALtAL, #PAL | MAL (B reg) to P bus via AL bus |
| | #MDtN | Low byte of table address from MD to N bus |
| | #AluCntl = 0000, #ShftCntl = 0000 | Add for index |
| | #OtMAL | Result to MAL |
| | #JmpAddr = (E7) #JmpCntl = 000 | Uncond jump to INDX to A-6 |
| INDXtoA-6 (E7) Ripple Carry to High Byte Address | | |
| | Don't care AH, AL | No memory cycle |
| | default P | Zeros to P bus for increment |
| | #TtN | High byte of address from T reg to N bus |
| | #AluCntl = 0000, #ShftCntl = 010 | Pass P, increment if microcarry set from low byte |
| | OtM, #MDtT | Result back to T reg |
| | #JmpAddr = (F9), #JmpCntl = 001 | Function Dispatch to LAFUN |
| RJmp-0 (5C) Relative Jump Group; Dispatch using Macrojump - Test Status Bits Defined by IR | | |
| | don't care AL, AH | No memory cycle |
| | don't care P, N, Alu | No ALU operation |
| | #JmpAddr = (9E) | If macrojump true go to 9F; if not go to 9E |
| | #JmpCntl = 111 | |
| RJmp-1 (9E) No Jump; Increment PC | | |
| | Same microcode as ItoA-0, except #JmpAddr = (00), #JmpCntl = 000 for uncond jump to IAQ-0 (executed next state), and #uC bits for next state just like ItoA-1 | |
| RJmp-1a (E4) No Jump; Increment PCH and return to IAQ | | |
| | Same microcode as ItoA-1 | |
| RJmp-2 (9F) Jump; Fetch Immed for Offset; Increment PCL | | |
| | Same microcode as Rjmp-1, except #JmpAddr = (9C) for uncond jump to RJmp-3 (executed next state). | |
| RJmp-3 (9C) Add Offset to PCL, Test if offset negative | | |
| | don't care AH, AL | No memory cycle |
| | #PCLtP | PCL to P bus |
| | #MDtN | Offset to N bus |
| | #AluCntl = 0000, #ShftCntl = 0000 | Add PCL plus offset (minus if negative) |
| | #OtPCL | Result to PCL |
| | #JmpAddr = (3E) | 2-way branch on bit-7 of T reg; if offset negative go to RJmp-5 |
| | #JmpCntl = 010 | |
| RJmp-4 (3E) Positive offsets, increment PCH on carry | | |
| | Same microcode as RFtoA-1 except no #MEM, and #JmpAddr = (00), #JmpCntl = 000 for return to IAQ | |
| RJmp-5 (3F) Negative offset, Decrement PCH on borrow | | |
| | Same microcode as RJmp-4 except #AluCntl = 1111, subtract for decrement on borrow (UC = 0) | |
| MiscGrp-0 (41) Miscellaneous Instruction Group; Fetch top, decrement SP | | |
| | default AH | High byte of Reg File Address |
| | #SPtAL | Stack pointer to AL to fetch top |
| | #ALtP | SP to P bus for decrement |
| | default N | Zeros to N bus |
| | #AluCntl = 1111, #ShftCntl = 0000 | Decrement P bus |
| | #OtMAL | Result back to MAL |
| | #MEM | Read top of stack |
| | #JmpAddr = (00) #JmpCntl = 001 | Function Dispatch to MISC |
| TGC-0 (5D) Trap Group C (Addresses FFEF-FFE7); form LSH of trap vector address from IR | | |
| | Don't care AH, AL | No memory cycle |
| | default P | Zeros to P bus to pass N using Add |
| | #IRtN | Instruction to N bus |
| | #AluCntl = 0000 | Add (Pass N) |
| | #ShftCntl = 0101 | Rotate Left, MSB to LSB |
| | #OtMAL | Result (LSH of vector) goes to MAL |
| | #JmpAddr = (E9) #JmpCntl = 000 | Uncond jump to TGA-1 |
| TGB-0 (5E) Trap Group B (Addresses FFF7-FFF0); form LSH of trap vector address from instruction in IR | | |
| | Don't care AH, AL | No memory cycle |
| | default P | Zeros to P for pass N |
| | #IRtN | Instruction to N bus |

TABLE C-continued
THE MICROINSTRUCTION SET

| Micro-Instruction | Microinstruction Bits | Operations |
|---|---|---|
| | #AluCntl = 0000 | Add (Pass N) |
| | #ShftCntl = | Rotate left, MSB to LSB |
| | #OtMAL | Result to MAL |
| | #JmpAddr = (E9) | Uncond Jump to TGA-1 |
| | #JmpCntl = 000 | |

TGA-0 (5F) Trap Group A (Addresses FFFF-FFF8); form low byte (LSH) of trap vector address from IR
    Microcode same as TGC-0 or TGB-0

TGA-1 (E9) Form high byte of Trap Vector Address (of low byte of vector)

| | | |
|---|---|---|
| | don't care AH, AL | No memory cycle |
| | default N, P | All zeros for P and N busses |
| | #AluCntl = 1111 | ALU produces all ones by subtract operation |
| | #ShftCntl = 0000 | Carry-in = 0 |
| | #MDtT | OtM asserted; ALU result (all 1's) to T reg |
| | #JmpAddr = (EF) | Uncond jump to TGA-2 |
| | #JmpCntl = 000 | |

TGA-2 (EF) First Half Fetch of Low Byte of Vector

| | | |
|---|---|---|
| | #TtAH | All 1's (FF) from T reg to AH |
| | #MALtAL, #PAL | Low byte of vector to AL and P |
| | default N | Zeros to N for decrement |
| | #AluCntl = 1111 | Subtract |
| | #ShftCntl = 0000 | |
| | #OtMAL | Result to MAL |
| | #MEMCNT, #MEM | First half of long read |
| | #JmpAddr = (E5) | Uncond jump to TGA-4 (executed next state) |
| | #JmpCntl = 000 | |
| | #uC bits | Microcode for next state |

TGA-3 2nd Half of fetch of low byte of vector; Microcode generated in prior state

| | | |
|---|---|---|
| | don't care AH, AL, P, N, #AluCntl, #ShftCntl | No memory cycle and no ALU operation |
| | #MEM | 2nd half long read |

TGA-4 (E5) First Half of Fetch of high byte of vector

| | | |
|---|---|---|
| | #TtAH | FF to AH bus from T reg |
| | #MALtAL | Incremented vector to AL |
| | #MDtP | Low byte of vector to P bus |
| | default N | Zeros to N bus for Pass P |
| | #AluCntl = 0000 | Pass P using Add |
| | #ShftCntl = 0000 | Zero carry-in |
| | #OtMAL | Low byte of vector to MAL |
| | #MEMCNT, #MEM | 1st half of long read |
| | #JmpAddr = (EE) | Uncond jump to TGA-5 |
| | #JmpCntl = 000 | |

TGA-4a 2nd Half of Fetch of High Byte of Vector; Microcode from prior state

| | | |
|---|---|---|
| | Don't care AL, AH | Address latched in first half |
| | Don't care P, N, AluCntl | No ALU cycle |
| | #MEM, #MDtT | 2nd half long read; high byte of vector to T Reg |

TGA-5 (EE) Increment SP

| | | |
|---|---|---|
| | Don't Care AH | Address latched in first half |
| | #SPtAL, #PAL | Stack pointer to P bus via AL bus |
| | default N | Zeros to N bus |
| | #AluCntl = 0000 | Add operation for increment |
| | #ShftCntl = 0001 | Carry-in = 1 |
| | #OtSP | Incremented SP back to SP |
| | #JmpAddr = (OC) | Uncond jump to TGA-6 |

TGA-6 (OC) Push PCH to Stack

| | | |
|---|---|---|
| | default AH | Zeros to AH for RF address |
| | #SPtAL | SP to AL for stack write |
| | #PCHtP | PCH to P bus for pass |
| | default N | Zeros to N for pass P |
| | #AluCntl = 0000 | Add operation for pass |
| | #ShftCntl = 0000 | Carry-in = 0 |
| | #MEM, #WR | Write PCH to Stack; OtM asserted |
| | #JmpAddr = (4C) | Uncond jump to TGA-7 |

TGA-7 (4C) Increment Stack Pointer
    Same Microcode as TGA-5 except no #MEM, #MDtT and #JmpAddr = (99) for uncond jump to TGA-8

TGA-8 (99) Write PCL to Stack
    Same Microcode as TGA-6 except #PCLtP instead of #PCHtP and #JmpAddr = (FC) for uncond jump to JmpL-0

ADD-0 (18) Add; Dual Operand Function; Reg File

| | | |
|---|---|---|
| | default AH | Zeros to AH for RF address |
| | #MALtAL | MAL reg to AL bus for RF address |
| | #MDtP | Destination operand from memory to P |

TABLE C-continued
THE MICROINSTRUCTION SET

| Micro-Instruction | Microinstruction Bits | Operations |
|---|---|---|
| | | bus |
| | #TtN | Source operand from T reg to N bus |
| | #AluCntl = 0000 | Add P plus N |
| | #ShftCntl = 0000 | No carry-in |
| | #LST | Latch Status |
| | #MEM, #WR | Short Memory write cycle, OtM asserted to write ALU output in destination address |
| | #JmpAddr = (00) | Uncond jump to IAQ-0 |
| | #JmpCntl = 0000 | |

ADC-0 (19) Add with carry; dual operand; Reg File
    Microcode same as ADD-0 (18) except #ShftCntl = 0011 for
    status carry bit in
SUB-0 (1A) Subtract; Dual operand function; Register file
    Microcode same as ADD-0 (18) except #AluCntl = 1111, #ShftCntl =
    0001 for subtract with carry-in = 1
SBB-0 (1B) Subtract with borrow
    Microcode same as SUB-0 except #ShftCntl = 0011 for status
    carry bit in
CMP-0 (1D) Compare Function; Dual Op; Reg File

| | don't care AH, AL | No memory cycle |
|---|---|---|
| | #MDtP | Destination operand from memory to P bus |
| | #TtN | Source operand from T reg to N bus |
| | #AluCntl = 0111 | Subtract |
| | #ShftCntl = 0001 | Carry-in = 1 |
| | #LST | Latch Status |
| | #JmpAddr = (00) | Uncond Jump to IAQ |
| | #JmpCntl = 000 | |

ST-0 (12) Store Function; Move Source to Destination; Reg File

| | default AH | Zeros to AH bus for RF address |
|---|---|---|
| | #MALtAL | AL address from MAL |
| | default P | Zeros to P bus for pass N |
| | #TtN | Source operand from T reg to N bus |
| | #AluCntl = 0000 | Add function for pass |
| | #ShftCntl = 0000 | No carry-in |
| | #LST | Latch Status |
| | #MEM, #WR | Generate OtM; write result to dest address |
| | #JmpAddr = (00) | Uncond jump to IAQ |
| | #JmpCntl = 000 | |

AND-0 (13) AND Function; Dual Operand; Reg File

| | default AH | Zeros to AH for RF address |
|---|---|---|
| | #MALtAL | AL address from MAL |
| | #MDtP | Destination operand from memory to P bus |
| | #TtN | Source operand from T reg t N bus |
| | #AluCntl = 0001 | AND function in ALU |
| | #ShftCntl = 0000 | No carry-in |
| | #LST | Latch Status |
| | #MEM, #WR | Generate OtM; write result to destination address |
| | #JmpAddr = (00) | Uncond jump to IAQ |
| | #JmpCntl = 000 | |

OR-0 (14) OR Function
    Same microcode as AND-0 except #AluCntl = 0111 for OR
XOR-0 (15) XOR Function
    Same microcode as AND-0 except #AluCntl = 1111 for XOR
BTH-0 (16) Bit Test, High; Dual Operand; Reg file

| | Don't care AH, AL | No memory cycle |
|---|---|---|
| | #MDtP | Destination operand from memory to P bus |
| | #TtN | Source operand from T reg to N bus |
| | #AluCntl = 0001 | AND function |
| | #ShftCntl = 0000 | No carry-in |
| | #LST | Latch Status |
| | #JmpAddr = (44) | Uncond jump to DRJN-1 then RJMP-3 |
| | #JmpCntl = 000 | |

BTL-0 (17) Bit Test, Low
    Same microcode as BTH-0 except #AluCntl = 1011 for inverted-P
    and N
Multiply operation MPY-0 to MPY-7 performs function of (source) x
(destination) and stores result in A reg, B reg. MAL is storage for PCL; IR
is used for loop count, counts 9 times; PCL is partial product, low byte of
answer; B reg is multiplier, low byte of answer; T is multiplicand.
MPY-0 (1C) Write general destination to B reg

| | default AH, #ONEtAL | B reg address on AH, AL |
|---|---|---|
| | #MDtP | Destination operand from addressing mode to P bus |
| | default N | Zeros to N bus for pass |

TABLE C-continued
THE MICROINSTRUCTION SET

| Micro-Instruction | Microinstruction Bits | Operations |
|---|---|---|
| | #AluCntl = 0000, | Pass, no carry |
| | #ShftCntl = 0000 | |
| | #MEM, #WR | OtM; write destination operand to B reg |
| | #JmpAddr = (04) | Uncond jump to MPY-1 |
| | #JmpCntl = 000 | |
| MPY-1 (04) Save PCL in MAL reg | | |
| | don't care AL, AH | No memory cycle |
| | #PCLtP | PCL to P bus for pass |
| | default N | Zeros to N bus |
| | #AluCntl = 0000, | Pass no carry |
| | #ShftCntl = 0000 | |
| | #OtMAL | PCL stored in MAL |
| | #JmpAddr = (E2) | Uncond jump to MPY-2 |
| | #JmpCntl = 000 | |
| MPY-2 (E2) Clear count (IR) and partial product (PCL) Registers | | |
| | don't care AL, AH | No memory cycle |
| | default N, P | Zeros to N and P busses for constant |
| | #AluCntl = 0000, | Pass, no carry |
| | #ShftCntl = 0000 | |
| | #LST | Latch Status |
| | #OtPCL | Zeros to PCL (partial product reg) |
| | OtM, #MDtIR | Zeros to IR (shift count reg) |
| | #JmpAddr = (EA) | Uncond jump to MPY-3 |
| MPY-3 (EA) Rotate Right the Partial Product; fetch multiplier from B reg | | |
| | default AH, #ONEtAL | B reg address on AH, AL |
| | #PCLtP | PCL to P bus for rotate |
| | default N | Zeros to N bus for pass P |
| | #AluCntl = 0000 | Pass |
| | #ShiftCntl = 1011 | Rotate right, STC to MSB |
| | #LST | Latch status; LSB to STC |
| | #OtPCL | Partial product back to PCL |
| | #MEM | Fetch B reg |
| | #JmpAddr = (8A) | Uncond jump to MPY-4 |
| | #JmpCntl = 000 | |
| MPY-4 (8A) Rotate multiplier back to B reg | | |
| | default AH, #ONEtAL | B reg address to AH, AL |
| | #MDtP | B reg contants from memory to P bus |
| | default N | Zeros to N |
| | #AluCntl = 0000 | Pass |
| | #ShftCntl = 0101 | Rotate right, STC to MSB |
| | #LST | Latch Status; LSB to STC |
| | #MEM, #WR | Multiplier back to B reg |
| | #JmpAddr = (4A) | Uncond jump to MPY-5 |
| | #JmpCntl = 000 | |
| MPY-5 (4A) Increment and rotate shift count; Test STC (Multiplier) | | |
| | don't care AH, AL | No memory cycle |
| | default P | Zeros to P bus |
| | #IRtN | Shift Count to N bus |
| | #AluCntl = 0000 | Pass |
| | #ShftCntl = 0101 | Rotate left and increment, gives 9x loop |
| | OtM, #MDtIR | Shift count back to IR |
| | #JmpAddr = (34) | Test multiplier bit; if = 1 to MPY-6; if = 0 to MPY-7 (Jump on status carry bit) |
| | #JmpCntl = 110 | |
| MPY-6 (35) If Multiplier bit is 1, T + PCL to PCL | | |
| | don't care AH, AL | No memory cycle |
| | #PCLtP | Partial Product from PCL to P bus |
| | #TtN | Multiplicand from T reg to N bus |
| | #AluCntl = 0000, | Add, multiplicand plus partial product of the partial product |
| | #ShftCntl = 0000 | |
| | #LST | Latch status, save STC |
| | #OtPCL | Sum of multiplicand and partial product to PCL |
| | #JmpAddr = (EA) | Uncond jump to MPY-3 for loop |
| | #JmpCntl = 000 | |
| MPY-7 (34) If Multiplier bit is zero, clear STC | | |
| | default AH, AL | Zeros for A reg address |
| | #PCLtP | PCL to P bus to write in A reg |
| | default N | Zeros to N bus for pass partial product |
| | #AluCntl = 0000, | Add function, no carry-in for pass P |
| | #ShftCntl = 0000 | |
| | #LST | Latch status; zero to STC; set status on high byte |
| | #MEM, #WR | Write to A reg |
| | #JmpAddr = (EA) | Test loop count; to MPY-3 or JMPL-1 |
| | #JmpCntl = 011 | Jump on uEZ |

TABLE C-continued
THE MICROINSTRUCTION SET

| Micro-Instruction | Microinstruction Bits | Operations |
|---|---|---|

LDAP-0 (F0) Load A (Move to A) Function for Peripheral Page; Move destination operand to A reg

| | default AH, AL | Zeros for A reg address |
| | #MDtP | Destination operand from memory to P bus |
| | default N | Zeros to N bus |
| | #AluCntl = 0000 | Add P plus zeros (pass P) |
| | #ShftCntl = 0000 | No carry |
| | #LST | Latch status |
| | #MEM, #WR | ALU output to MD Bus (OtM asserted), so result written into A reg |
| | #JmpAddr = (00) | Jump to IAQ-0 |
| | #JmpCntl = 000 | |

LDBP-0 (F1) Load B (Move to B) Function for Peripheral Page; Move destination operand to B reg Microcode same as LDAP-0 (F0) except #ONEtAL instead of default AL to generate B reg address on AL

STP-0 (F2) Store Function for Peripheral Page; Move source operand to destination

| | #ONEtAH | Peripheral page address to AH |
| | #MALtAL | AL address comes from MAL |
| | default P | Zeros to P bus |
| | #TtN | T reg to N bus |
| | #AluCntl = 0000 | Add zeros to N (pass) |
| | #ShftCntl = 0000 | No carry |
| | #LST | Latch status |
| | #MEMCNT, #MEM, #WR | 1st half of long write; ALU output on MD (OtM) |
| | #JmpAddr = | Uncond jump to STAL-2 |
| | #JmpCntl = 000 | |

ANDP-0 (F3) And Function for Peripheral Page; Dual Operand

| | #ONEtAH | Peripheral page address |
| | #MALtAL | AL from MAL |
| | #MDtP | Destination operand from memory to P bus |
| | #TtN | Source operand from T reg to N bus |
| | #AluCntl = 0001, #ABL = 1 | Logical AND |
| | #ShftCntl = 0000 | No carry |
| | #LST | Latch status |
| | #MEMCNT, #MEM, #WR | 1st half long write; ALU result on MD (OtM) |
| | #JmpAddr = (8E) | Uncond jump to STAL-2 |
| | #JmpCntl = 000 | |

ORP-0 (F4) OR Function for Peripheral Page; Dual Operand

Microcode same as ANDP-0 (F3) except #AluCntl = 0111, #ABL = 1 for OR instead of AND

XORP-0 (F5) Exclusive OR Function for Peripheral Page; Dual Operand

Microcode same as ANDP-0 (f3) except #AluCntl = 1111, #ABL = 1 for XOR

BTHP-0 (F6) Bit Test High Function, Peripheral; Dual Operand

| | Don't Care AH, AL | No memory cycle |
| | #MDtP | Destination operand from memory to P bus |
| | #TtN | Source operand from T reg to N bus |
| | #AluCntl = 0001, #ABL = 1 | P AND N performed in ALU |
| | #ShftCntl = 0000 | No carry |
| | #LST | Latch status |
| | #JmpAddr = (44) | Uncond jump to DRJN-1 |
| | #JmpCntl = 0000 | |

BTLP-0 (F7) Bit Test Low Function, Peripheral; Dual Operand

Microcode same as BTHP-0 (F6) except #AluCntl = 1011, #ABL = 1 for (Not P) AND N function

PUSH-0 (28) Push Function; Single Operand is in T reg from Addressing Mode; Increment stack Pointer

| | Don't care AH | No memory cycle |
| | #SPtAL, #PAL | SP to ALU via AL and P busses |
| | default N | Zeros to N |
| | #AluCntl = 0000 | Add zeros to SP with carry-in for increment |
| | #ShftCntl = 0001 | Carry-in = 1 |
| | #OtSP | Result back to SP |
| | #JmpAdr = 90 | Uncond jump to Push-1 |
| | #JmpCntl = 000 | |

PUSH-1 (90) Push con't; Write single operand onto stack

| | default AH | Zeros to AH for RF address |
| | #SPtAL | R address is SP |
| | default P | Zeros to P bus |
| | #TtN | Operand from T reg to N for pass N |

TABLE C-continued
THE MICROINSTRUCTION SET

| Micro-Instruction | Microinstruction Bits | Operations |
|---|---|---|
| | #AluCntl = 0000 | Add zeros to T for pass |
| | #ShftCntl = 0000 | No carry-in |
| | #MEM, #WR | Short memory write; OtM asserted; write T reg contents on stack |
| | #JmpAddr = (00) | Uncond jump to IAQ-0 |
| | #JmpCntl = 000 | |
| POP-0 (29) Pop Stack; Fetch Top of Stack and Decrement stack Pointer | | |
| | default AH | Zeros to AH for RF address |
| | #SPtAL | RF address is SP |
| | #PAL | SP to P for decrement in ALU |
| | default N | Zeros to N bus |
| | #AluCntl = 1111 | P minus N minus 1 |
| | #ShftCntl = 0000 | No carry-in |
| | #OtSP | Result back to SP |
| | #MEM | Read top of stack from RF |
| | #MDtT | From memory back to T reg |
| | #JmpAddr = (92) | Uncond jump to XCHB-1 for dest write |
| | #JmpCntl = 000 | |
| DecD-0 (2B) Decrement Double; Least Sig Half Register Decrement, Back to Memory | | |
| | default AH | For RF address |
| | #MALtAL | Reg address from MAL |
| | #MDtP | LSH from memory to P bus |
| | default N | Zeros to N bus for decrement P |
| | #AluCntl = 1111 | Decrement LSH |
| | #ShftCntl = 0000 | |
| | #LST | Latch status; save borrow |
| | #MEM, #WR | Write LSH lack to MEM; OtM asserted |
| | #JmpAddr = (40) | Uncond jump to DecD-1 |
| | #JmpCntl = 000 | |
| DecD-1 (40) Load Zeros to T (for sharing with SUB microcode) | | |
| | Don't Care AL, AH | No memory cycle |
| | default N, P | Zeros to N and P busses |
| | #AluCntl = 0000 | Add zeros |
| | #ShftCntl = 0000 | No carry |
| | OtM, #MDtT | ALU output to T reg (zeros) |
| | #JmpAddr = (42) | Uncond jump to DecD-2 |
| | #JmpCntl = 000 | |
| DecD-2 (42) Decrement MAL to Point to the Most Sig Half | | |
| | Don't Care AH | No memory cycle |
| | #MALtAL, #PAL | MAL to P via AL bus |
| | default N | Zeros to N bus |
| | #AluCntl = 1111 | Decrement P bus (MAL Reg) |
| | #ShftCntl = 0000 | |
| | OtM | Result to MD bus |
| | #JmpAddr = (81) | Uncond Jump to 1toRF-4 then to Sub-0 |
| | #JmpCntl = 000 | |
| DRJN-0 (2A) Decrement Reg and Jump on Not Zero; First State decrements and writes back, set u zero | | |
| | default AH | RF address is zeros on AH |
| | #MALtAL | RF address is destination in MAL |
| | #MDtP | Destination operand to P bus from memory |
| | default N | Zeros on N bus for decrement |
| | #AluCntl = 1111 | Subtract for decrement; set u zero |
| | #ShftCntl = 0000 | |
| | #MEM; #WR | Write ALU output via OtM to destination |
| | #JmpAddr = (44) | Uncond jump to DRJN-1 |
| | #JmpCntl = 000 | |
| DRJN-1 (44) Con't; 1st half of Offset Fetch | | |
| | #PCHtAH | PCH to address high and |
| | #PCLtP, #PAL | PCL to address low to fetch immed offset |
| | default N | Zeros to N bus for increment P |
| | #AluCntl = 0000 | Add P bus (PCL) to zeros, carry-in = 1 |
| | #ShftCntl = 0001 | Carry-in = 1 for increment |
| | #OtPCL | Result back to PCL |
| | #MEMCNT, #MEM | 1st half of long read |
| | #JmpAddr = (8C) | "Micro equal zero" dispatch; if UEZ = 1 go to DRJN-1 (8D), else to DRJN-3 (8C); execute next state |
| | #JmpCntl = 011 | |
| | #uC bits | Microcode for next state |
| DRJN-1a Con't; 2nd half of Immed Fetch; Microcode generate in last state | | |
| | Don't care AH, AL | No memory cycle |
| | #PCHtP | PCH to P bus |
| | default N | Zeros to N for increment |
| | #AluCntl = 0000 | Add P bus (PCH) plus zeros |

TABLE C-continued
THE MICROINSTRUCTION SET

| Micro-Instruction | Microinstruction Bits | Operations |
|---|---|---|
| | #ShftCntl = 0010 | Micro carry-in; increment PCH if carry from PCL |
| | #OtPCH | Result back to PCH |
| | #MEM; #MDtT | 2nd half long read; offset back to T reg |

DRJN-2 (8D) Con't No Jump, return to IAQ
　　don't care AL, AL　　No memory cycle
　　don't care P, N, Alu　　No ALU cycle
　　#JmpAddr = (00)　　Uncond jump to IAQ-0
　　#JmpCntl = 000

DRJN-3 (8C) Con't; Jump Condition Valid; 2nd Half Immed Fetch
　　Microcode same as DRJN-2 (8D) except #JmpAddr = (9C) to go to RJMP-3 to complete relative jump

RR-0 (2C) Rotate Right Circular; Single Operand Function
　　default AH　　Zeros for RF address on AH
　　#MALtAL　　RF address in MAL from addressing mode
　　#MDtP　　Destination operand from memory to P bus
　　default N　　Zeros to N for pass P
　　#AluCntl = 0000　　Add zeros to P
　　#ShftCntl = 1001　　Rotate right, carry-in = 0
　　#LST　　Latch status
　　#MEM, #WR　　Result to MD; OtM asserted; write in destination address
　　#JmpAddr = (00)　　Uncond jump to IAQ
　　#JmpCntl = 000

RRC-0 (2D) Rotate Right Thru Carry
　　Microcode same as RR-0 (2C) except #ShftCntl = 1011 for rotate right thru carry

RL-0 (2E) Rotate Left Circular; shared as 4th rotate in Swap Function
　　Microcode same as RR-0 (2C) except #ShftCntl = 0101 for rotate left

RLC-0 (2F) Rotate Left Thru Carry
　　Microcode same as RR-0 (2C) except #ShftCntl = 0111 for rotate left thru carry

STA-0 (20) Store A (Move from A) Function; Fetch A Reg to Move to B Reg or RF
　　default AH, AL　　Zeros for Reg A address
　　Don't Care P, N, #AluCntl　　No ALU operation
　　#MEM, #MDtT　　Read A reg to T reg
　　#JmpAddr = (21)　　Uncond jump to STB-0 to write A reg to destination address

STB-0 (21) Store B (Move from B) Function; Move T Reg to Destination Address in MAL; used for MOV A,B; MOV A, RF; MOV B, RF; TST A; TST B
　　default AH　　Zeros on AH for RF address
　　#MALtAL　　Destination addess to AL
　　default P　　Zeros to P bus
　　#TtN　　Source operand from T reg to N bus
　　#AluCntl = 0000　　Pass destination operand
　　#ShftCntl = 0000　　Carry-in = 0
　　#LST　　Latch status
　　#MEM, #WR　　Result via OtM to destination address in RF
　　#JmpAddr = (00)　　Uncond jump to IAQ
　　#JmpCntl = 000

DEC-0 (22) Decrement; Single Operand Function
　　Microcode same as Decrement Double DecD-0 (2B) except #JmpAddr = (00); #JmpCntl = 000 for return to IAQ

INC-0 (23) Increment; Single Operand Function
　　Microcode same as DEC-0 (22) except #AluCntl = 0000; #ShftCntl = 0001 for add-1 or increment

INV-0 (24) Invert; Single Operand Function
　　default AH　　Zeros to AH for RF address
　　#MALtAL　　RF address is in MAL from addressing mode
　　#MDtP　　Destination operand from memory to P bus
　　don't care N　　One operand so N bus is don't care
　　#AluCntl = 1010, #ABL = 1　　Invert P
　　#ShftCntl = 0000　　Carry-in 0
　　#LST　　Latch status
　　#MEM, #WR　　Write result via OtM to destination address
　　#JmpAddr = (00)　　Uncond jump to IAQ
　　#JmpCntl = 000

CLR-0 (25) Clear; Single Operand Function
　　Microcode same as INV-0 (24) except #AluCntl = 1001 for zeros

TABLE C-continued

THE MICROINSTRUCTION SET

| Micro-Instruction | Microinstruction Bits | Operations |
|---|---|---|
| XCHB-0 (26) Exchange B Reg with Destination Operand; 1st state-write destination operand in B reg. | | |
| | default AH | Zeros to AH for RF address |
| | #ONEtAL | B reg address to AL |
| | #MDtP | Destination operand from memory to P bus |
| | default N | Zeros to N bus for pass P |
| | #AluCntl = 0000 | Add P plus zeros |
| | #ShftCntl = 0000 | Carry-in = 0 |
| | #LST | Latch status |
| | #MEM, #WR | Write via OtM to B reg |
| | #JmpAddr = (92) | Uncond jump to XCHB-1 |
| | #JmpCntl = 000 | |
| XCHB-1 (92) Write B Reg to Destination Location | | |
| | default AH | Zeros to AH for RF address |
| | #MALtAL | MAL to AL for destination address |
| | default P | Zeros to P bus for pass N |
| | #TtN | B reg operand from T reg to N bus |
| | #AluCntl = 0000 | Add zeros to N using Add |
| | #ShftCntl = 0000 | No carry-in |
| | #MEM, #WR | Memory writes; generate OtM; T reg contents thru ALU to Destination |
| | #JmpAddr = (00) | Uncond jump to IAQ |
| | #JmpCntl = 000 | |
| SWAP-0 (27) Single Operand Swap function; First rotate back to MD bus | | |
| | don't care AH, AL | No memory cycle |
| | #MDtP | Operand from ALU to P bus |
| | default N | Zeros to N bus for pass P |
| | #AluCntl = 0000 | Add zeros to P for Pass |
| | #ShftCntl = 0101 | Shift is "rotate left circular" |
| | #OtM | Result back to MD bus |
| | #JmpAddr = (96) | Uncond jump to SWAP-1 |
| | #JmpCntl = 000 | |
| SWAP-1 (96) Second rotate back to MD bus | | |
| | Same microcode as SWAP-0 (27); uncond jump to SWAP-2 | |
| SWAP-2 (98) Third rotate back to MD bus | | |
| | Same as SWAP-0 (27); uncond jump to RL-0 (2E) for 4th rotate to complete byte swap | |
| LDAL-0 (FA) Load A Reg From Long Addressing Mode; 1st Half of Long Operand Read | | |
| | #TtAH | T Reg has high byte of long address |
| | #MALtAL | MAL has low byte of long address |
| | default P, N | Zeros to P and N busses for pass zero |
| | #AluCntl = 0000 | Pass zeros by Add operation |
| | #ShftCntl = 0000 | No carry-in |
| | #OtMAL | Zeros to MAL (to share STB-0) |
| | #MEMCNT, #MEM | 1st half long read |
| | #JmpAddr = (21) | Uncond jump to STB-0 to write A (executed next state) |
| | #JmpCntl = 000 | |
| | #uC bits | Microcode for next state |
| LDAL-1 Load A Long; 2nd half of Long Read; Microcode generated in prior state | | |
| | Microde same as STA-1 except no #JmpAddr needed | |
| STAL-0 (FB) Store A Reg to Long Addressing Mode; Read A Reg | | |
| | default AH, AL | A Reg address is all zeros |
| | Don't care P, N, #AluCntl, #ShftCntl | No ALU cycle |
| | #MEM | Read A Reg; contents on MD bus |
| | #JmpAddr = (9D) | Uncond jump to STAL-1 |
| | #JmpCntl = 000 | |
| STAL-1 (9D) Store A Long Write Operation | | |
| | #TtAH | T has address high |
| | #MALtAL | MAL has address low |
| | #MDtP | A coming from memory to P bus |
| | default N | Zeros to N bus for pass |
| | #AluCntl = 0000 | Add operation for pass |
| | #ShftCntl = 0000 | No carry-in |
| | #LST | Latch status |
| | #MEMCNT; #MEM, #WR | 1st half long write; ALU to MD by OtM |
| | #JmpAddr = (8E) | Uncond jump to STAL-2 |
| | #JmpCntl = 000 | |
| STAL-2 (8E) Store A Long Write (con't) | | |
| | default AH | Zeros to AH for RF |
| | #ONEtAL | 0001 to AL for B Reg address |
| | #MDtP | Result from prior state from MD to P bus |
| | default N | Zeros to N for Pass |
| | #AluCntl = 0000 | Pass MD back around to MD |

TABLE C-continued
THE MICROINSTRUCTION SET

| Micro-Instruction | Microinstruction Bits | Operations |
|---|---|---|
| | #ShftCntl = 0000 | No carry-in |
| | #MEM, #WR | Generates OtM; 2nd half of long write |
| | #JmpAddr = (00) | Uncond jump to IAQ |
| | #JmpCntl = 000 | |
| CMPL-0 (FD) Compare Long; 1st Half of Long Operand Fetch | | |
| | #TtAH | T Reg has high byte of address |
| | #MALtAL | MAL Reg has low byte of address |
| | Don't Care P, N | |
| | Don't Care #AluCntl, #ShftCntl | No ALU cycle |
| | #MEMCNT, #MEM | 1st half of long read |
| | #JmpAddr = (4D) | Uncond jump to BtoA-0; (executed next state) |
| | #JmpCntl = 000 | |
| | #uC bits | Microcode for next state |
| CMPL-1 Compare Long; 2nd half of Long read; Microcode from last state | | |
| | Microcode same as RFtoA-2 except no #JmpAddr or #JmpCntl needed | |
| JmpL-0 (FC) Long Jump Function; Enters with High byte in T reg, Low Byte in MAL | | |
| | Don't Care AH, AL | No memory cycle |
| | default P | Zeros to P bus |
| | #TtN | T reg (High byte of long address) to N bus |
| | #AluCntl = 0000 | Pass N using Add |
| | #ShftCntl = 000 | No carry-in |
| | #OtPCH | ALU output to PCH |
| | #JmpAddr = (EB) | Uncond jump to JmpL-1 |
| | #JmpCntl = 000 | |
| JmpL-1 (EB) Jump Long; Move Low byte of address to PCL | | |
| | don't care AH | No memory cycle |
| | #MALtAL, #PAL | Low byte to P bus via AL bus |
| | default N | Zeros to N for pass P bus |
| | #AluCntl = 0000 | Pass P using Add |
| | #ShftCntl = 0000 | No carry-in |
| | #OtPCL | Low byte from ALU to PCL |
| | #JmpAddr = (00) | Uncond jump to IAQ |
| | #JmpCntl = 000 | |
| Call-0 (FE) Long Call Function; Enters with high byte of address in T reg, low byte in MAL | | |
| | Don't care AH | No memory cycle |
| | #SPtAL, #PAL | SP to P bus via AL bus |
| | default N | Zeros to N bus |
| | #AluCntl = 0000 | Zeros with carry for increment |
| | #ShftCntl = 0001 | Carry-in = 1 |
| | #OtSP | Incremented SP back to SP |
| | #JmpAddr = (OC) | Uncond jump to trap sequence TGA-6 |
| | #JmpCntl = 000 | |
| MOVD-0 (F8) Move Double; Enters with high byte data in T Reg, low byte in MAL; Must fetch reg address (of low byte data), decrement to write high byte; first state is move low byte to IR, free MAL | | |
| | Don't care AH | No memory cycle |
| | #MALtAL, #PAL | MAL to P via AL bus to pass to IR |
| | #default N | Zeros to N bus for pass |
| | #AluCntl = 0000 | Add operation for pass |
| | #ShftCntl = 0000 | No carry-in |
| | OtM, #MDtIR | ALU result to IR via MD bus |
| | #JmpAddr = (31) | Uncond jump to MOVD-1 |
| | #JmpCntl = 000 | |
| MOVD-1 (31) 1st Half of Reg address fetch; increment PCL | | |
| | #PCHtAH | Address for Immed fetch |
| | #PCLtP, #PAL | PCL to AL and P bus |
| | default N | Zeros to N bus |
| | #AluCntl = 0000 | Add for increment PCL |
| | #ShftCntl = 0001 | Carry-in = 1 |
| | #OtPCL | Result back to PCL |
| | #MEMCNT, #MEM | 1st half long read |
| | #JmpAddr = (37) | Uncond jump to MOVD-3 (executed next state) |
| | #JmpCntl = 000 | |
| | #uC bits | Microde for MOVD-2, next state |
| MOVD-2 2nd Half of RF address fetch; increment PCH; Microcode generated in prior state | | |
| | don't care AH, AL | 2nd half of long read |
| | #PCHtP | PCH to P bus |
| | default N | Zeros to N bus |
| | #AluCntl = 0000 | Add zeros to PCH with microcarry from PCL |
| | #ShftCntl = 0010 | uC = 1 |

TABLE C-continued

THE MICROINSTRUCTION SET

| Micro-Instruction | Microinstruction Bits | Operations |
|---|---|---|
| | #OtPCH | Result back to PCH |
| | #MEM | 2nd half of long read; leaves address of RF on MD |
| MOVD-3 (37) Move RF Address to MAL | | |
| | don't care AH, AL | No memory cycle |
| | #MDtP | RF address from memory to P bus |
| | default N | Zeros to N for pass |
| | #AluCntl = 0000 | Pass using Add |
| | #ShftCntl = 0000 | No carry-in |
| | #OtMAL | Result to MAL; address of low byte date |
| | #JmpAddr = (10) | Uncond jump to MOVD-4 |
| | #JmpCntl = 000 | |
| MOVD-4 (10) Write low byte reg to memory | | |
| | default AH | Zeros to AH for RF |
| | #MALtAL | Reg Address to MAL |
| | default P | Zeros to P bus |
| | #IRtN | Low byte reg address from IR to N bus |
| | #AluCntl = 0000 | Pass N |
| | #ShftCntl = 0000 | No carry-in |
| | #MEM, #WR | OtM; write low byte to memory |
| | #JmpAddr = (11) | Uncond jump to MOVD-5 |
| | #JmpCntl = 000 | |
| MOVD-5 (11) Decrement MAL to Point to High byte | | |
| | don't care AH | No memory cycle |
| | #MALtAL, #PAL | MAL to P bus via AL bus |
| | default N | Zeros to N bus for decrement |
| | #AluCntl = 1111, #ABL = 0 | Decrement P bus (subtract in ALU) |
| | #ShftCntl = 0000 | No carry-in |
| | #OtMAL | Result to MAL |
| | #JmpAddr = (92) | Uncond jump to XCHB-1 |
| | #JmpCntl = 000 | |
| Test-0 (F9) Test Sequence; Enters test function from long addressing mode with high byte of address in T reg, low byte in MAL | | |
| | #TtAH | T reg has high byte of ROM address |
| | #MALtAL | MAL has low byte of ROM address |
| | default P, N | Zeros to P and N busses to create 02 constant |
| | #AluCntl = 0000 | ALU function is 0 + 0 + 1, rotate left, equals 02 |
| | #ShftCntl = 0100 | Carry-in = 1; shift left |
| | #MDtIR | ALU result to IR for AtoPPL mode |
| | #MEMCNT, #MEM | 1st half of long read (generates OtM) |
| | #JmpAddr = (52) | Uncond jump to BtoPPL-0 (executed next state), then STP-0 function |
| | #JmpCntl = 000 | |
| | #uC bits | Microcode for Test-1, next state |
| Test-1 Test Sequence; Microcode generated in Test-0 state | | |
| | Micrcode same as AtoPPL-0 but no #JmpAddr or #JmpCntl | |
| PopST-0 (08) Pop Stack; Fetch Top of Stack and Decrement Stack Pointer | | |
| | default AH | Zeros to AH for RF address |
| | #SPtAL, #PAL | Stack Pointer to AL and P |
| | default N | Zeros to N |
| | #AluCntl = 1111 | Subtract for decrement SP |
| | #ShftCntl = 0000 | Zero carry-in |
| | #OtSP | Result back to SP |
| | #MEM, #MDtT | Read top from RF to T Reg |
| | #JmpAddr = (0F) | Uncond jump to LDST-0 (0F) |
| | #JmpCntl = 000 | |
| RETS-0 (0A) Return from Subroutine Function; Move Top of Stack to PCL | | |
| | Don't Care AH, AL | No memory cycle |
| | #MDtP | Top of stack on MD goes to P bus |
| | default N | Zeros to N bus for pass |
| | #AluCntl = 0000 | Add operation for pass P |
| | #ShftCntl = 0000 | Carry-in = 0 |
| | #OtPCL | Result to PCL |
| | #JmpAddr = (46) | Uncond jump to RETS-1 |
| | #JmpCntl = 000 | |
| RETS-1 (46) Fetch Top of Stack; Decrement SP | | |
| | default AH | Zeros to AH for RF address |
| | #MALtAL, #PAL | MAL to AL and P |
| | default N | Zeros to N bus for decrement |
| | #AluCntl = 1111 | Subtract |
| | #ShftCntl = 0000 | Zero carry-in |
| | #OtSP | Result back to SP |
| | #MEM | Read top of stack |
| | #JmpAddr = (3A) | Function dispatch to (3A) or (3B) on |

TABLE C-continued
THE MICROINSTRUCTION SET

| Micro-Instruction | Microinstruction Bits | Operations |
|---|---|---|
| | | IR low |
| | #JmpCntl = 001 | |

RETS-2 (3A) Write Top to PCH Reg
  Same microcode as RETS-0 except #OtPCH instead of #OtPCL;
  #JmpAddr = (00) for uncond jump to IAQ-0

RETI-0 (0B) Return From Interrupt; Fetch Top
  Same microcode as RETS-0; #JmpAddr = (46), RETS-1

RETI-2 (3B) Fetch Top; Decrement SP
  Same microcode as RETS-2 except #JmpAddr = (08) for uncond jump to PopST-0

STSP-0 (09) Store Stack Pointer into B Reg; Pass SP to MD bus

| | | |
|---|---|---|
| | don't care AH | No memory cycle |
| | #SPtAL, #PAL | SP to P bus via AL bus |
| | default N | Zeros to N bus |
| | #AluCntl = 0000 | Add function for Pass P |
| | #ShftCntl = 0000 | Carry-in = 0 |
| | OtM | Result to MD bus |
| | #JmpAddr = (8E) | Uncond jump to STAL-2 to write SP to B reg |
| | #JmpCntl = 000 | |

LDSP-0 (0D) Load Stack Pointer From B Reg; Write B Reg from T to SP

| | | |
|---|---|---|
| | don't care AH, AL | No memory cycle |
| | default P | Zeros to P bus |
| | #TtN | T Reg (B Reg) to N Bus |
| | #AluCntl = 0000 | Add function for Pass T |
| | #ShftCntl = 0000 | Carry-in = 0 |
| | #OtSP | Result to Stack Pointer |
| | #JmpAddr = (00) | Uncond jump to IAQ-0 |
| | #JmpCntl = 000 | |

PushST-0 (0E) Push Stack Function; increment SP

| | | |
|---|---|---|
| | don't care AH | No memory cycle |
| | #SPtAL, #PAL | SP to AL and P bus |
| | default N | Zeros to N |
| | #AluCntl = 0000 | Add function for pass P |
| | #ShftCntl = 0001 | Carry-in = 1 for increment |
| | #OtSP | Result to SP |
| | #JmpAddr = (94) | Uncond jump to PushST-1 |
| | #JmpCntl = 000 | |

PushST-1 (94) Write Status on Stack

| | | |
|---|---|---|
| | default AH | Zeros to AH for RF address |
| | #SPtAL | SP to AL for stack address |
| | default P | Zeros to P bus for pass N |
| | #STtN | Status Reg to N bus |
| | #AluCntl = 0000 | Pass N using Add |
| | #ShftCntl = 0000 | Carry-in = 0 |
| | #MEM, #WR | OtM asserted; write to stack |
| | #JmpAddr = (00) | Uncond jump to IAQ-0 |
| | #JmpCntl = 000 | |

LDST-0 (0F) Load Status From B Reg (Not used as macroinstruction); Write T Reg to Status

| | | |
|---|---|---|
| | don't care AH, AL | No memory cycle |
| | default P | Zeros to P bus |
| | #TtN | B Reg from T Reg to N bus |
| | #AluCntl = 0000 | Pass N |
| | #ShftCntl = 0000 | Carry-in = 0 |
| | #OtST | Result to ST |
| | #JmpAddr = (00) | Uncond jump to IAQ-0 |
| | #JmpCntl = 000 | |

EINT-0 (05) Enable Interrupt; Write all ones into Status Reg

| | | |
|---|---|---|
| | don't care AH, AL | No memory cycle |
| | default P, N | Zeros to P and N |
| | #AluCntl = 1111 | Subtract produces all ones |
| | #ShftCntl = 0000 | Carry-in = 0 |
| | #OtST | Ones to ST |
| | #JmpAddr = (00) | Uncond jump to IAQ-0 |
| | #JmpCntl = 000 | |

DINT-0 (06) Disable Interrupt; Write all zeros into Status Reg

| | | |
|---|---|---|
| | don't care AH, AL | No memory cycle |
| | default P, N | Zeros to P and N |
| | #AluCntl = 0000 | Pass zeros |
| | #ShftCntl = 0000 | Carry-in = 0 |
| | #OtST | Zeros to ST |
| | #JmpAddr = (00) | Uncond jump to IAQ-0 |
| | #JmpCntl = 000 | |

IDLE-0 (01) Idle Function; Decrement PCL

| | | |
|---|---|---|
| | don't care AH, AL | No memory cycle |
| | #PCLtP | PCL to P bus |
| | default N | Zeros to N for decrement |
| | #AluCntl = 1111, | Subtract for decrement, carry-in = 0 |
| | #ShftCntl = 0000 | |

TABLE C-continued

THE MICROINSTRUCTION SET

| Micro-Instruction | Microinstruction Bits | Operations |
|---|---|---|
| | #OtPCL | Result back to PCL |
| | #JmpAddr = (38) | Uncond jump to IDLE-1 |
| | #JmpCntl = 000 | |
| IDLE-1 (38) Idle Function; Decrement PCH if borrow | | |
| | don't care AH, AL | No memory cycle |
| | #PCHtP | PCH to P bus |
| | default N | Zeros to N for decrement P |
| | #AluCntl = 1111 | Subtract |
| | #ShftCntl = 0010 | uC in |
| | #OtPCH | Result to PCH |
| | #JmpAddr = (00) | Uncond jump to IAQ-0 |
| | #JmpCntl = 000 | |
| SetC-0 (07) Set Carry; Clear Sign Bit; Sets Zero Bit | | |
| | don't care AH, AL | No memory cycle |
| | default P, N | Zeros to P and N |
| | #AluCntl = 1111 | 0 − 0 = 0 |
| | #ShftCntl = 0001 | STC = 1 |
| | #LST | Load Status |
| | #JmpAddr = (00) | Uncond jump to IAQ-0 |
| | #JmpCntl = 000 | |
| INT-0 (E1) Interrupt Routine; Int Ack; Subtract for Idle Test | | |
| | default AH, AL | Zeros to AH, AL busses to put out known value during Int Acknowledge |
| | #MDtP | Instruction to P bus for Idle Test |
| | default N | Zeros to N bus for decrement |
| | #AluCntl = 1111 | Subtract one to check for zero |
| | #ShftCntl = 0000 | Carry-in = 0 |
| | #MEMCNT | 1st half of Int Ack; asserts Int Ack |
| | #JmpAddr = (4E) | Uncond jump to INT-1 |
| | #JmpCntl = 000 | |
| INT-1 (4E) Interrupt Routine; Increment SP; Test for Zero (Idle) | | |
| | don't care AH | Address latched during INT-0 |
| | #SPtAL, #PAL | SP to AL bus and P bus |
| | default N | Zeros to N for increment |
| | #AluCntl = 0000 | Add for increment |
| | #ShftCntl = 0001 | Carry-in = 1 |
| | #OtSP | Result bck to SP |
| | #MDtIR | Vector from device to IR; Int Ack asserted |
| | #JmpAddr = (02) | Jump on micro equal zero; if Idle go to INT-4, else go to INT-2 |
| | #JmpCntl = 011 | |
| INT-2 (02) Decrement PCL for all instructions except idle | | |
| | don't care AH | No memory cycle |
| | #PAL, #PCLtP | PCL to P bus via AL |
| | default N | Zeros to N for decrement |
| | #AluCntl = 1111 | Subtract to decrement PCL |
| | #ShftCntl = 0000 | Carry-in = 0 |
| | #OtPCL | Result back to PCL |
| | #JmpAddr = (39) | Uncond jump to INT-3 |
| | #JmpCntl = 000 | |
| INT-3 (39) Decrement PCH if Borrow from PCL | | |
| | don't care AH, AL | No memory cycle |
| | #PCHtP | PCH to P bus |
| | default N | Zeros to N bus |
| | #AluCntl = 1111 | Decrement PCH if borrow |
| | #ShftCntl = 0010 | uC in |
| | #OtPCH | Result to PCH |
| | #JmpAddr = (03) | Uncond jump to INT-4 |
| | #JmpCntl = 000 | |

(NOTE: Interrupts are one address apart because they share the trap code which rotates the address left.)

| | | |
|---|---|---|
| INT-4 (03) Write Status to Stack | | |
| | default AH | Zeros to AH for RF address |
| | #SPtAL | SP to AL for stack write |
| | default P | Zeros to P bus for pass N |
| | #STtN | Status Reg to N bus |
| | #AluCntl = 0000 | Pass N bus using Add |
| | #ShftCntl = 0000 | Carry-in = 0 |
| | #MEM, #WR | Write Status Reg to Stack |
| | #JmpAddr = (48) | Uncond jump to INT-5 |
| | #JmpCntl = 000 | |
| INT-5 (48) Clear Int Enable in Status | | |
| | don't care AH, AL | No memory cycle |
| | default P, N | Zeros to P and N busses |
| | #AluCntl = 0000 | ALU all zeros |
| | #ShftCntl = 0000 | Carry-in = 0 |
| | #OtST | Zeros to Status Reg |
| | #JmpAddr = (5F) | Uncond jump to TGA-0 |
| | #JmpCntl = 000 | |

TABLE C-continued

THE MICROINSTRUCTION SET

| Micro-Instruction | Microinstruction Bits | Operations |
|---|---|---|
| RESET-0 (FF) Reset sequence; Don't Care State | | |
| | don't care AH, AL | No memory cycle |
| | don't care P, N | No ALU cycle |
| | don't care #AluCntl, #ShftCntl | |
| | #MEM | Read cycle to protect memory from Long Write |
| | #JmpAddr = (E8) | Uncond jump to RESET-1 |
| | #JmpCntl = 000 | |
| RESET-1 (E8) Reset; ALU produces FF as vector address | | |
| | don't care AH, AL | No memory cycle |
| | default P, N | Zeros to P and N busses |
| | #AluCntl = 1111 | Subtract to produce all ones |
| | #ShtCntl = 0000 | Carry-in = 0 |
| | #OtSP | Ones to SP |
| | #MDtT, #MDtIR | OtM asserted; ones to IR for high byte address; ones to T |
| | #JmpAddr = (EC) | Uncond jump to RESET-2 |
| | #JmpCntl = 000 | |
| RESET-2 (EC) Reset; Write zeros to Interrupt Control Reg | | |
| | #ONEtAH | PF address |
| | default AL | Zeros to AL for 0100 Int Cont Reg Address |
| | default P, N | Zeros to P and N for pass zeros |
| | #AluCntl = 0000 | Add 0 + 0 |
| | #ShftCntl = 0000 | Carry-in = 0 |
| | #OtST | Zeros to Status Reg |
| | #MEMCNT, #MEM, #WR | 1st half long write to Int Cont Reg |
| | #JmpAddr = (32) | Uncond jump to RESET-3 for 2nd half of long write |
| | #JmpCntl = 000 | |
| RESET-3 (32) Reset; 2nd Half of Long Write | | |
| | don't care AH, AL | Address is latched in RESET-2 |
| | default P, N | Zeros to P and N busses |
| | #AluCntl = 0000 | Pass zeros again for long write |
| | #ShftCntl = 0000 | Carry-in = 0 |
| | #MEM, #WR | 2nd half long write; OtM asserted |
| | #JmpAddr = (5F) | Uncond jump to TGA-0 to form vector |
| | #JmpCntl = 000 | |

TABLE D

| #AluCntl | | | | #ABL | ALU Output to Shifter S | Operations |
|---|---|---|---|---|---|---|
| 3 | 2 | 1 | 0 | | | |
| 0 | 0 | 0 | 0 | 0 | P + N + Cin | Add |
| 0 | 0 | 0 | 0 | 1 | P XNOR N | Exclusive NOR |
| 0 | 0 | 0 | 1 | 1 | P AND N | AND |
| 0 | 0 | 1 | 0 | 1 | (NOT P) OR N | OR |
| 0 | 0 | 1 | 1 | 1 | N | Pass N |
| 0 | 1 | 0 | 0 | 1 | P OR (NOT N) | OR |
| 0 | 1 | 0 | 1 | 1 | P | Pass P |
| 0 | 1 | 1 | 0 | 1 | FF(hex) | all 1's |
| 0 | 1 | 1 | 1 | 1 | P OR N | OR |
| 1 | 0 | 0 | 0 | 1 | P NOR N | NOR |
| 1 | 0 | 0 | 1 | 1 | 00 | All 0's |
| 1 | 0 | 1 | 0 | 1 | NOT P | Invert P |
| 1 | 0 | 1 | 1 | 1 | (NOT P) AND N | AND |
| 1 | 1 | 0 | 0 | 1 | NOT N | Invert N |
| 1 | 1 | 0 | 1 | 1 | P AND (NOT N) | AND |
| 1 | 1 | 1 | 0 | 1 | P NAND N | NAND |
| 1 | 1 | 1 | 1 | 0 | P − N − 1 + Cin | Subtract |
| 1 | 1 | 1 | 1 | 1 | P XOR N | Exclusive OR |

TABLE E

GROUP DISPATCH
Selection of Addressing Mode

FORMAT "0"

| IR CONTENTS | μA ADDRESS HEX | μA ADDRESS BINARY | MICRO-INSTRUCTION |
|---|---|---|---|
| 0000XXXX | 41 | 01000001 | MISC-0 |
| 0001XXXX | 43 | 01000011 | RFtoA-0 |
| 0010XXXX | 45 | 01000101 | ItoA-0 |
| 0011XXXX | 47 | 01000111 | RFtoB-0 |
| 0100XXXX | 49 | 01001001 | RFtoRF-0 |
| 0101XXXX | 4B | 01001011 | ItoB-0 |
| 0110XXXX | 4D | 01001101 | BtoA-0 |
| 0111XXXX | 4F | 01001111 | ItoRF-0 |

FORMAT "1"

| IR CONTENTS | μA ADDRESS HEX | μA ADDRESS BINARY | MICRO-INSTRUCTION |
|---|---|---|---|
| 10000XXX | 50 | 01010000 | AtoPPL-0 |
| 10001XXX | 51 | 01010001 | DIRtoA-0 |
| 10010XXX | 52 | 01010010 | BtoPPL-0 |
| 10011XXX | 53 | 01010011 | INDtoA-0 |
| 10100XXX | 54 | 01010100 | ItoPPL-0 |
| 10101XXX | 55 | 01010101 | INDXtoA-0 |
| 10110XXX | 56 | 01010110 | SglAS-0 |
| 10111XXX | 57 | 01010111 | SglA-0 |
| 11000XXX | 58 | 01011000 | SglBS-0 |
| 11001XXX | 59 | 01011001 | SglB-0 |
| 11010XXX | 5A | 01011010 | SglRFS-0 |
| 11011XXX | 5B | 01011011 | SglRF-0 |
| 11100XXX | 5C | 01011100 | RJmp-0 |
| 11101XXX | 5D | 01011101 | TGC-0 |
| 11110XXX | 5E | 01011110 | TGB-0 |
| 11111XXX | 5F | 01011111 | TGA-0 |

CROM Address = Base Address bits J7, J6, J5 (base address is 40 in hex); plus the 4-bit group field or IR7, IR6, IR5, IR4 multiplied by 2 or left shifted one bit; plus IR3 or $\overline{IR7}$.

| J7 | J6 | J5 | IR7 | IR6 | IR5 | IR4 | IR3 or $\overline{IR7}$ |

TABLE F

FUNCTION DISPATCH
Selection of Function to be Executed
For Dual Operand Function

| OPCODE: IR Contents | μA Address Hex | Binary | Microinstruction |
|---|---|---|---|
| 0XXX0010 | 12 | 00010010 | ST-0 |
| 0XXX0011 | 13 | 00010011 | AND-0 |
| 0XXX0100 | 14 | 00010100 | OR-0 |
| 0XXX0101 | 15 | 00010101 | XOR-0 |
| 0XXX0110 | 16 | 00010110 | BTH-0 |
| 0XXX0111 | 17 | 00010111 | BTL-0 |
| 0XXX1000 | 18 | 00011000 | ADD-0 |
| 0XXX1001 | 19 | 00011001 | ADC-0 |
| 0XXX1010 | 1A | 00011010 | SUB-0 |
| 0XXX1011 | 1B | 00011011 | SBB-0 |
| 0XXX1100 | 1C | 00011100 | MPY-0 |
| 0XXX1101 | 1D | 00011101 | CMP-0 |
| 0XXX1110 | 1E | 00011110 | |
| 0XXX1111 | 1F | 00011111 | |

CROM Address = Base address bits J7, J6, J5, J4 (here hex 10); plus function field of OPCODE (IR3, IR2, IR1, IR0)

TABLE F-continued

FUNCTION DISPATCH
Selection of Function to be Executed
For Dual Operand Function

| OPCODE: IR Contents | μA Address Hex | Binary | Microinstruction |
|---|---|---|---|

| J7 | J6 | J5 | J4 | IR3 | IR2 | IR1 | IR0 |

TABLE G

SUMMARY OF DISPATCH MODES

| Dispatch Mode | Microcode Bits #JmpCntl 2 | 1 | 0 | OPERATION |
|---|---|---|---|---|
| Unconditional | 0 | 0 | 0 | Unconditional jump to #JmpAddr(7–0) location. |
| Function | 0 | 0 | 1 | Function dispatch; 16-way branch on low-order 4 bits of IR |
| Test sign bit | 0 | 1 | 0 | 2-way branch on T(7), MSB of T Reg |
| Test if zero | 0 | 1 | 1 | Micro equal zero, uEZ, bit from ALU tested. |
| Test for interrupt | 1 | 0 | 0 | Interrupt Active bit is tested |
| Group | 1 | 0 | 1 | Group Dispatch - 24-way branch on high order 5 bits of IR. |
| Test if carry | 1 | 1 | 0 | Test STC bit |
| Test Status | 1 | 1 | 1 | Macro jump; test status bits dependent on low-order 3 bits of IR. |
| Reset | X | X | X | Forces μA to FF unconditionally, regardless of current #JmpAddr or #JmpCntl bits |

TABLE H

MEMORY CONTROL

| #MEMCNT (current) | #MEMCNT (previous) | #MEM | #WR | Memory Reference | OtM |
|---|---|---|---|---|---|
| 0 | 0 | 0 | 0 | No Mem Referene | 0 |
| 0 | 0 | 0 | 1 | Gate O Bus to MD Bus | 1 |
| 0 | 0 | 1 | 0 | Short Memory Read | 0 |
| 0 | 0 | 1 | 1 | Short Memory Write | 1 |
| 0 | 1 | 0 | 0 | 2nd State Int. Vector | 0 |
| 0 | 1 | 0 | 1 | *Illegal* | 1 |
| 0 | 1 | 1 | 0 | 2nd State Long Read | 0 |
| 0 | 1 | 1 | 1 | 2nd State Long Write | 1 |
| 1 | 0 | 0 | 0 | 1st State Int. Vector | 1 |
| 1 | 0 | 0 | 1 | *Illegal* | 1 |
| 1 | 0 | 1 | 0 | 1st State Long Read | 1 |
| 1 | 0 | 1 | 1 | 1st State Long Write | 1 |
| 1 | 1 | X | X | *Illegal* | 1 |

TABLE I

MACROJUMPS

| IR Bits 2 | 1 | 0 | Condition Tested STC | STSB | STEZ | Comment |
|---|---|---|---|---|---|---|
| 0 | 0 | 0 | — | — | — | Unconditionally Jump |
| 0 | 0 | 1 | — | 1 | — | Jump if Negative |
| 0 | 1 | 0 | — | — | 1 | Jump if Zero |
| 0 | 1 | 1 | 1 | — | — | Jump if Carry |
| 1 | 0 | 0 | — | 0 | 0 | Jump if Positive |
| 1 | 0 | 1 | — | 0 | — | Jump if Positive or Zero |
| 1 | 1 | 0 | — | — | 0 | Jump if Not Zero |
| 1 | 1 | 1 | 0 | — | — | Jump if No Carry |

TABLE J

LISTING OF KEYBOARD & DISPLAY SCAN PROGRAM

| ROM 11 ADDRESS IN HEX | OBJECT CODE IN HEX | | | LABEL | OPCODE | SOURCE STATEMENT OPERANDS | OPERATION |
|---|---|---|---|---|---|---|---|
| F800 | 72 | 08 | 7A | INIT | MOV | %NDIGIT,NXTCHR | SETS NEXT CHAR DISPLAYED TO 8 |
| F803 | 72 | FF | 77 | | MOV | % FE,DEBKEY | DEBOUNCED KEY=ESCAPE CODE |

TABLE J-continued
LISTING OF KEYBOARD & DISPLAY SCAN PROGRAM

| ROM 11 ADDRESS IN HEX | OBJECT CODE IN HEX | | | LABEL | OPCODE | OPERANDS | OPERATION |
|---|---|---|---|---|---|---|---|
| F806 | D5 | 78 | | | CLR | BRDPOS | RESET KEYBOARD POSITION TO 00 |
| F808 | FB | | | | TRAP | CLRDP | CLEAR SEG PAT ARRAY |
| F809 | D5 | 6D | | | CLR | FLAG | CLR .R109 |
| F80B | D5 | 7E | | | CLR | FNFLAG | CLR FUNCTION FLAG, .R126 |
| F80D | 42 | 04 | 7F | | MOV | DEBNCE,FCNT | SET FCNT TO DEBOUNCE (MOVE 4 TO .R127) |
| F810 | A2 | D0 | 02 | | MOVP | %D0,.P2 | TIMER LATCH VALUE TO D0 (HEX) OR 30 |
| F813 | A2 | C3 | 03 | | MOVP | %C3,.P3 | PRESCALER LATCH VALUE TO 3, SELECT INTERNAL TIMER, AND START TIMER |
| F816 | 72 | 80 | 6C | | MOV | %80,BTPAT | INIT TO LEFTMOST DIGIT |
| F819 | A2 | 10 | 00 | | MOVP | %10,.P0 | MEMORY MODE TO SINGLE CHIP |
| F81C | A2 | FF | 09 | | MOVP | %FF,.P9 | ALL OF PORT C - OUTPUTS |
| F81F | 52 | 80 | | KYDD | MOV | %80,B | DEBKEY MARKED AS EMPTY UNTIL |
| F821 | D6 | 77 | | | XCHB | DEBKEY | NEW KEYSTROKE IS LOADED INTO DEBKEY FROM TINTR |
| F823 | 56 | 80 | F9 | | BTJO | %80,B,KYDD | SEE IF DEBKEY STILL EMPTY, IF SO LOOP |
| F826 | AA | F8 | D5 | | LDA | @SEGPAT(B) | LOOK UP SEGMENT PATTERN |
| F829 | 77 | FF | 7E 02 | | BTJZ | %FF,FNFLG,NOFUN | |
| F82D | E0 | 03 | | | JMP | FUN | IF FUNCTION INPUT |
| F82F | FA | | | NOFUN | TRAP | STRSEG | WRITE PAT TO DISPLAY REGISTERS |
| F830 | E0 | ED | | | JMP | SGMT | LOOP INDEFINITELY |
| F832 | FB | | | FUN | TRAP | CLRDP | CLR SEG PAT ARRAY |
| F833 | B8 | | | | PUSH | A | SAVE SEGMENT PATTERN IN STACK |
| F834 | 52 | 04 | | | MOV | %4,B | INITIALIZE TABLE INDEX |
| F836 | AA | F8 | E7 | FUN1 | LDA | @TFUN-1(B) | LOAD SEG PAT'N OF "FUN" |
| F839 | FA | | | | TRAP | STRSEG | STORE FUN IN SARRAY |
| F83A | CA | FA | | | DJNZ | B,FUN1 | TABLE 'TFUN'STORED |
| F83C | B9 | | | | POP | A | YES: RELOAD A |
| F83D | FA | | | | TRAP | STRSEG | PUT IN SPECIFIC FUNC KEY |
| F83E | 22 | FF | | | MOV | %FF,A | |
| F840 | D0 | 76 | | FDELY | MOV | A,FUNDLY | FDELY SUBROUTINE |
| F842 | 12 | 76 | | FDELY1 | MOV | FUNDLY,A | |
| F844 | E6 | FC | | | JNZ | FDELY1 | LOOP UNTIL A CLEARED |
| F846 | FB | | | | TRAP | CLRDP | BLANK |
| F847 | E0 | D6 | | | JMP | SGMT | RETURN TO F81F |
| F849 | C8 | | | | PUSH | B | |
| F84A | B8 | | | | PUSH | A | |
| F848B | 52 | 07 | | | MOV | %NDIGIT-1,B | |
| F84D | 8A | 00 | 6D | STSEG1 | LDA | @SARRAY-1,(B) | |
| F850 | AB | 00 | 6E | | STA | @SARRAY(B) | |
| F853 | CA | F8 | | | DJNZ | B,STSEG1 | |
| F855 | D9 | 6E | | | POP | SARRAY | |
| F857 | C9 | | | | POP | B | |
| F858 | 0A | | | | RETS | | RETURN FROM SUBROUTINE |
| F859 | B8 | | | TINTR | PUSH | A | SAVE A DURING SERVICE ROUTINE |
| F85A | C8 | | | | PUSH | B | SAVE B DURING SERVICE ROUTINE |
| F85B | A2 | 00 | 06 | MUXSCN | MOVP | %0,CHARPT | |
| F85E | 32 | 7A | | | MOV | NXTCHR,B | INDEX OF NEXT DIGIT TO BE DISPLAYED PUT IN B |
| F860 | AA | 00 | 6D | | LDA | @SARRAY-1(B) | |
| F863 | 82 | 08 | | | MOVP | A,SEGMPT | |
| F865 | 8A | 00 | 6C | | LDA | @BTPAT | |
| F868 | 82 | 06 | | | MPVP | A,CHARPT | |
| F86A | 80 | 04 | | SRCH | MOVP | COLNPT,A | LOAD ANY SWITCH CLOSURES |
| F86C | D0 | 7D | | | MOV | A,ROWPAT | SAVE ROW PATTERN |
| F86E | 72 | 04 | 7C | SRCH1 | MOV | %NCOLS,ROWCNT | NCOLS LOOPS THRU NXTLOC |
| F871 | 76 | FF | 78 13 | | BTJO | %FF,BRDPOS,NXTLOC | BRDPOS=0 IF SCANNING F KEY LOCATION |
| F875 | 76 | 80 | 7D 08 | | BTJO | %80,ROWPAT,TEMP1 | F KEY NOT DOWN |
| F879 | DA | 7F | 2B | | DJNZ | FCNT,SRCH5 | NOT DEBOUNCED YET |
| F87C | 72 | FF | 7E | | MOV | %FF,FNFLAG | F KEY DET & DEBNCD |
| F87F | E0 | 26 | | | JMP | SRCH5 | |
| F881 | D5 | 7E | | TEMP1 | CLR | FNFLAG | |
| F883 | 42 | 04 | 7F | | MOV | DEBNCE,FCNT | |
| F886 | E0 | 1F | | | JMP | SRCH5 | |
| F888 | 76 | 80 | 7D 1B | NXTLOC | BTJO | %80,ROWPAT,SRCH5 | ONE = NO KEY DOWN |
| F88C | 72 | FF | 6D | | MOV | %FF,FLAG | AT LEAST ONE KEY DETECTED IN THE CURRENT SRCH |
| F88F | 12 | 7B | | | MOV | DETKEY,A | |
| F891 | 42 | 78 | 7B | | MOV | BRKPOS,DETKEY | |
| F894 | 15 | 7B | | | XOR | DETKEY,A | |
| F896 | E2 | 05 | | | JZ | SRCH3 | |
| F898 | 42 | 04 | 79 | | MOV | DEBNCE,SUCCRD | |

TABLE J-continued
LISTING OF KEYBOARD & DISPLAY SCAN PROGRAM

| ROM 11 ADDRESS IN HEX | OBJECT CODE IN HEX | | | LABEL | OPCODE | OPERANDS | OPERATION |
|---|---|---|---|---|---|---|---|
| F898 | E0 | 0A | | | JMP | SRCH5 | |
| F89D | 12 | 79 | | SRCH3 | MOV | SUCCRD,A | |
| F89F | E2 | 06 | | | JZ | SRCH5 | IF SUCCRD = 0 |
| F8A1 | Da | 79 | 03 | | DJNZ | SUCCRD,SRCH5 | |
| F8A4 | 42 | 7B | 77 | | MOV | DETKEY,DEBKEY | TO MARK NEW KEY CLOSURE |
| F8A7 | D3 | 78 | | SRCH5 | INC | BRDPOS | |
| F8A9 | DE | 7D | | | RL | ROWPAT | TO LOOK AT NEXT COLUMN |
| F8AB | DA | 7C | DA | | DJNZ | ROWCNT,NXTLOC | |
| F8AE | D2 | 7A | | SRCH6 | DEC | NXTCHR | |
| F8B0 | DC | 6C | | | RR | BTPAT | |
| F8B2 | E7 | 14 | | | JNC | SRCH9 | |
| F8B4 | 72 | 08 | 7A | | MOV | %NDIGIT,NXTCHR | |
| F8B7 | D5 | 78 | | | CLR | BRDPOS | RESET BRDPOS TO ZERO |
| F8B9 | 12 | 6D | | | MOV | FLAG,A | |
| F8BB | E6 | 03 | | | JNZ | SRCH9 | IF ANY KEYS WERE DETECTED |
| F8BD | 72 | FF | 7B | | MOV | % FF,DETKEY | CHANGE DETKEY |
| F8C0 | D5 | 6D | | SRCH8 | CLR | FLAG | |
| F8C2 | 22 | 76 | | | MOV | % FUNDLY,A | |
| F8C4 | E2 | 02 | | | JZ | SRCH9 | USED BY TEST FUNCTION |
| F8C6 | D2 | 76 | | | DEC | FUNDLY | |
| F8C8 | C9 | | | SRCH9 | POP | B | |
| F8C9 | B9 | | | | POP | A | |
| F8CA | 0B | | | | RETI | | |
| F8CB | 22 | 00 | | | MOV | % BLANK,A | |
| F8CD | 52 | 08 | | FILD | MOV | % NDIGIT,B | |
| F8CF | AB | 00 | 6D | TCLR | STA | @SARRAY−1(B) | |
| F8D2 | CA | FB | | | DJNZ | B,TCLR | |
| F8D4 | 0A | | | | RETS | | |

F8DF to F8E7 is look-up table for SEGPAT: the base for segment patterns
F8E8 to F8EB is table accessed to point out FUN-
FFF4 is trap 5, contains address F849 for STRSEG, store segment
FFF6 is trap 4, contains address F8CB for CLRDP, clear display
FFFA contains address F859 for TINTR, timer interrupt routine
FFFC contains address F800 for initillization subroutine

TABLE K
Definition for Program of TABLE J

CHARPT=.P6=Port B; an 8-bit port used to enable, one at a time, the individual characters of the eight-character, seven-segment display, strobing the rows of the matrix keyboard at the same time.

SEGMPT=.P8=Port C; and 8-bit port to enable the seven segments and decimal point of the display.

COLNPT=.P4=Port A; five high-order bits of port A used as inputs from the keyboard return lines. Assumes a key down in the currently enabled row returns a low (zero) level.

CLRDP=Trap 4 of instruction set; writes blank characters into all display.

STRSEG=Trap 5 of instruction set; loads segment pattern from look-up table.

NDIGIT=8; the number of digits in the display.

NROWS=5; the number of rows in the keyboard matrix.

NCOLS=4; the number of columns in the kayboard matrix.

DEBNCE=4; number of scans used for debounce.

BLANK =00; code used to blank display characters.

MASK=1F; bits relevant to ENACC routine.

FCNT=.R127; register in RF used as the function debounce counter.

FNFLG=.R126; register in RF used as flag to indicate function.

ROWPAT=.R125; register in RF used to hold input pattern being rotated thru CY.

ROWCNT=.R124; register in RF used to count number of bits rotated through CY.

DETKEY=.R123; register in RF used to hold the position of last detected key.

NXTCHR=.R122; register in RF used in the position of next character to be displayed.

SUCCRD=.R121; register in RF used in the number of successive reads of same key.

BRDPOS=.R120; register in RF used as the keyboard position currently being scanned.

DEBKEY=.R119; register in RF used to carry the position of debounced key from MUXSCN routine back to background program.

FUNDLY=.R118; register in RF used to hold nonzero when display in progress; the next 8 registers (.R117 to .R111) hold the display segment patterns.

SARRAY=.R110; register in RF used to hold the base of register array for display pattern.

FLAG=.R109; register in RF used as flay to set when at least one key is detected in current search.

BTPAT=.R108; register in RF used to hold pattern to energize specific digit.

INIT=address R800=initialize subroutine to initialize the system.

SGMT=address F81F=routine to check for any new keystrokes detected. Translate each keystroke into a segment pattern and write it into the appropirate display register.

KYDD=Keyboard input subroutine. Returns after a new keystroke has been detected and debounced. Encoded value of key (rather than its position in switch matrix) is returned in A.

FUN=Function subroutine. This subroutine is entered when the function key is depressed in conjunction with another key. It points out FUN X, wherein X is the other key which is pressed.

FDELY=subroutine which hangs up for the number of complete display searches equal to the contents of A when called.

STRSEG=address F849=subroutine to enter contents of A into the rightmost digit and shift everything else one place to the left.

TINTR=Timer interrupt subroutine; call made to location FFFA when timer times out. This causes the display refresh and keyscan routine to be called periodically.

MUXSCN=multiplex scan routine; multiplexes the 8-segment displays. Each call causes the next character to be displayed, according to the contents of the SARRAY register array. MUXSCN should be called at least every millisec or so.

SRCH=Keyboard search routine. During MUXSCAN, when next character is being displayed, with the current row energized, check if there are any inputs. A keydown returns—low level.

TABLE L
LISTING FOR TEST PROGRAM

| RAM 12 Hex Address | Object Code In Hex | | | Source Statement | | |
|---|---|---|---|---|---|---|
| | | | Label | Opcode | Operands | Operation |
| 0B | 7D | 02 | 7D LOOP | CMP | %02, AL | If Address = F902 (CRCADR), |
| 0E | E6 | 0D | | JNZ | NOTCRC | then increment 2 bytes. |
| 10 | 7D | F8 | 7C | CMP | %F9, AH | |
| 13 | E6 | 08 | | JNZ | NOTCRC | |
| 15 | 78 | 02 | 7D | ADD | %2, AL | |
| 18 | 79 | 00 | 7C | ADC | %0, AH | |
| 1B | E0 | EE | | JMP | LOOP | |
| 1D | 12 | 7C | NOTCRC | MOV | AH, A | If MSB of address increments |
| 1F | E2 | 29 | | JZ | CHKDON | past FF, then all of ROM has |
| 21 | 9A | 7D | | LDA | *AL | been processed, so jump to |
| 23 | 15 | 7E | | XOR | QH, A | CHKDONE. Otherwise, go to |
| 25 | 42 | 7F | 7E | MOV | QL, QH | BUILDF. |
| 28 | C5 | | | CLR | B | |
| 29 | B6 | | | XCHB | A | |
| 2A | 72 | 08 | 02 | MOV | %8, R2 | |
| 2D | 65 | | BUILDF | XOR | B, A | Process current CRC QH, QL with |
| 2E | CF | | | RLC | B | current data byte (B). |
| 2F | DA | 02 | FB | DJNZ | R2, BUILDF | |
| 32 | D0 | 7F | | MOV | A, QL | |
| 34 | 7C | 02 | 7F | MPY | %2, QL | |
| 37 | 45 | 00 | 7E | XOR | A, QH | |
| 3A | 7C | 40 | 7F | MPY | %64, QL | |
| 3D | 45 | 00 | 7F | XOR | A, QL | |
| 40 | 45 | 01 | 7E | XOR | B, QH | |
| 43 | D3 | 7D | | INC | AL | |
| 45 | 79 | 00 | 7C | ADC | %0, AH | |
| 48 | E0 | C1 | | JMP | LOOP | |
| 4A | A2 | 55 | 08 CHKDON | MOVP | %55, CPORT | Check done; the test loop is |
| 4D | A2 | FF | 09 | MOVP | % FF, CDIR | done; set C port as output and |
| 50 | 8A | F9 | 02 | LDA | @F902 | apply hex 55 or 01010101 to C |
| 53 | 1S | 7E | | XOR | QH, A | port as a signal. |
| 55 | 82 | 0A | | MOVP | A, DPORT | |
| 57 | A2 | FF | 0B | MOVP | %FF, DDIR | |
| 5A | 8A | F9 | 03 | LDA | @F903 | |
| 5D | 1S | 7F | | XOR | QL, A | |
| 5F | 82 | 08 | | MOVP | A, CPORT | |

Definitions:
QL = R127
QH = R126
AL = R125
AH = R124

TABLE M
MICROINTERRUPT ROUTINE

| Micro-Instruction | Microinstruction Bits | Operation |
|---|---|---|
| μINT-0 (60) Microinterrupt Routine; Save MD bus contents | | |
| | default AH | RF address |
| | #CtAL | Address for MD save |
| | #MDtP | MD thru ALU via P |
| | default N | Zeroes to N for pass |
| | #AluCntl = 0000 | Pass data on MD |
| | #ShftCntl = 0000 | No carry |
| | #MEM, #WR | MD written into RF address from constant #C (7-0) |
| | #JmpAddr = (61) | Uncond jump to μINT-1 |
| μINT-1 (61) Fetch Timer-1 | | |
| | default AH | RF address |
| | #CtAL | R63 address from #C (7-0) |
| | don't care N, #Alu | No ALU operation |
| | #MEM | Fetch R63, stays on MD |

TABLE M-continued

MICROINTERRUPT ROUTINE

| Micro-Instruction | Microinstruction Bits | Operation |
|---|---|---|
| | #JmpAddr = (62) | Uncond Jump to μINT-2 |
| μINT-2 (62) Decrement Timer-1; write result to R63; tet for zero | | |
| | default AH | RF address is zeros |
| | #CtAL | R63 address on AL bus |
| | #MDtP | R63 contents from prior fetch |
| | #default N | Zeros to N bus |
| | #AluCntl = 1111 | Subtract for decrement |
| | #ShftCntl = 0001 | Carry-in = 1 |
| | #MEM, #WR | Result to MD via OtM, write in R63 |
| | #JmpAddr = (63) | uEZ dispatch jump to μINT-3 if not zero, μINT-4 if zero |
| | #JmpCntl = 011 | |
| μINT-3 (63) Return from microinterrupt | | |
| | defaul AH | Zeros for RF address |
| | #CtAL | RF address of MD save |
| | don't care N, #Alu | No ALU operation |
| | #MEM | MD from state prior to uINT-0 read from RF |
| | #JmpAddr = don't care | μA from latch |
| | #JmpCntl = don't care | |
| | #μAR | Reset control 30; activate mux 32 to use saved μA from latch 31 |
| μINT-4 (64) If Timer-1 value is zero, set Microinterrupt Flag | | |
| | default AH | Zeros on AH for RF address |
| | #CtAL | R62 address from #C (7–0) |
| | default P, N | Zeros |
| | #AluCntl = 0000 | Add 0 + 0 + 1 |
| | #ShftCntl = 0001 | Carry-In = 1 |
| | #MEM, #WR | Write 01 to R62 (se Flag) |
| | #JmpAdr = (63) | Uncond jump to μINT-3 for return from microinterrupt |
| | #JmpCntl = 000 | |
| NOTE: If Timer-2, Timer-3 are included, microinstructions like μINT-1 to μINT-4 are repeated, using different RF addresses. | | |
| IAQ-0a (00) Fetch Microinterrupt Flag | | |
| | default AH | Zeros for RF address |
| | #CtAL | RF address of Flag-1 (R62) |
| | don't care N, P, Alu | No ALU operation |
| | #MEM | Flag-1 to MD from RF |
| | #JmpADdr = (65) | Uncond jump to IAQ-0b |
| IAQ-0b Test Microinterrupt Flag | | |
| | default AL, AH | No memory cycle |
| | default N | Zeros to N bus |
| | #MDtP | Flag to P bus |
| | #AluCntl = 0000 | Pass Flag |
| | #ShftCntl = 0000 | No carry-in |
| | #JmpAddr = | Test for all zeros, if yes, go to IAQ-0 of Table C; if no, to INT-0 |
| | #JmpCntl = 011 | |

What is claimed:

1. A microcomputer device comprising:

a semiconductor integrated circuit having an arithmetic/logic unit, a plurality of registers for storing data and memory addresses, a plurality of input terminals, parallel bus means coupled to the arithmetic/logic unit and the registers and coupled to said input terminals, and control means for generating command signals for controlling operation of the arithmetic/logic unit and accessing the bus means and registers, all within the integrated circuit, said control means including read/write memory means storing macroinstruction words defining operations of the device and storing microinstruction words defining said command signals, the memory means having a first output for said microinstruction words and a second output for said command signals, the second output having a word width greater than that of the first output, said command signals being directly connected to control said operation of the arithmetic/logic unit and accessing the bus means and registers rather than being transferred by said bus means, said read/write memory means having an input for receiving macroaddresses and for receiving microaddresses, said control means including addressing means for applying macroaddresses to said input of said read/write memory means via said registers and parallel bus means to define operations selected by macroinstruction words, and for applying microaddresses to said input of said read/write memory means to generate sequences of sets of said command signals determined by the macroinstruction words, each set of command signals corresponding to a different microinstruction word, and each sequence of sets corresponding to a macroinstruction word, and means included in said integrated circuit operated by said control means for loading macroinstructions and microinstructions into said memory means via said parallel bus means from said input terminals, whereby said macroinstructions and microinstructions may be received from a source external to the integrated circuit connected to said terminals.

2. A device according to claim 1 wherein clocking means within said integrated circut connected to said control means establishes a machine cycle for each of said sets of command signals, and means coupled to said addressing means of said memory means for supplying either a macroaddress or a microaddress at said input of the memory means once during each of said machine cycles.

3. A device according to claim 1 wherein said memory means is a single memory included in said integrated circuit for storing both said macroinstruction words and said microinstructions.

4. A microcomputer device comprising:
a semiconductor integrated circuit havong an arithmetic/logic unit, a plurality of registers for storing data and memory addresses, a plurality of input terminals, bus means coupled to the arithmetic/logic unit and the registers and to the input terminals, and control means having an output, said control means producing at said output a plurality of different sets of commands, each of said sets being coupled to the arithmetic/logic unit, registers and bus means for controlling operation thereof, said sets being produced by said control means in response to instruction words, and means for loading instruction words into an input of said control means, all within the integrated circuit;
said control means including read/write memory means having address input means and first and second separate multi-bit outputs, said control means including addressing means for applying first and second addresses to said address input means of said read/write memory means, each first address being selected by one of said instruction words, each second address producing at least one microcode output word, each microcode output word defining one of said sets of said commands at said output of the control means;
said commands at said output of the control means being directly connected to said arithmetic/logic unit, registers and bus means for controlling operation thereof, rather than being transferred by said bus means;
and means for loading said instruction words and microcode output words into said memory means from said input terminals, whereby said instruction words and microcode output words may be loaded from a source external to the integrated circuit.

5. A device according to claim 4 wherein the addressing means selects at least one of said second addresses by a jump address include in one of said sets of commands.

6. A device according to claim 4 wherein the each of the commands contains a potential number of bits greatly exceeding the bits of one of said instruction words.

7. A device according to claim 6 wherein the memory means is a single memory array and the addressing means includes a shared decoder for the array and also separate decoders for the first and second outputs, and only one of the first and second outputs is activated in a machine cycle.

8. A method of operating a microcomputer system, said system containing:
a microcomputer device having an arithmetic/logic unit, having a plurality of data/address registers, having a plurality of input terminals, and having bus means coupled to the arithmetic/logic unit and registers and to said terminals, and read/write memory means for storing macroinstructions and microinstructions also coupled to said bus means, all within an integrated semiconductor circuit,
an external memory, and an external bus coupled to said external memory and to said terminals,
comprising the steps of:
writing into said memory means, from said external memory via said external bus, a pre-established code of macroinstructions and microinstructions from said external memory;
within said microcomputer device, fetching macroinstructions from the memory means, and generating at least one multi-bit microinstruction word from a microinstruction fetched from said memory means based upon each said macroinstruction; the microinstruction words having a word-width much greater than that of the macroinstruction; and
within said microcomputer device, executing at least one operation in the arithmetic/logic unit in response to said at least one multi-bit microinstruction word fetched from the memory means, the bits of the microinstruction being directly connected to controlled elements of the arithmetic/logic unit without being transferred on said bus means.

9. A method according to claim 8 including, after said steps of executing, the step of loading said memory means with a second pre-established code of macroinstructions and microinstructions from a source external to the device.

10. A method according to claim 9 wherein both of said steps of loading the memory means with prestablished code of macroinstructions and microinstructions are executed through said bus means.

11. A method according to claim 8 wherein both of said steps of loading memory means are performed under control of microcode permanently stored in a part of the memory means within the semiconductor integrated circuit.

12. A method according to claim 11 including the step of clocking said system whereby each said multi-bit microinstruction word is generated in a machine cycle, and each step of fetching a macroinstruction is in a different machine cycle from such step of generating a multi-bit microinstruction word.

13. A microcomputer comprising:
read/write memory means containing microinstructions, and a CPU, all in a single semiconductor unit;
the CPU including arithmetic/logic means, an instruction register, and address/data registers; and bus means for accessing the arithmetic/logic means, the instruction register, and address/data registers,
and control means included in the CPU for fetching microinstructions from the memory means and generating microinstruction states, said control means including said instruction register and fetching said microinstructions in response to macro instructions in said instruction register, said control means including output means for providing output control signals in each microinstruction state according to said microinstructions; said output control signals being directly connected to control the operation of said arithmetic/logic means, said registers and said bus means, without said output control signals being transferred on said bus means; the word-width of said output means being greater than the word width of said registers;

and means for writing said microinstructions into said read/write memory means from a source external to the unit.

14. A microcomputer according to claim 13 wherein the means for writing includes said bus means for coupling microinstructions from terminals of said unit to said memory means.

15. A microcomputer according to claim 14 wherein the control means controls said means for writing by generating microinstruction states based upon microcode permanently stored within said unit.

16. A microcomputer according to claim 14 wherein said bus means are one byte wide and each of said microinstructions is a plurality of bytes wide.

17. A microcomputer according to claim 16 including microinstruction addressing means receiving addresses from said registers.

18. A microcomputer device constructed in an integrated circuit, the integrated circuit comprising:
   (a) an ALU for performing arithmetic/logic operations on operands supplied to inputs of the ALU, said operations being under control of microcode words, each of said microcode words having a plurality of control bits,
   (b) a plurality of data and address registers,
   (c) data/address bus means accessing the ALU and registers under control of said microcode words; said bus means and said registers having a data width much less than the number of said control bits of said microcode words;
   (d) read/write microcode memory means for storing said microcode words, said control bits of said microcode words being directly connected from an output of said memory means to controlled elements in said ALU, in said registers, and in said bus means without being transferred on said bus means,
   (e) and means including terminals of said integrated circuit for writing said microcode words into said microcode memory means from a source external to the intergrated circuit via said terminals and said data/address bus means.

19. A device according to claim 18 wherein all of said device is formed in a single semiconductor integrated circuit.

20. A device according to claim 19 wherein said microcode memory means contains macrocode words in addition to said microcode words and includes separate macrocode and microcode addressing means, and further said memory means includes separate macrocode and microcode output means.

* * * * *